United States Patent
Yasuda et al.

(10) Patent No.: US 7,505,845 B2
(45) Date of Patent: Mar. 17, 2009

(54) CONTROL OF INTERNAL COMBUSTION ENGINE

(75) Inventors: Hajime Yasuda, Tokyo (JP); Kimiyoshi Nishizawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/961,554

(22) Filed: Dec. 20, 2007

(65) Prior Publication Data
US 2008/0154485 A1 Jun. 26, 2008

(30) Foreign Application Priority Data

| Dec. 25, 2006 | (JP) | ............................. 2006-348135 |
| Dec. 25, 2006 | (JP) | ............................. 2006-348220 |
| Dec. 25, 2006 | (JP) | ............................. 2006-348287 |
| Dec. 25, 2006 | (JP) | ............................. 2006-348333 |

(51) Int. Cl.
*B60T 7/12* (2006.01)
*F02M 1/00* (2006.01)

(52) U.S. Cl. .................. 701/103; 123/434; 123/406.11; 123/406.47

(58) Field of Classification Search ................ 701/103, 701/104, 114, 115; 123/434, 445, 478, 480, 123/406.11, 406.23, 406.47
See application file for complete search history.

(56) References Cited

U.S. PATENT DOCUMENTS

| 5,357,928 | A  | * | 10/1994 | Ohtsuka ................. 123/406.47 |
| 5,950,419 | A  |   | 9/1999  | Nishimura et al. |
| 6,237,327 | B1 | * | 5/2001  | Nishimura et al. ............ 60/276 |
| 6,311,482 | B1 | * | 11/2001 | Yamashita .................... 60/285 |
| 6,718,758 | B1 | * | 4/2004  | Suzuki ......................... 60/300 |
| 7,073,480 | B2 | * | 7/2006  | Shiraishi et al. ............. 123/295 |
| 2002/0050265 | A1 | * | 5/2002 | Yoshida et al. ............... 123/295 |
| 2002/0100442 | A1 | * | 8/2002 | Takahashi et al. ......... 123/90.17 |
| 2006/0266020 | A1 | * | 11/2006 | Okamoto et al. .............. 60/284 |

FOREIGN PATENT DOCUMENTS

| JP | 08-232645 A | 9/1996 |
| JP | 09-53492 A  | 2/1997 |

* cited by examiner

*Primary Examiner*—John T Kwon
(74) *Attorney, Agent, or Firm*—Foley & Lardner LLP

(57) ABSTRACT

An engine controller for engine control apparatus is configured to retard an ignition timing, from an engine starting mode timing to a catalyst warm-up mode timing at an idle attainment moment at which an engine idling condition is reached, and to regulate an intake air quantity at a prior moment prior to the idle attainment moment. Moreover, the controller increases a fuel injection quantity by an increase quantity during a period from the prior moment until an intake settlement moment at which an intake air condition settles down. The controller sets the increase quantity of the fuel injection quantity in accordance with a parameter representing a condition of the intake air or fuel supplied to the engine.

24 Claims, 31 Drawing Sheets

CONTROL OF INTERNAL COMBUSTION ENGINE

BACKGROUND OF THE INVENTION

The present invention relates to technique for controlling an engine (internal combustion engine), and more specifically to control apparatus and/or process for controlling an internal combustion engine in a cold start operation.

A published Japanese patent application No. 8-232645 (corresponding to U.S. Pat. No. 5,950,419) shows an engine control system which sets the ignition timing to a timing adapted for engine start during a time interval from complete explosion in the engine after cold engine cranking until a boost of the engine speed. After the boost of the engine speed, this engine control system retards the ignition timing like a step change to a specified crank angle after compression top dead center to activate an exhaust purifying catalyst earlier.

SUMMARY OF THE INVENTION

The control system of the above-mentioned patent document is arranged, in a desirable example, to increase the intake air quantity by increasing the opening of an idle speed control valve, for example, before the step-like retardation of the ignition timing to the specified crank angle after compression top dead center, and to further increase the intake air quantity after the step-like retardation of the ignition timing. By controlling the intake air quantity in this way, this control system enables the engine to boost its speed smoothly and rapidly according to this patent document.

However, the boost of the engine speed beyond a desired idling speed causes undesirable consumption of fuel. From the viewpoint of improvement in fuel consumption, it is desirable to converge the engine speed after the full explosion, to the desired idle speed without overshoot even in a cold start operation.

In a first control example devised by investigation, an engine control system is arranged (i) to retard the ignition timing from an ignition timing point for engine starting to an ignition timing point for accelerating catalyst warm-up, in the manner of a step change, at the moment or time when the engine speed reaches a desired target idle speed from cranking, and (ii) to start opening a throttle valve at a prior moment a predetermined interval before the moment of attainment of the target idle speed, so as to supply, to a combustion chamber, an amount of intake air to hold the engine speed at the desired target idle speed at the moment of attainment of the target idle speed to improve the fuel consumption in consideration of a response delay in the intake air quantity from the position of the throttle valve to the combustion chamber.

Experiments have shown that this control system can effectively prevent the engine speed from being further increased beyond the desired target idle speed. However, the experiments have further revealed a drop of the engine speed from the target idle speed and an increase of HC caused by an enleanment of the actual air fuel ratio beyond a combustion stability limit.

In a second control example devised to prevent such enleanment, an engine control system is arranged to perform (i) a step retardation of the ignition timing from the start mode ignition timing point for engine starting to the catalyst warm-up mode ignition timing point for accelerating catalyst warm-up, at the moment when the engine speed reaches the desired target idle speed from cranking; (ii) a preliminary operation to start opening the throttle valve before the moment when the target idle seed is reached, to supply the intake air in an amount to maintain the target idle engine speed from the moment when the engine speed reaches the target idle speed; and (iii) a temporary enrichment of the fuel injection quantity from the moment of starting to open the throttle valve until a rate of change of the intake air pressure or an intake air flow speed at an intake port becomes equal to a value within a predetermined range after the attainment of the target idle speed. By so doing, this control system can settle down the engine speed smoothly and rapidly to the target idle speed after a complete explosion while accelerating warm-up of the catalyst in a cold start operation, and simultaneously prevent the actual air fuel ratio from being shifted to the lean side beyond the combustion stability limit after the attainment of the target idle speed.

If no account is take of a condition, such as a pressure condition, a temperature condition or a fuel condition, affecting at least one of the combustion, the vaporization of injected fuel and the quantity of fuel wall flow, the engine control system might cause unstable combustion, undesirable vibrations, increase of HC and engine stall in an extreme case.

If, for example, the actual atmospheric pressure is not equal to a standard pressure though an increase quantity of the fuel injection is set on the basis of the standard atmospheric pressure, the quantity of wall flow fuel is increased, the fuel supply becomes insufficient and the air fuel ratio becomes lean. As a result, the combustion could become unstable, and the unstable combustion could cause unpleasant vibrations due to unstable engine rotation immediately after the attainment of the idle speed, an increase of HC, and an engine stall in an extreme case.

If, for example, the catalyst warm-up mode ignition timing and the increase quantity of the fuel injection are determined on the basis of a standard fuel (light fuel, for example), the use of a nonstandard fuel (such as heavy fuel) could make the combustion unstable, and the unstable combustion could cause unpleasant vibrations, an increase of HC, and an engine stall in an extreme case.

If, for example, the actual temperature of the intake air is not equal to a standard temperature though the increase quantity of the fuel injection is determined on the basis of the standard temperature, the quantity of wall flow fuel is varied. When the fuel wall flow quantity is increased, the fuel supply becomes insufficient and the air fuel ratio becomes lean. As a result, the combustion could become unstable, and the unstable combustion could cause unpleasant vibrations, an increase of HC, an engine stall. When the fuel wall flow quantity is decreased, the fuel supply quantity might become too much, resulting in excessive enrichment of the air-fuel ratio and deterioration of the fuel consumption.

Furthermore, the property of fuel affects the increasing rate of the engine rotational speed from cranking to the target idle speed. In the case of the light fuel, for example, the volatility of the light fuel acts to improve the combustion state, and hence the engine speed rises to the desired idle speed earlier than the idle attainment moment in the case of the heavy fuel.

Therefore, when the catalyst warm-up mode ignition timing, the fuel increase quantity and the timing of attainment of the desired target idle speed are adapted to the heavy fuel, for example, the control system might regard a later moment as the idle attainment moment in the case of the light fuel, and hence continue the initial fuel enrichment longer, resulting in deterioration of the fuel consumption, and elongation of time from cranking to convergence of the air-fuel ratio to a target ratio. When, on the other hand, the catalyst warm-up mode ignition timing, the fuel increase quantity and the timing of attainment of the desired idle speed are adapted to the light fuel, the control system might regard an earlier moment as the idle attainment moment in the case of the heavy fuel, and hence reduce the duration of the initial fuel enrichment, resulting in deficiency of the fuel, undesired vibrations due to unstable rotation and engine stall in a severe case.

It is an object of the present invention to provide engine control apparatus and/or process for controlling the engine rotational speed smoothly from cranking to a desired idle condition and promoting the warm-up of a catalyst, without causing undesired enleanment after attainment of the idle condition. It is another object of the present invention to provide engine control apparatus and/or process for preventing undesired engine vibrations, increase of HC and engine stall when a pressure condition such as atmospheric pressure is deviant from a standard pressure. It is still another object of the present invention to provide engine control apparatus and/or process for preventing undesired engine vibrations, increase of HC and engine stall when a temperature condition such as intake air temperature is lower than a standard temperature and for improving fuel consumption when the temperature condition is higher than the standard temperature. It is still another object of the present invention to provide engine control apparatus and/or process for preventing undesired engine vibrations and engine stall when a fuel property is different from a standard property. It is still another object of the present invention to provide engine control apparatus and/or process for detecting a moment of attainment of desired idle condition accurately, and converging the air-fuel ratio to a target ratio in an unchanged manner even when the fuel property is changed.

According to the present invention, an engine control apparatus for an internal combustion engine comprises a controller to retard an ignition timing from an engine starting mode timing for starting the engine to a catalyst warm-up mode timing for warming up an exhaust purifying catalyst for the engine, at an idle attainment moment at which an engine idling condition is reached; to regulate an intake air quantity for the engine at a prior time prior to the idle attainment moment so that intake air is supplied to the engine at the idle attainment moment in an amount to sustain the idling condition; and to increase a fuel injection quantity by an increase quantity during a period from the prior moment before the idle attainment moment until an intake settlement moment after the idle attainment moment.

Preferably, the controller may be further configured to set the increase quantity of the fuel injection quantity in accordance with a parameter representing a condition of one of the intake air and the fuel supplied to the engine.

The above-mentioned parameter may comprise at least one of a pressure condition, a temperature condition and a fuel property which are conditions affecting combustion of air-fuel mixture in a combustion chamber of the engine.

The controller may be configured to set the increase quantity of the fuel injection quantity in accordance with a pressure of the intake air supplied to the engine. The pressure of the intake air may be an atmospheric pressure. The engine control apparatus may further comprise a condition sensor in the form of a pressure sensor for sensing the pressure of the intake air.

The controller may be configured to set the increase quantity of the fuel injection quantity in accordance with a temperature condition of the engine. The temperature condition may be an intake air temperature or an engine temperature (such as an engine coolant temperature) at the time of start of the engine. The engine control apparatus may further comprise a condition sensor for sensing the temperature condition of the engine.

The controller may be configured to set the increase quantity of the fuel injection quantity in accordance with a fuel property of a fuel supplied to the engine (such as a heavy/light quality of the fuel). The engine control apparatus may further comprise a condition sensor for determining the fuel property of the fuel currently being used.

According to another aspect of the invention, an engine control process comprises: retarding an ignition timing of an engine from an engine starting mode timing, to a catalyst warm-up mode timing at an idle attainment moment at which an engine idling condition is reached; regulating an intake air quantity for the engine at a prior moment prior to the idle attainment moment; and increasing a fuel injection quantity for the engine by an increase quantity during a period from the prior moment until an intake condition settlement moment after the idle attainment moment.

Preferably, the engine control process may further comprise setting the increase quantity of the fuel injection quantity in accordance with a parameter representing a condition of the intake air or the fuel supplied to the engine.

According to still another aspect of the present invention, an engine control apparatus for an internal combustion engine comprises: first means for retarding an ignition timing from an engine starting mode timing to a catalyst warm-up mode timing at an idle attainment moment; second means for increasing an intake air quantity for the engine from a prior moment prior to the idle attainment moment so that intake air is supplied to the engine at the idle attainment moment in an amount to sustain the idling condition, and third means for increasing a fuel injection quantity by an increase quantity during a period from the prior moment before the idle attainment moment until an intake settlement moment at which an intake air condition settles down after the idle attainment moment. The engine control apparatus may further comprise fourth means for setting the increase quantity of the fuel injection quantity in accordance with a parameter representing a condition of the intake air or fuel supplied to the engine.

DETAILED DESCRIPTION OF THE INVENTION

Figure 1:
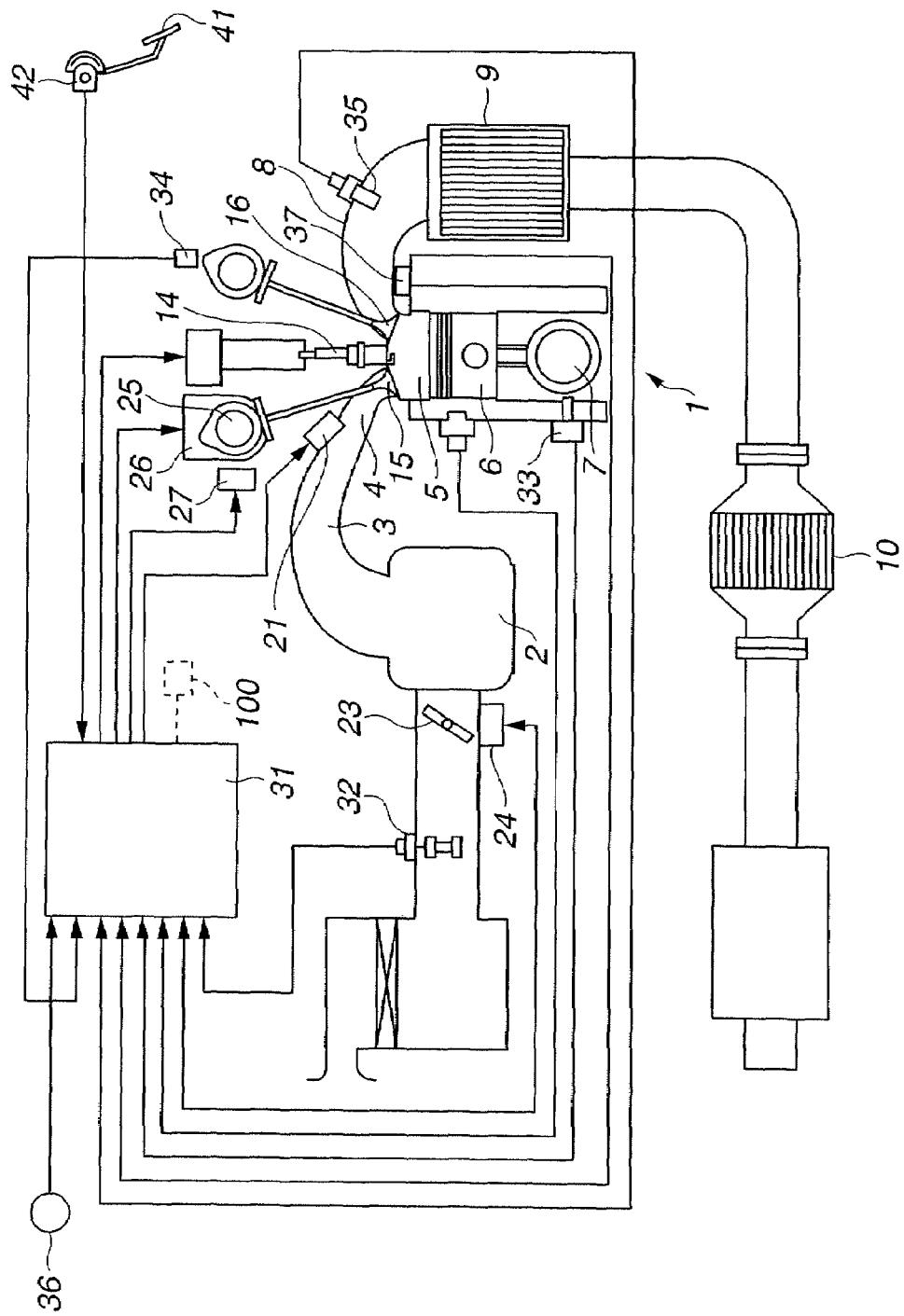
FIG. 1 is a schematic view showing an engine control system according to a first embodiment of the present invention.

FIG. 1 schematically shows an engine control system (or apparatus) according to a first embodiment of the present invention, for controlling an internal combustion engine of a vehicle, and specifically for controlling the engine at the time of an engine start.

Intake air in an amount regulated by a throttle valve 23 is accumulated in an intake collector 2, and then introduced into a combustion chamber 5 (of each cylinder, to be exact) through an intake manifold 3. Fuel is injected intermittently at a predetermined fuel injection timing, by a fuel injector 21 disposed in an intake port 4 (for each cylinder), into intake port 4. Injected fuel and intake air mix and form an air-fuel mixture. This air-fuel mixture is confined in combustion chamber 5 by closure of an intake valve 15, then compressed by ascent of a piston 6, and burnt by ignition of a spark plug 14. The combustion increases the gas pressure in combustion chamber 5, and forces the piston 6 to descend. The thus-produced reciprocating motion of piston 6 is translated into rotary motion of a crankshaft 7. Exhaust gases are discharged into an exhaust passage 8 by opening of an exhaust valve 16.

A first catalyst 9 (startup catalyst) and a second catalyst 10 are disposed in exhaust passage 8. First catalyst 9 is disposed in a collector portion of an exhaust manifold. Second catalyst 10 is disposed at a position under the floor of the vehicle. In this example, first and second catalysts 9 and 10 are both three-way catalytic converters. The three-way catalyst can remove HC, CO and NOx efficiently at the same time from the exhaust gas mixture when the air-fuel ratio of exhaust gas mixture is within a narrow range having the theoretical air-fuel ratio at the middle. Therefore, an engine controller 31 receives signals from an air flowmeter or air flow sensor 32 for sensing an intake air quantity, and a crank angle sensor (composed of a position sensor 33 and a phase sensor 34); determines a basic fuel injection quantity for fuel injector 21 in accordance with these signals, and controls the air-fuel ratio in a feed-back control mode in accordance with a signal from an oxygen ($O_2$) sensor 35 disposed on the upstream side of first catalyst 9.

At the time of cold start of the engine, in order to activate the catalysts fast and enable the feedback control by activating oxygen sensor 35 fast, this control system heats the oxygen sensor 35 with a heater (not shown) from a moment immediately after the start of the engine; monitors the signal of oxygen sensor 35, and starts the feedback control when oxygen sensor 35 is judged to be activated.

The construction of catalyst 9 and 10 is not limited to the construction of this example. In the case of an engine operated at the air-fuel ratio leaner than the theoretical ratio in a lower load operating region to improve the fuel consumption after engine warm-up, for example, the second catalyst 10 may be an NOx trap catalyst arranged to absorb NOx produced in the lean operation, and to have the function of a three-way catalyst.

Throttle valve 23 of this example is driven by a throttle motor 24. A torque demanded by a driver is represented by a depression quantity (accelerator opening degree) of an accelerator pedal 41. Therefore, an accelerator sensor 42 senses the position of accelerator pedal 41. Engine controller 31 determines a desired target torque in accordance with a signal from accelerator sensor 42, and further determines a desired target air quantity to achieve the target torque. To achieve the thus-determined desired air quantity, a throttle valve actuating device (not shown) regulates the opening degree of throttle valve 23 through throttle motor 24.

In this example, there are further provided a variable valve lift mechanism 26 and a valve timing control mechanism 27. Variable valve lift mechanism 26 is a multilink mechanism to vary the valve lift (quantity) of intake valve 15 continuously. Valve timing control mechanism 27 is arranged to advance or retard the opening and closing timing of intake valve 15 by continuously varying a rotational phase difference between the crankshaft 7 and an intake valve cam shaft 25.

Figure 2:
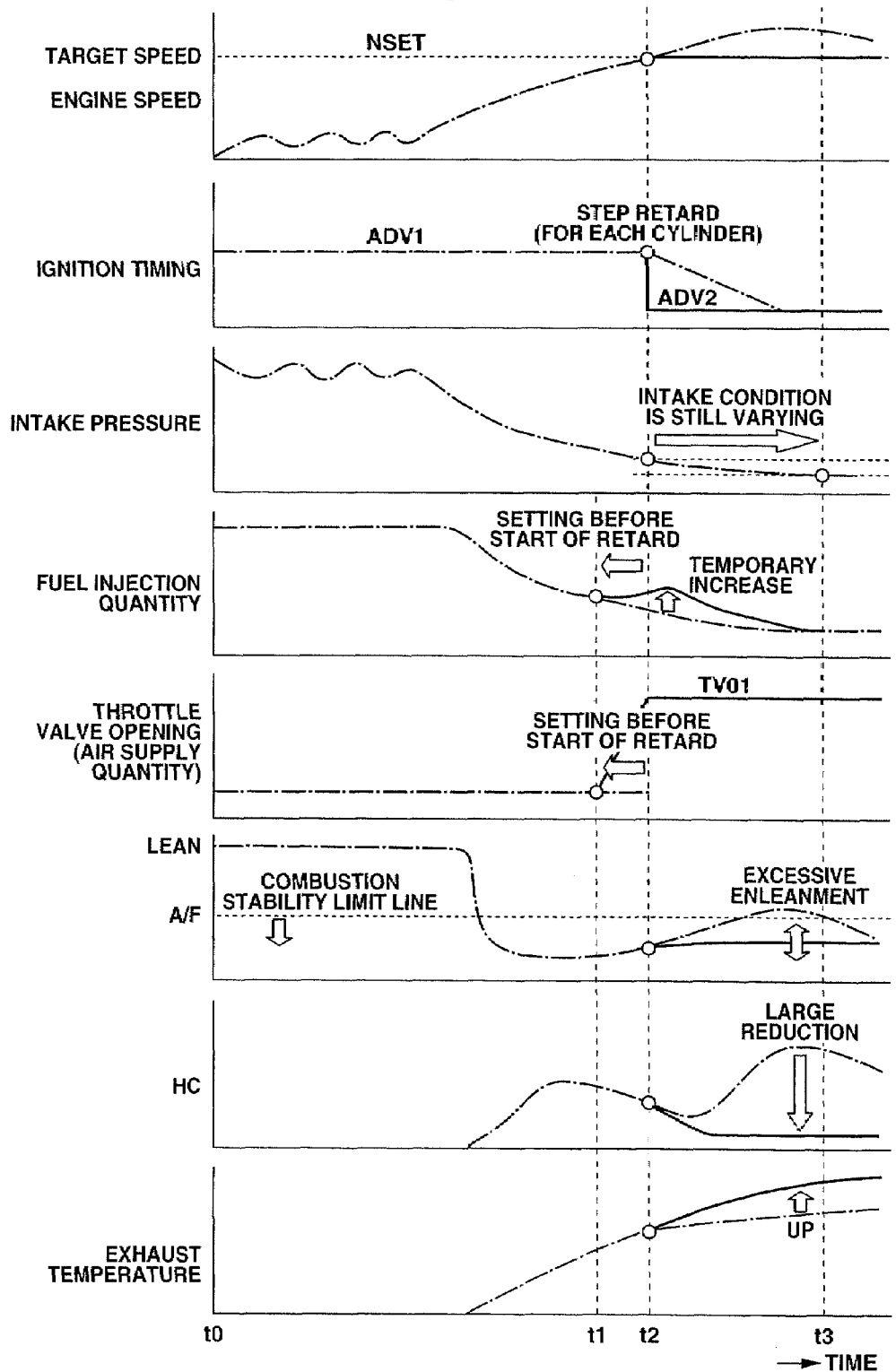
FIG. 2 is a time chart showing various waveforms for illustrating operations of the control system according to the first embodiment.

The ignition timing is retarded so as to increase or boost the engine rotational speed satisfactorily from cranking in a cold state, and to rapidly warm the first catalyst 9 in particular. FIG. 2 illustrates this operation in the case of a four cylinder engine in the form of a time chart having 8 tiers for the engine speed, ignition timing, intake pressure, fuel injection quantity, throttle opening (degree), air-fuel ratio (A/F), HC, and exhaust temperature.

Explanation is first directed to a control system of a first comparative example. In the first comparative example (1ST COMPARATIVE), as shown by a one-dot chain line in the uppermost first tier in FIG. 2, the engine rotational speed is fluctuated in conformity with first explosions in three of the four cylinders from a moment (or point in time) t0 at which a starter switch for starting the engine is turned from OFF to ON. Then, the engine rotational speed increases steeply by explosion in the fourth cylinder, intersects a level of a desired target idle rotational speed NSET at a moment t2 (corresponding to an idle attainment moment which, in this example, is a target idle speed attainment moment), and further increases beyond target idle speed NSET as shown by a one-dot chain line. At the target idle speed attainment moment t2 at which the engine rotational speed reaches target idle speed NSET, the throttle valve opening degree TVO is increased, like a step, to a predetermined degree TVO1, as shown by a one-dot chain line in the fifth tier in FIG. 2, to supply, to combustion chamber 5, the intake air in an amount to hold the engine speed at target idle speed NSET.

At an initial stage of the cold start operation, all the injected fuel is not introduced into combustion chamber 5, but part of the injected fuel adheres to the wall surface of intake port 4 and the backside of the head of intake valve 15 and forms a fuel wall flow, resulting in a lag in the fuel supply to combustion chamber 5. Therefore, the fuel is injected in excess, as shown by a one-dot chain line in the fourth tier of FIG. 2, during a period during which much of the fuel is taken for forming the wall flow at the initial stage of the engine starting operation. Then, the fuel injection quantity is decreased gradually from a moment when the formation of wall flow becomes uninfluential.

In the first comparative example, as shown by a one-dot chain line in the second tier of FIG. 2, the ignition timing is set at a first timing ADV1 for engine starting from moment t0. From target idle speed attainment moment t2, the ignition timing is gradually varied to a second timing ADV2 to retard the ignition timing largely to accelerate the warm-up of first catalyst 9.

After moment t2 at which the engine rotational speed reaches target idle speed NSET, it is desirable to control the engine speed Ne so as to settle down to desired target idle speed NSET rapidly without unwanted overshoot from the viewpoint of fuel economy because the fuel consumption is increased by the increase of the engine rotational speed beyond desired target idle speed NSET.

Moreover, it is desirable to control the actual air-fuel ratio to the theoretical ratio after moment t2 because first catalyst 9 after the warm-up can purify the three harmful components (HC, CO, NOx) simultaneously only when the air-fuel ratio is within the narrow range around the theoretical ratio.

Therefore, a control system of a first control example is devised to change the ignition timing from first timing ADV1 to second timing ADV2 in the form of a step change, as shown by a solid line in the second tier of FIG. 2, at target idle speed attainment moment t2 at which engine speed Ne reaches target idle speed NSET, and to start increasing the opening degree of throttle valve 23, as shown by a solid line in the fifth tier of FIG. 2, at such a prior moment t1 which is a predetermined interval prior to moment t2 as to supply the intake air to combustion chamber 5 in an amount to hold engine speed Ne at desired target idle speed NSET from moment t2 in consideration of a lag of the intake air quantity due to a distance from the position of throttle valve 23 to combustion chamber 5.

Experiments based on this control system of the first control example have shown that this control system can effectively prevent engine speed Ne from being further increased beyond target idle speed NSET, as intended. However, though, as shown by a one-dot chain line in the sixth tier of FIG. 2, the actual air-fuel ratio is controlled to the theoretical (stoichiometric) ratio at moment t2 of attainment of target idle speed NSET, the actual air-fuel ratio is thereafter made lean beyond a stable combustion limit line and this excessive enleanment causes an increase of HC as shown by a one-dot chain line in the seventh tier of FIG. 3.

Experiments conducted on the assumption that the fuel wall flow is a main cause for this have revealed that the intake pressure continues decreasing even after moment t2 at which engine speed Ne reaches target idle speed NSET as shown in the third tier of FIG. 2. The fuel quantity of the wall flow on the intake port wall depends on the pressure (the intake pressure, that is) in a region of the wall flow and the intake air flow speed (the intake air speed in intake port 4) in the region of the wall flow. The fuel wall flow quantity becomes smaller as the intake pressure becomes lower (because the vaporization characteristic of the fuel becomes better as the intake pressure becomes lower). The fuel wall flow quantity becomes smaller as the intake air speed becomes higher (because the vaporization characteristic of the fuel becomes better as the intake air speed becomes higher). Therefore, the fuel wall flow quantity is greater at moment t2 at which the intake pressure and the intake air flow speed in intake port 4 are still varying, and the fuel wall flow quantity becomes smaller at a moment t3 at which the intake pressure and the intake air flow speed have settled down in a predetermined range. Since the quantity of fuel flowing into combustion chamber 5 includes this wall flow quantity, too. Therefore, the continuation of decrease of the fuel wall flow quantity during the period between t2 and t3 means the continuation of decrease of the fuel flowing into combustion chamber 5. Therefore, it is assumed that the actual air-fuel ratio becomes leaner beyond the stable combustion limit in pace with the decrease of the fuel wall flow even though the air-fuel ratio is set equal to the theoretical ratio at moment t2.

Therefore, the control system according to the first embodiment is arranged to perform the following three operations.

(1) The control system changes the ignition timing from first timing ADV1 (adapted for engine starting) to second timing ADV2 (adapted for accelerating the catalyst warm-up) like a step change, as shown by a solid line in the second tier of FIG. 2, at moment t2 at which engine speed Ne reaches target idle speed NSET, to restrain a boost of the engine speed beyond target idle speed NSET while accelerating the warm-up of first catalyst 9. The idle state is a state in which the accelerator pedal is not depressed by the driver. Desired target idle speed NSET is determined adequately so as to best fit the idling state. This operation can be referred to as a step retard (or retardation) of the ignition timing.

(2) In order to hold engine speed Ne at target idle speed NSET from the target idle speed attainment moment t2, the control system supplies the intake air in the amount to sustain target idle speed NSET and finishes this supply of the intake air into combustion chamber 5 at moment t2. Throttle valve 23 for regulating the quantity of intake air is located in the intake passage at the position upstream of intake collector 2, and hence the distance/velocity lag or transportation lag between the throttle valve position and combustion chamber 5 is taken into account. Thus, the control system starts opening the throttle valve 23 in advance at prior moment t1 prior to moment t2 so that the interval of time between t1 and t2 is set to a predetermined value, and increases the throttle valve opening degree TVO until the predetermined degree TVO1 is reached at moment t2. In the example of FIG. 2, the throttle valve opening is held constantly at the predetermined value TVO1 after moment t2. This operation can be referred to as a preliminary increase of the intake sir supply quantity.

(3) Although engine speed Ne settles down at desired target idle speed NSET by the step retardation of the ignition timing at the target idle speed attainment moment t2, the air-fuel ratio tends to become excessively lean because of a decrease in the fuel wall flow quantity caused by variation in the intake pressure and the intake air speed immediately after t2. As a result, the amount of HC tends to increase (or engine speed Ne tends to become lower than target idle speed NSET). Therefore, in order to prevent the increase of HC, as shown by a solid line in the fourth tier of FIG. 2, the control system according to the first embodiment increases the fuel injection quantity temporarily so as to compensate for the decrease of the fuel wall flow during a period from moment t1 at which the increase of throttle valve opening is started, to moment t3 at which the intake pressure and intake air flow speed in the intake port settle down and become steady. This operation can be referred to as a temporary increase of the fuel injection quantity or a temporary enrichment.

Figure 3:
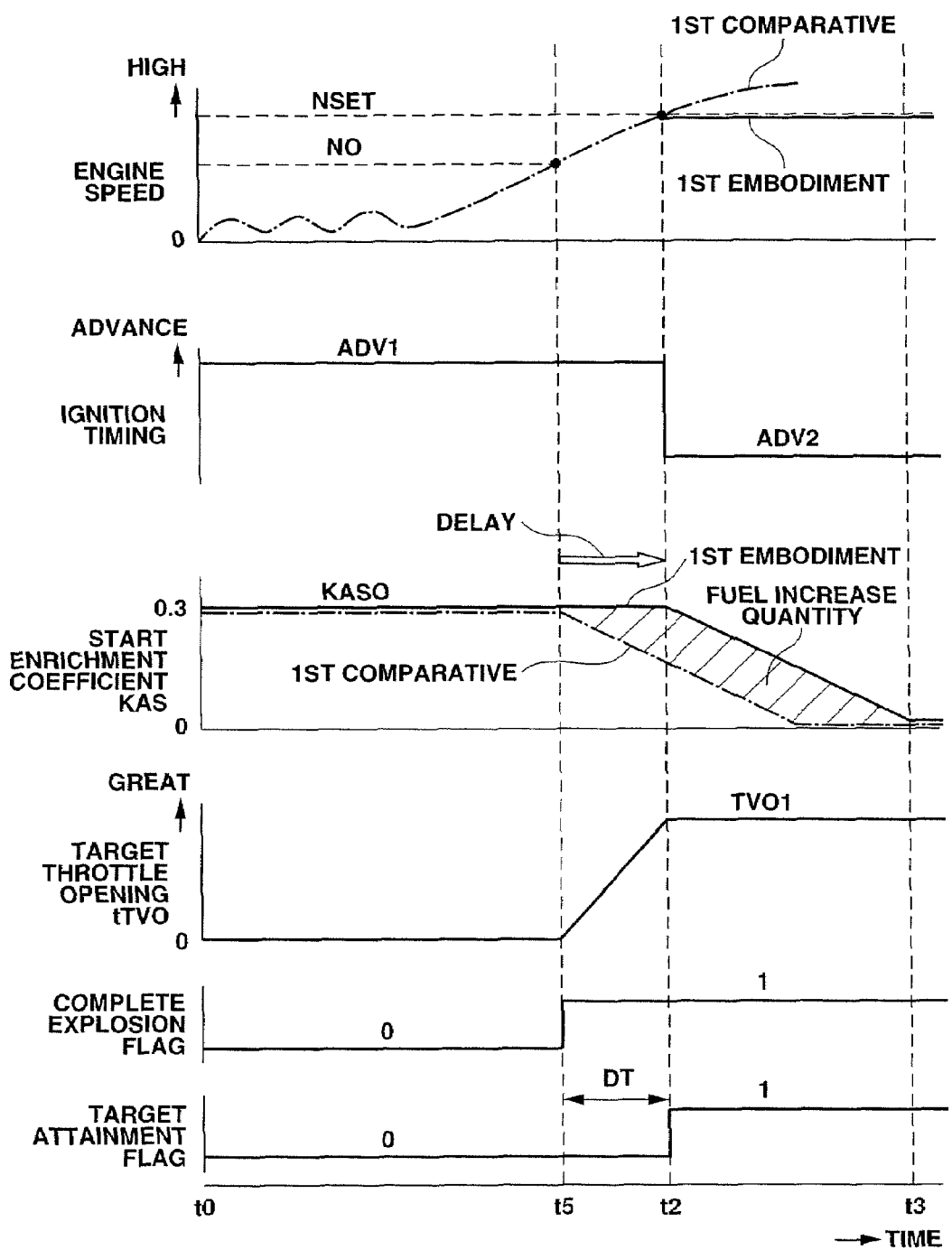
FIG. 3 is a time chart showing various waveforms for illustrating a control process according to the first embodiment.

In order to perform the third operation on the basis of the first comparative example, the control system of the first embodiment uses a start enrichment coefficient (or after-start enrichment correction coefficient) KAS, as shown in FIG. 3. The first tier of FIG. 3 is substantially identical to the first tier of FIG. 2. The second tier of FIG. 3 shows the step retardation of the ignition timing in the first operation (1). The fourth tier of FIG. 3 shows the preliminary increase of the throttle valve opening by the second operation (2).

As shown by a one-dot chain line in the third tier of FIG. 3, the control system of the first comparative example (1ST COMPARATIVE) sets the tart enrichment coefficient KAS to an initial value KAS0 (0.3 in the illustrated example) at the start moment t0 at which the starter switch 36 is turned on and starts decreasing the start enrichment coefficient KAS from initial value KAS0 toward zero at a predetermined rate of decrease at a moment t5 at which engine speed Ne reaches a predetermined speed No of complete explosion (lower than NSET). By contrast to the first comparative example, the control system according to the first embodiment holds start enrichment coefficient KAS at initial value KAS0 until the target idle speed attainment moment t2 (beyond t5), and starts decreasing the start enrichment coefficient KAS from initial value KAS0 toward zero at a predetermined rate of decrease at the moment t2, as shown by a solid line in the third tier of FIG. 3. Thus, the timing to start decreasing the start enrichment coefficient KAS from initial value KAS0 is delayed from t5 to t2. By so doing, the control system of the first embodiment increases the fuel injection quantity by an amount corresponding to the area of a region hatched in the third tier of FIG. 3, and prevents the air-fuel ratio from becoming lean beyond the stable combustion limit.

Thus, by delaying the timing of decreasing the start enrichment coefficient KAS from initial value KAS0 from t5 to t2 (thereby increasing the fuel injection quantity temporarily), the control system can control the actual air-fuel ratio at the theoretical ratio. That is, start enrichment coefficient KAS (the fuel increase quantity by which the quantity of the fuel injected from fuel injector 21 is increased) is so set as to make the actual air-fuel ratio obtained by the temporary increase of the fuel injection quantity, equal to the theoretical ratio.

In the example shown in FIG. 3, the start enrichment coefficient KAS is held constant at KAS0 during the period between t5 and t2, and then decreased linearly. However, the temporal enrichment of this embodiment is not limited to this pattern shown in FIG. 3. It is possible to vary the start enrichment coefficient KAS in various patterns so as to transiently increase the fuel injection quantity in the interval from the moment t5 of start of the opening of throttle valve 23 (before t2), to the moment t3 of attainment of steadiness or settlement of the intake pressure and the intake flow speed in the intake port (after t2). Moment t3 may be referred to as an intake (condition) settlement moment. This moment t3 is a moment at which an intake condition (the intake pressure and/or the intake air flow speed) settles down (the rate of change of the intake condition decreases and becomes within a predetermined range).

In the example shown in FIG. 3, the temporal increase of the fuel injection quantity is achieved by delaying the start of decreasing the start enrichment coefficient KAS from the initial value KAS0, from t5 to t2. However, it is possible to achieve the intended temporary enrichment in various ways. For example, it is possible to employ an additional enrichment coefficient, in addition to start enrichment coefficient KAS, and to vary the additional enrichment coefficient so as to transiently increase the fuel injection quantity in the interval from the moment t5 of start of the opening of throttle valve 23, to the time t3 of attainment of steadiness of the intake pressure and the intake flow speed in the intake port after the moment t2 of attainment of target idle speed NSET.

In the example of FIG. 3, the moment for starting to open throttle valve 23 is set at moment t5 of attainment of the complete explosion speed N0. However, this embodiment is not limited to this.

As mentioned above, the feedback air-fuel ratio control is started at the time at which the O2 sensor 35 is activated. However, it is preferable to stop the temporary enrichment of the third operation (3) and restore the operation of the first comparative example if the moment to start the feedback air-fuel control is reached before the time t3 of attainment of steadiness of the intake pressure and the intake flow speed in the intake port, after the time t2 of attainment of target idle speed NSET. This is because the execution of the feedback air-fuel ratio control can contain the actual air-fuel ratio in the narrow range around the theoretical ratio, and thereby prevent the excessive enleanment.

Engine controller 31 performs the following start control process as shown in flowcharts of FIGS. 4~7.

Figure 4:
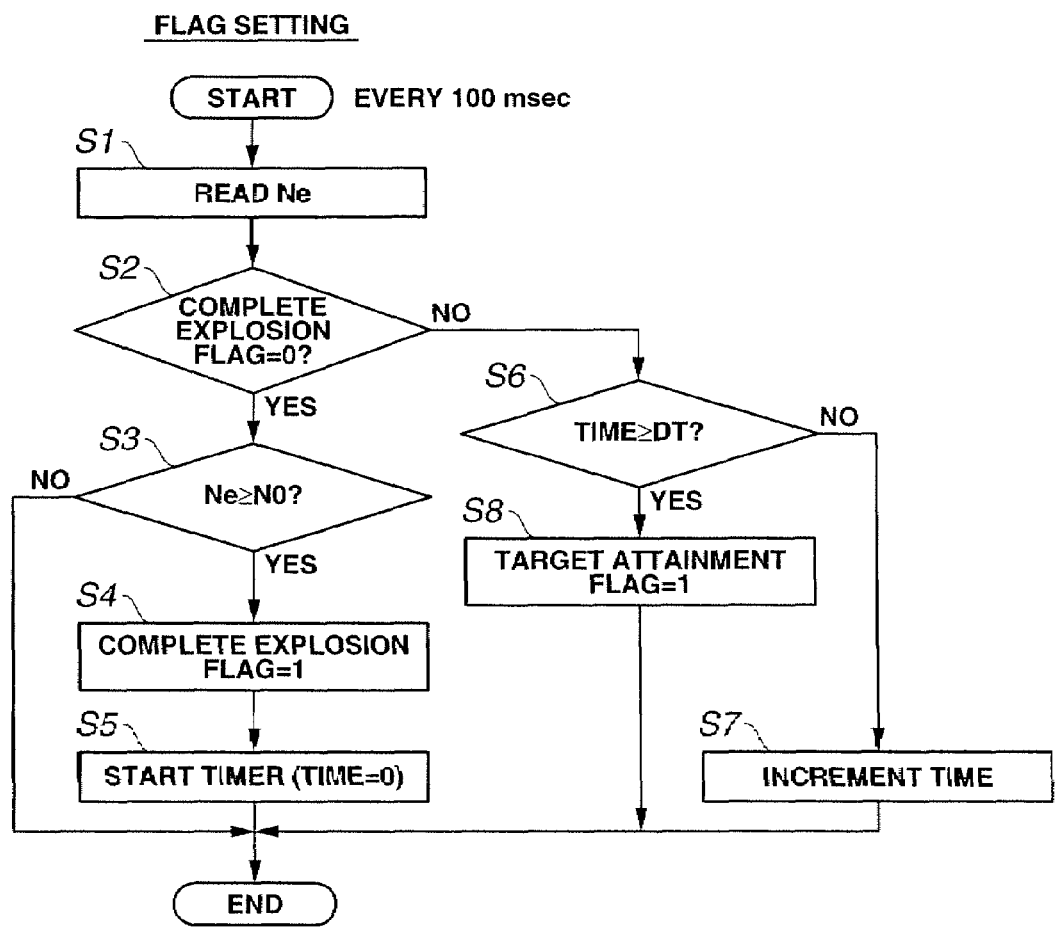
FIG. 4 is a flowchart of a process for setting a complete explosion flag and an idle attainment flag in the control process according to the first embodiment.

FIG. 4 shows a process for setting a complete explosion flag and a target idle speed attainment flag, performed at regular time intervals (of 100 ms, for example).

At a step S1, controller 31 reads engine rotational speed Ne. Engine rotational speed Ne is calculated from the signals of crank angle sensor (33, 34).

At a step S2, controller 31 checks the complete explosion flag. This complete explosion flag is a flag initialized to zero at the time of turn-on of an ignition switch (not shown) from OFF to ON. Therefore, the complete explosion flag is initially set to zero, and hence controller 31 proceeds from S2 to a step S3. At step S3, controller 31 compares engine rotational speed Ne with a complete explosion speed N0 (1000 rpm in this example) which is preliminarily determined. The current execution of the process shown in FIG. 4 is ended directly if engine rotational speed Ne has not yet reached complete explosion speed N0.

When engine rotational speed Ne reaches complete explosion speed N0 (Ne≧N0), then controller 31 proceeds from S3 to a step S4, and sets the complete explosion flag to one to indicate the attainment of complete explosion speed N0.

At a step S5 following S4, controller 31 starts a timer which is initially set to zero (TIME=0). This timer is for measuring an elapsed time from the moment (t5) of attainment of complete explosion speed N0.

From the next execution of FIG. 4, controller 31 proceeds from S2 to a step S6 because the complete explosion flag is set to one. At step S6, controller 31 compares the timer (TIME) with a predetermined value DT. The predetermined value DT is a time interval from the moment of attainment of complete explosion speed N0, to the moment of attainment of the target idle speed NSET (cf. FIG. 3), and predetermined value DT is preliminarily determined. While the timer (TIME) is smaller than predetermined value DT, the controller 31 proceeds from S6 to a step S7, and increments the timer by an amount corresponding to the control cycle time (100 ms).

When the increment of S7 is repeated and the timer (TIME) becomes greater than or equal to predetermined value DT, then controller 31 proceeds from S6 to a step S8. At S8, controller 31 sets the target idle speed attainment flag to one to indicate that the target idle speed NSET is reached. The target attainment flag is a flag initially reset to zero at the time of turn-on of the ignition switch.

Figure 5:
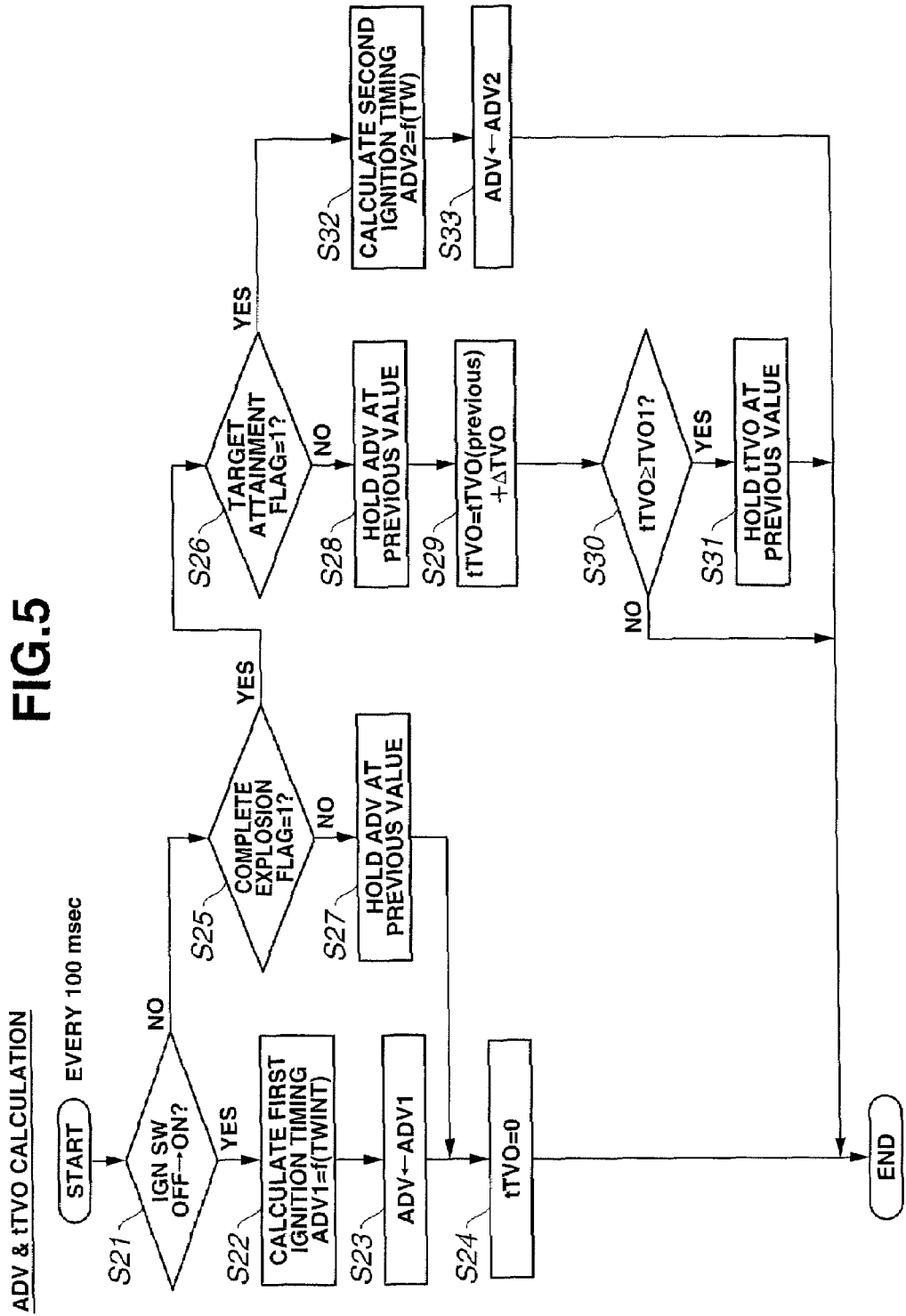
FIG. 5 is a flowchart of a process for calculating a command ignition timing command and a target throttle opening in the control process according to the first embodiment.

FIG. 5 shows a process for calculating a command ignition timing and a desired target throttle opening, which is performed, after the flow of FIG. 4, at regular time intervals (of 100 ms in this example).

At a step S21 of FIG. 5, controller 31 examines whether the ignition switch is turned on from OFF to ON, to detect the moment of turn-on of the ignition switch. When the ignition switch is just turn on, controller 31 proceeds from S21 to a step S22. At S22, controller 31 takes in a cooling water temperature TW sensed by a coolant temperature sensor 37, as a starting engine temperature (or starting coolant temperature) TWINT, and calculates a first ignition timing ADV1 in accordance with starting engine temperature TWINT. Then at a step S23, controller 31 sets the command ignition timing ADV equal to first ignition timing ADV1. This first ignition timing ADV1 is a starting ignition timing advanced largely, to suit the engine starting operation. At a step S24, controller 31 sets the target throttle opening tTVO to an initial value (zero or a minimum setting, for example).

When the ignition switch is in the on state after the turn-on from OFF to ON, then controller 31 proceeds from S21 to a step S25 and a step S26 to check the complete explosion flag and the target speed attainment flag (which are to be set in the process of FIG. 4). When the complete explosion flag is zero, controller 31 proceeds from S25 to a step S27. At S27, controller 31 holds the ignition timing ADV at a previous value which, in this case, is first ignition timing ADV1 calculated at S22 at the time of turn-on of the ignition switch. After S27, controller 31 proceeds to S24.

When the complete explosion flag is equal to one and at the same time the target speed attainment flag is zero, then controller 31 proceeds from S26 to a step S28. At S28, controller 31 holds the ignition timing ADV at the previous value which, in this case, is the first ignition timing ADV1 calculated at S22 at the time of turn-on of the ignition switch.

At a step S29 following S28, controller 31 calculates the desired target throttle opening tTVO according to the following equation.

$$tTVO = tTVO(\text{previous}) + \Delta TVO \quad (1)$$

In this equation, $\Delta TVO$ is a constant value, and tTVO(previous) is a previous value of target throttle opening tTVO. The constant value $\Delta TVO$ is a value determining an increase quantity per unit time (or a time rate of increase) of target throttle opening TVO. This constant value $\Delta TVO$ is so determined that target throttle opening tTVO reaches a later-mentioned predetermined opening value TVO1 when engine rotational speed Ne reaches target idle speed NSET (t2). The previous value tTVO(previous) of the target throttle opening is initially set to zero.

At a step S30 following S29, controller 31 compares the target throttle opening tTVO with the predetermined opening value TVO1. This predetermined opening value TVO1 is set to a throttle opening to provide a minimum intake air quantity required to produce a torque to sustain the target idle speed NSET. This value TVO1 is preliminarily determined by adaptation.

After the first execution of S29 in the current engine operation, target throttle opening tTVO is still smaller than predetermined value TVO1. Therefore, controller 31 terminates the process of FIG. 5 directly. The operation of S29 is repeated until the target speed attainment flag becomes equal to one, and the target throttle opening tTVO is increased gradually. Target throttle opening tTVO becomes greater than or equal to predetermined value TVO1 just before the target speed attainment flag is set to one. In this case, controller 31 proceeds from S30 to a step 531, and holds the target throttle opening tTVO equal to a previous value.

When the target speed attainment flag becomes equal to one, controller 31 proceeds from S26 to a step S32, and calculates a second ignition timing ADV2 in accordance with the current coolant temperature TW sensed currently by coolant temperature sensor 37. At a step S33 following S32, controller 31 sets the command ignition timing equal to second ignition timing ADV2.

The second ignition timing ADV2 is an ignition timing adapted to accelerate the warm-up of first catalyst 9 in the case of cold start operation. Second ignition timing ADV 2 is set on the retard side as compared to the ignition timing used after the completion of warm-up of first catalyst 9. Therefore, as shown in the second tier of FIG. 3, the ignition timing is changed, in the form of a step change, from first ignition timing ADV 1 to second ignition timing ADV2 at moment t2 at which engine speed Ne reaches target idle speed NSET.

The thus-determined command ignition timing ADV is transferred to an output register, and the primary current of an ignition coil is shut off at the moment when the actual crank angle coincides with the command ignition timing ADV.

The throttle valve actuating device receives the target throttle opening tTVO, and drives throttle motor 24 so that the actual throttle opening of throttle valve 23 becomes equal to target throttle opening tTVO.

Figure 6:
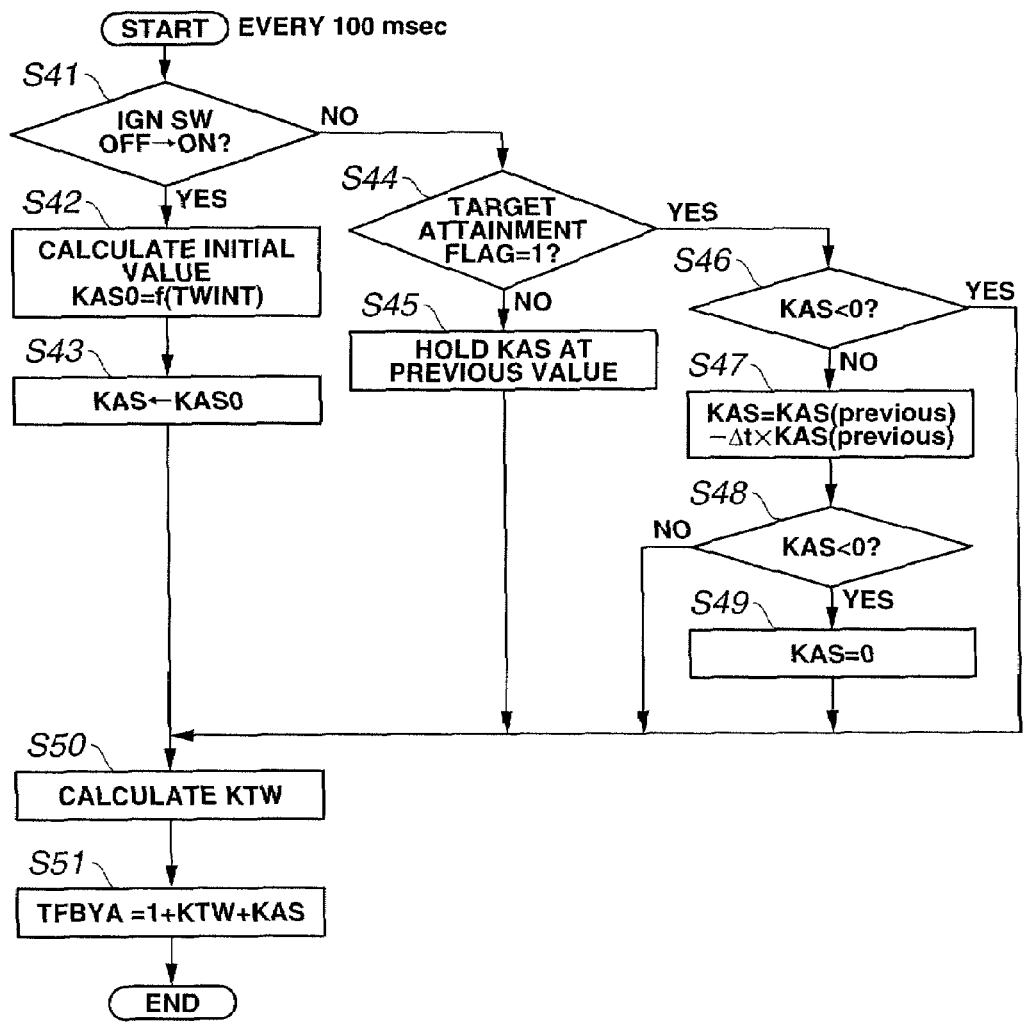
FIG. 6 is a flowchart of a process for calculating a target equivalence ratio in the control process according to the first embodiment.

FIG. 6 shows a process for calculating a target equivalence ratio TFBYA, performed at regular time intervals (of 100 ms in this example).

At a step S41 of FIG. 6, controller 31 examines whether the ignition switch is turned on from OFF to ON, to detect the moment of turn-on of the ignition switch. When the ignition switch is just turn on, controller 31 proceeds from S41 to a step S42. At S42, controller 31 calculates initial value KAS0 of start enrichment coefficient KAS in accordance with the starting engine temperature TWINT (engine coolant temperature in this example). Then at a step S43, controller 31 sets start enrichment coefficient KAS equal to the thus-calculated initial value KAS0. Initial value KAS0 of start enrichment coefficient KAS is a value which becomes greater as the starting coolant temperature TWINT is lower.

When the ignition switch is in the on state after the turn-on from OFF to ON, then controller 31 proceeds from S41 to a step S44 to check the target speed attainment flag (which is to be set in the process of FIG. 4). When the target speed attainment flag is zero, controller 31 proceeds from 44 to a step S45. At S45, controller 31 holds start enrichment coefficient KAS at a previous value which, in this case, is initial value KAS0 calculated at S42 at the time of turn-on of the ignition switch.

When the target idle speed attainment flag becomes equal to one, then controller 31 proceeds from S44 to a step S46. At S46, controller 31 compares start enrichment coefficient KAS with zero. At the moment when the target attainment flag becomes equal to one, start enrichment coefficient KAS is greater than zero (because of initial value KAS0). Therefore, controller 31 proceeds from S46 to a step S47.

At S47, controller 31 calculates start enrichment coefficient KAS according to the following equation.

$$KAS = KAS(\text{previous}) - \Delta t \times KAS(\text{previous}) \quad (2)$$

In this equation, $\Delta t$ is a constant value, and KAS(previous) is a previous value of KAS. The constant value $\Delta t$ is a value determining a decrease quantity per unit time (or time rate of decrease) of start enrichment coefficient KAS. This constant value $\Delta t$ is so determined by adaptation that KAS becomes equal to zero at moment t3 when the intake pressure settles down to a predetermined value (the rate of change of the intake pressure enters a predetermined range). Previous value KAS(previous) of start enrichment coefficient KAS is initially set to initial value KAS0.

While the target speed attainment flag is equal to one, the operation of S47 is repeated, and start enrichment coefficient KAS is decreased gradually. At a step S48 following S47, controller 31 compares start enrichment coefficient KAS with zero. When coefficient KAS becomes negative, then controller 31 proceeds from S48 to a step S49, and sets coefficient KAS to zero at S49.

Thus, from the moment t2 at which engine speed Ne becomes equal to target idle speed NSET, start enrichment coefficient KAS is decreased gradually from the positive initial value KAS0 to zero.

In the first comparative example, start enrichment coefficient KAS is decreased gradually from the moment t5 when engine speed Ne becomes equal to complete explosion speed N0 (<NSET). By contrast, the control system according to the first embodiment holds start enrichment coefficient KAS at the initial value until moment t2 of attainment of target idle speed NSET, and starts the gradual decrease of KAS at the moment t2 of attainment of target idle speed NSET.

Steps S50 and S51 are substantially the same as in the first comparative example. In the case of FIG. 6, step S50 is reached from S43, S45, S46 (in the case of YES), S48 (in the case of NO) or S49. At S50, controller 31 calculates a temperature enrichment coefficient KTW (or coolant temperature enrichment coefficient) in accordance with the current engine coolant temperature Tw sensed by coolant temperature sensor 37. Temperature enrichment coefficient KTW is a value becoming greater as coolant temperature Tw become lower.

At step S51, controller 31 calculates a target equivalence ratio TFBYA from temperature enrichment coefficient KTW and start enrichment coefficient KAS according to the following equation.

$$TFBYA = 1 + KTW + KAS \quad (3)$$

Target equivalence ratio TFBYA is a value in a range having 1.0 at the center. After the completion of engine warm-up, target equivalence ratio TFBYA becomes equal to 1 (TFBYA=1, KTW=0, KAS=0), to provide a mixture of the theoretical air-fuel ratio. At the time of cold start, target equivalence ratio TFBYA is increased beyond 1.0 by addition of the above-mentioned start enrichment coefficient KAS in consideration of the fuel wall flow quantity. Namely, though target equivalence ratio TFBYA is made greater than 1.0 in the case of cold start, the actual air-fuel ratio of the mixture is controlled to the theoretical ratio from the moment of attainment of target idle speed NSET.

Figure 7:
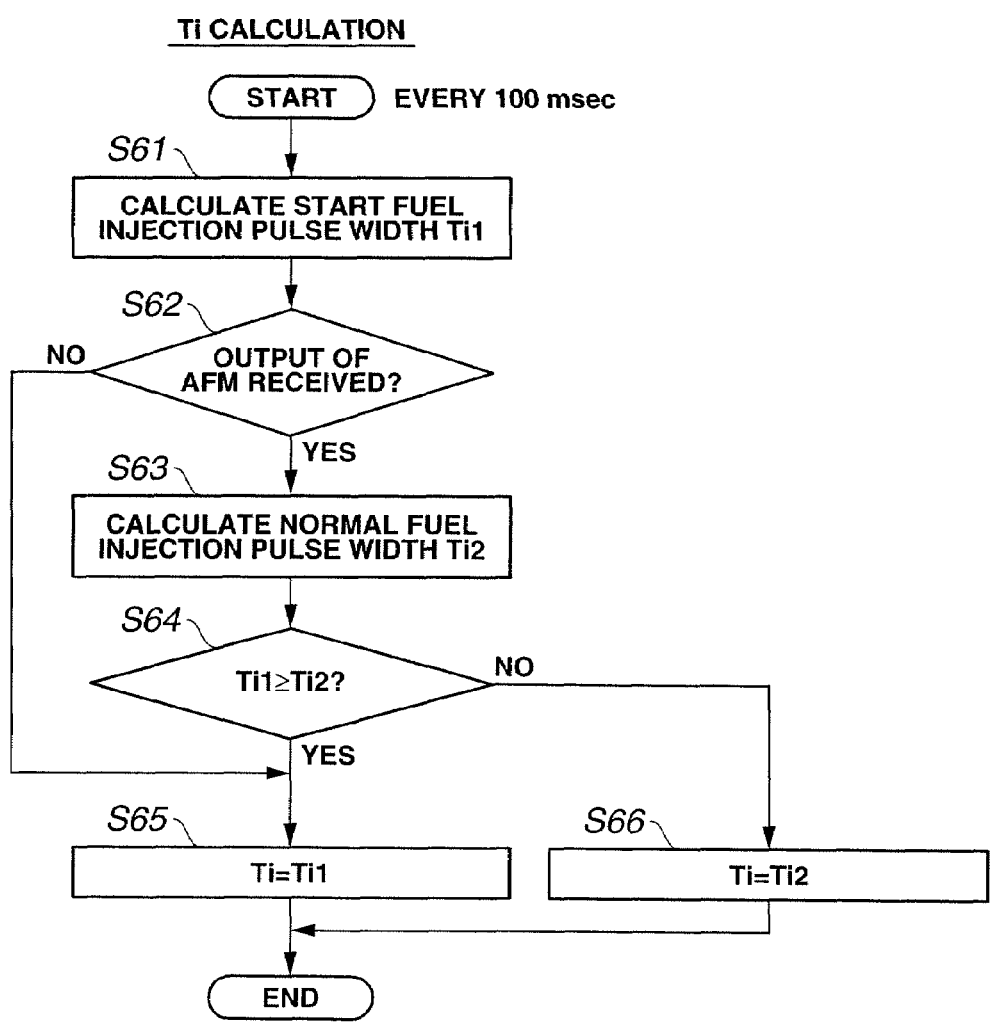
FIG. 7 is a flowchart of a process for calculating a fuel injection pulse width in the control process according to the first embodiment.

FIG. 7 shows a process for calculating a fuel injection pulse width Ti, performed at regular time intervals (of 100 ms, in this example), independently from the flow of FIG. 6. There is no substantial difference in the process of FIG. 7 per se between this embodiment and the first comparative example.

At a step S61 of FIG. 7, controller 31 calculates a start fuel injection pulse width Ti1 according to the following equation.

$$Ti1 = TST \times KNST \times KTST \quad (4)$$

In this equation (4), TST is a base start injection pulse width, KNST is a rotational speed correction coefficient, and KTST is a time correction coefficient. Technique for determining the base start injection pulse width TST, rotational speed correction coefficient KNST and time correction coefficient KTST is well known in the art, so that detailed explanation is omitted.

At a step S62 next to S61, controller 31 checks whether the output signal of air flowmeter (AFM) 32 is inputted or not. When the output signal of air flowmeter 32 is not inputted, controller 31 proceeds from S62 directly to a step S65 detouring steps S63 and S64, and set a final fuel injection pulse width Ti equal to start fuel injection pulse width Ti1 at S65.

When the output signal of air flowmeter 32 is inputted, controller 31 proceeds from S62 to step S63, and calculates a normal fuel injection pulse width Ti2 by using target equivalence ratio TFBYA obtained by the process of FIG. 6, according to the following equation.

$$Ti2 = (Tp \times TFBYA + \text{Kathos}) \times (a + am - 1) \times 2 + Ts \quad (5)$$

In this equation, Tp is a base injection pulse width, TFBYA is the target equivalence ratio, Kathos is a transient correction quantity, "a" is an air-fuel ratio feedback correction coefficient, am is an air-fuel ratio learning value, and Ts is an ineffective injection pulse width. Technique for determining the base injection pulse width Tp, transient correction quantity Kathos, air-fuel ratio feedback correction coefficient a, air-fuel ratio learning value am, and ineffective injection pulse width Ts is well known in the art.

For example, base injection pulse width Tp is calculated according to the following equation.

$$Tp = K \times Qa/Ne \quad (6)$$

where Qa is an intake air quantity calculated from the signal of air flowmeter 32, and K is a constant. By constant K, the air-fuel ratio of the air-fuel mixture is set to the theoretical ratio. Accordingly, the fuel injection quantity (fuel injection pulse width Ti) of fuel injector 21 is increased while start enrichment coefficient KAS is positive (greater than zero).

Transient correction quantity Kathos appearing in equation (5) is a quantity calculated basically in accordance with engine load, engine speed and a temperature at a fuel adhering portion, in consideration of the fuel wall flow on the wall of intake port 4. Accordingly, this transient correction quantity Kathos is considered to work so as to increase the fuel injection quantity by an amount corresponding to a quantity of fuel taken away as the wall flow from the fuel injection quantity. According to experiments, despite the transient correction quantity Kathos, the air-fuel ratio is made too lean as mentioned before. This is because transient correction quantity Kathos is determined without taking account of variation in the intake pressure and variation in the intake air flow speed in intake port 4.

At steps S64, S65 and S66, controller 31 compares the start fuel injection pulse width Ti1 and normal fuel injection pulse with Ti2 with each other, and selects a greater one as final fuel injection pulse width Ti.

Start enrichment coefficient KAS is used for fuel injection when normal fuel injection pulse width Ti2 is selected as final fuel injection pulse width Ti. More specifically, the control system according to the first embodiment is based on the condition that the normal fuel injection pulse width Ti2 has become greater than start fuel injection pulse width Ti1 immediately before moment t5 shown in FIG. 3.

The thus-determined final fuel injection pulse width Ti is transferred to an output register, and fuel injectors 21 of the cylinders are opened sequentially for a duration determined by the pulse width Ti.

The control system according to the first embodiment is operated to provide the following effects.

The control system performs (i) a step-like ignition timing retarding operation or step retardation (by steps S26 and S32 in FIG. 5) from first ignition timing ADV1 adapted for engine starting to second ignition timing ADV2 adapted for accelerating the catalyst warm-up at the idle attainment moment which, in this embodiment, is the target idle speed attainment moment (t2) at which engine speed Ne reaches target idle speed NSET, and (ii) a preliminary intake air quantity increasing operation (by steps S25, S26, S29, S30 and S31 in FIG. 5) started at the prior moment t1 the predetermined time interval DT prior to the target idle speed attainment moment t2 in consideration of a delay due to the distance from the throttle valve position to the combustion chamber of each cylinder, so as to secure the supply, to combustion chamber 5, of a sufficient amount of intake air to hold engine speed Ne at target idle speed NSET at the target speed attainment moment t2. Therefore, the control system according to the first embodiment can prevent a rise of engine speed Ne above target idle speed NSET and simultaneously raise the exhaust temperature more steeply after target idle speed attainment moment t2 (as shown by the solid line in the lowermost tier in FIG. 2). Thus, the control system can suppress undesired fuel consumption and at the same time shorten the catalyst activation time.

In this case, for a while after the target idle speed attainment moment t2, the intake pressure and intake air flow speed in intake port 4 may continue varying on the decreasing side toward smaller values. This variation of the intake condition could cause a decrease in the fuel wall flow quantity, resulting in a corresponding deficit of the fuel supply quantity to combustion chamber 5, and enleanment of the air-fuel ratio in the combustion chamber beyond the stable combustion limit. As a result, HC might be increased, and the engine speed might be decreased below target idle speed NSET. Therefore, the control system according to the first embodiment performs a temporary enrichment operation (by steps S44, S45 and S51) of increasing the fuel injection quantity of fuel injector 21 by using start enrichment coefficient KAS during the period starting from the moment (t1) of start of the opening of throttle valve 23, and ending at the moment t3 at which the intake condition such as the intake pressure and the intake air flow speed becomes steady and stable (at which the rate of change of the intake condition becomes smaller than a predetermined level) after moment t2 of attainment of target idle speed NSET. Therefore, the control system of the first embodiment can prevent an excessive enleanment of the air-fuel mixture in combustion chamber 5 beyond the stable combustion limit even if the intake pressure and/or the intake air flow speed continues decreasing after moment t2 of attainment of target idle speed NSET. Consequently, the control system of the first embodiment can prevent an undesired increase in HC and an undesired drop of engine rotational speed Ne after moment t2 of attainment of target idle speed NSET (as shown by the solid line in the seventh tier in FIG. 2).

FIGS. 8~14 are views for illustrating embodiments concerning an ambient pressure.

Figure 10A:
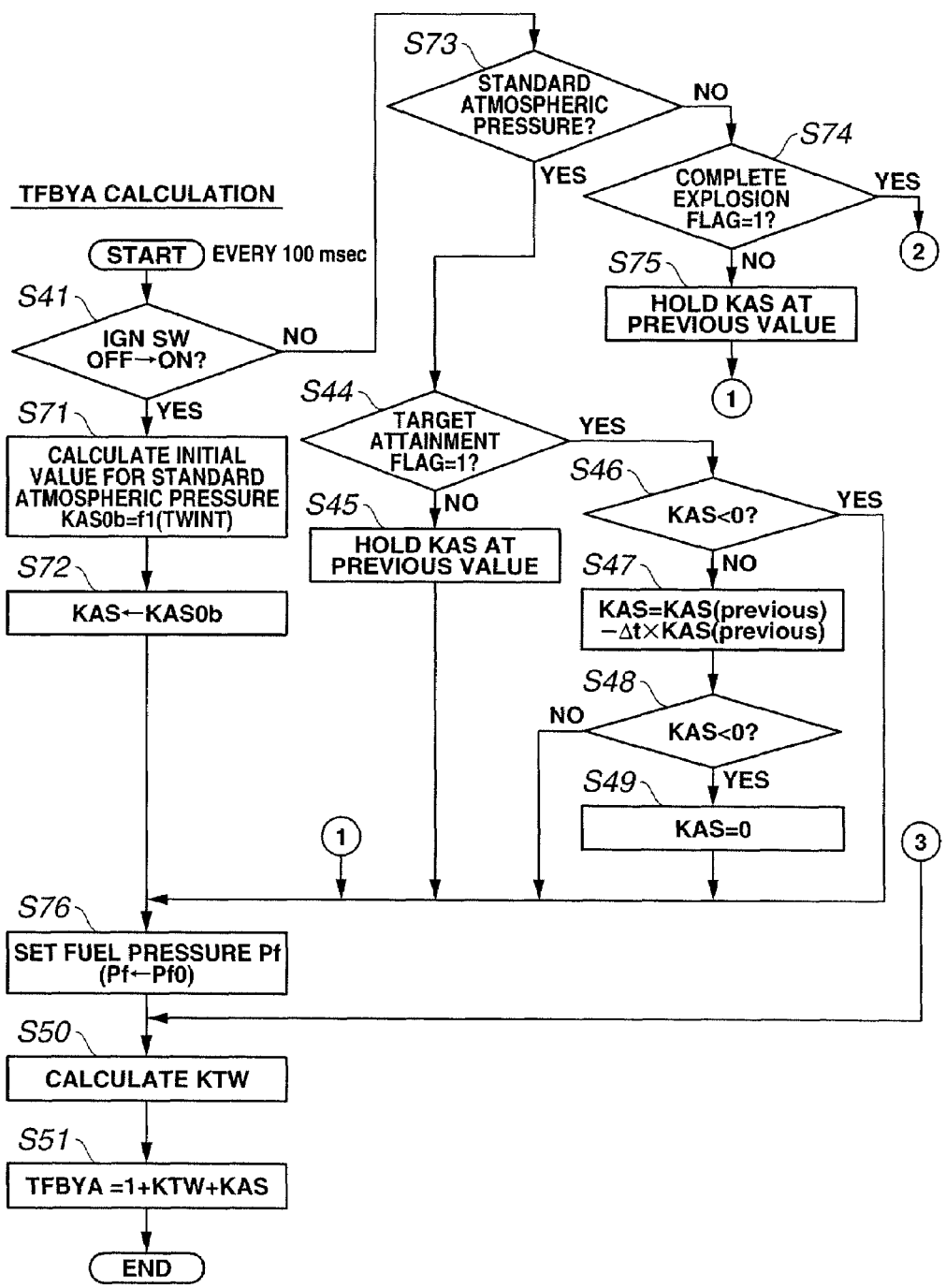
FIGS. 10A and 10B show a flowchart for calculating the target equivalence ratio in the control process according to the second embodiment.
Figure 10B:
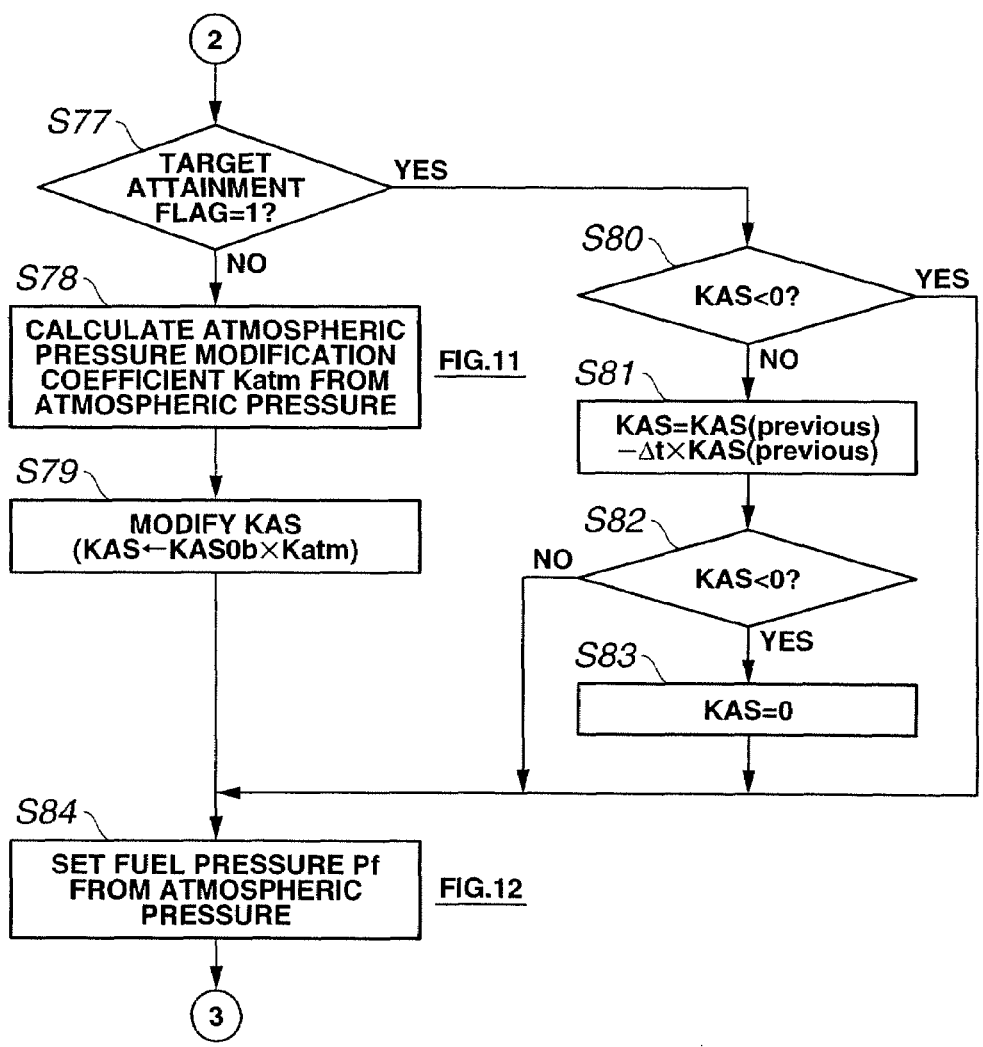

FIGS. 10A and 10B shows a control process according to a second embodiment of the present invention, to be substituted for FIG. 6 of the first embodiment. Steps having the same step numbers are substantially identical to the corresponding steps in FIG. 6.

In the first embodiment, no consideration is taken of environment or ambient conditions such as an atmospheric or ambient pressure condition (differences of the atmospheric pressure). When quantities (such as start enrichment coefficient KAS, base fuel injection pulse width Tp in equation (5), and transient correction quantity Kathos) which are relevant or influential to the stability of the idle rotational speed immediately after an engine start are set on the basis of the standard atmospheric pressure (1013 hPa), the ambient pressure condition deviating the standard pressure condition could exert undesired influence.

In a low pressure state, therefore, the control according to the first embodiment is not always satisfactory. In the low pressure state in which the atmospheric pressure is lower, as at a high altitude, than the standard atmospheric pressure, a fuel spray spreads from fuel injector 21 wider to a degree corresponding to the difference of the actual lower atmospheric pressure from the standard atmospheric pressure, and accordingly the fuel wall flow quantity increases, so that the supply of fuel to combustion chamber 5 is delayed, the quantity of fuel in combustion chamber 5 becomes insufficient, and the combustion becomes unstable. Because of the unstable combustion, the engine tends to produce unpleasant vibrations due to unstable rotation just after the target idle speed attainment moment t2, to increase HC, and to stall in some severe cases.

Similarly, in a high pressure state in which the atmospheric pressure is high because of an anticyclone, or a supercharger is operated in the case of a supercharged engine, the vaporization of fuel sprayed from fuel injector 21 becomes difficult to a degree corresponding to the actual higher pressure higher than the standard atmospheric pressure, and hence the fuel wall flow quantity increases on the intake port wall, so that the supply of fuel to combustion chamber 5 is delayed, the quantity of fuel in combustion chamber 5 becomes insufficient, and the combustion becomes unstable. Because of the unstable combustion, the engine tends to produce unpleasant vibrations due to unstable rotation just after target idle speed attainment moment t2, to increase HC, and to stall in some severe cases.

Figure 8:
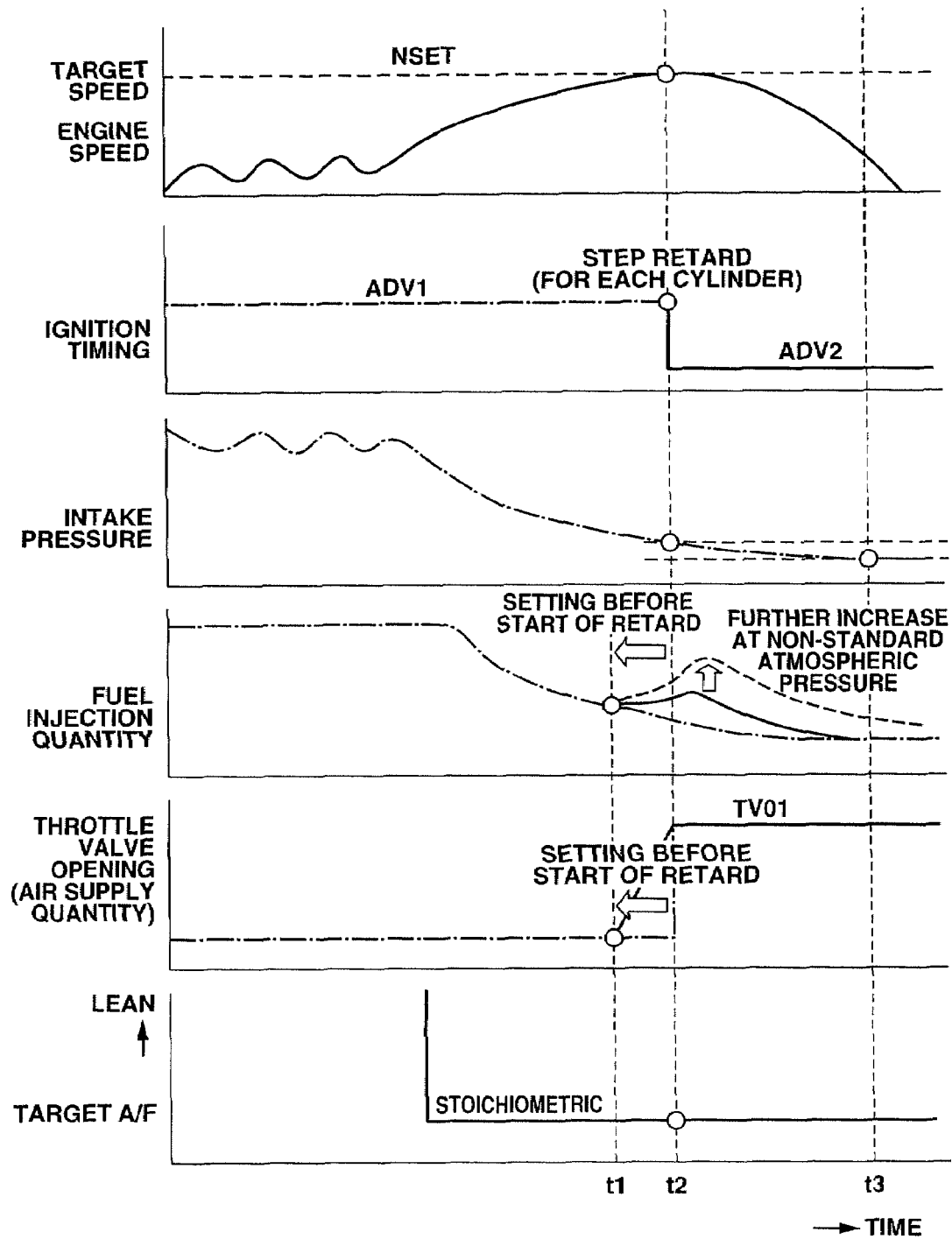
FIG. 8 is a time chart showing various waveforms for illustrating operations of a control system according to a second embodiment.

Therefore, the control system according to the second embodiment further increases the temporary fuel increase quantity of the fuel injection quantity in accordance with the actual atmospheric pressure higher or lower than the standard atmospheric pressure, as shown by a broken line in a fourth tier in FIG. 8. In this example, the temporary fuel increase quantity shown by a solid line in the fourth tier of FIG. 8 is determined in accordance with the standard atmospheric pressure (this solid line characteristic in the fourth tier of FIG. 8 is the same as the solid line characteristic in the fourth tier of FIG. 2). Therefore, the control system of the second embodiment increases the fuel injection quantity temporary by a standard fuel increase quantity as shown by the solid line in the fourth tier of FIG. 8 in the case of the standard atmospheric pressure condition, and increases the fuel injection quantity by a nonstandard fuel increase quantity as shown by the broken line in the fourth tier of FIG. 8 in the case of the nonstandard atmospheric pressure condition so that the nonstandard fuel increase quantity is greater than the standard fuel increase quantity. Specifically, as shown in a third tier in FIG. 9, the control system according to the second embodiment varies the start enrichment coefficient KAS in a standard pressure mode as shown by a solid line in the standard pressure state, and in a further enriching nonstandard pressure mode as shown by a two-dot chain line in the nonstandard pressure state. When the atmospheric pressure is at the standard level, the start enrichment coefficient KAS is held equal to a standard pressure initial value $KAS0b$ from moment t0 to target idle speed attainment moment t2. From moment t2, start enrichment coefficient KAS is decreased from $KAS0b$ at a predetermined decreasing rate until start enrichment coefficient KAS is reduced to zero at moment t3, as shown by the solid line in the third tier of FIG. 9. When the atmospheric pressure is outside a range of the standard atmospheric pressure level, the start enrichment coefficient KAS is increased from the standard pressure initial value $KAS0b$ to an increased initial value or nonstandard pressure initial value ($KAS0b \times Katm$; where Katm is greater than 1.0) at the moment t5. From t5 until t2, start enrichment coefficient KAS is held at this increased nonstandard pressure initial value ($KAS0b \times Katm$). Then, from t2, start enrichment coefficient KAS is decreased at a predetermined decreasing rate from the increased nonstandard pressure initial value ($KAS0b \times Katm$) until start enrichment coefficient KAS is reduced to zero at a moment after t3, as shown by the two-dot chain line in the third tier of FIG. 9. Thus, the control system according to the second embodiment increases the temporary fuel increase quantity (shown by the hatched area in the third tier of FIG. 3) when the atmospheric pressure is not at the standard pressure level. In this example, the actual atmospheric pressure is sensed by a condition sensor 100 (shown in FIG. 1) which, in this embodiment, includes an atmospheric pressure sensor (61 in FIG. 13).

The following explanation is directed mainly to steps of FIGS. 10A and 10B different from FIG. 6 of the first embodiment. When the ignition switch is turned from OFF to ON, controller 31 proceeds from step S41 to a step S71. At S71, controller 31 calculates the standard pressure initial value $KAS0b$ of start enrichment coefficient KAS in accordance with the starting engine temperature TWINT sensed by cooling water temperature sensor 37 (as in S42). Then, at a step S72, controller 31 sets start enrichment coefficient KAS equal to the thus-calculated standard pressure initial value $KAS0b$ (as in S43). Standard pressure initial value $KAS0b$ for the standard atmospheric pressure condition is so adapted that the air-fuel ratio determined by the amount of fuel in combustion chamber 5 becomes equal to the theoretical ratio at target idle speed attainment moment t2 when the atmospheric pressure is at the standard level.

At a step S76 following S72, controller 31 sets a fuel pressure Pf equal to a reference pressure Pf0. At the standard atmospheric pressure, part of fuel injected from fuel injector 21 forms a fuel wall flow by adhering to the wall of intake port 4 (or the backside of the head of intake valve 15), and thereby causes a delay in the supply of fuel to combustion chamber 5 from the start of the engine. Therefore, the reference fuel pressure Pf0 is so adapted as to prevent the air-fuel ratio of the mixture in combustion chamber 5 from exceeding the combustion stability limit to the lean side at the moment t2. In reality, due to variation of the intake air flow speed from t2 until t3, the actual air-fuel ratio may become lean beyond the combustion stability limit, at target idle speed attainment moment t2, as mentioned in the first embodiment.

At a step S73 reached in the case of the negative answer of S41, controller 31 checks the actual atmospheric pressure sensed by the atmospheric pressure sensor 61 (shown in FIG. 13), and examines whether the actual atmospheric pressure is within a predetermined allowable standard atmospheric pressure range having the standard atmospheric pressure at the center. When the actual atmospheric pressure is within this allowable standard pressure range, controller 31 proceeds from S73 to the program section of steps S44 to S49, and performs the same operations as in S44~S49 of FIG. 6.

In the nonstandard atmospheric pressure state in which the actual atmospheric pressure is not within the allowable standard atmospheric pressure range, controller 31 proceeds from S73 to a step S74 and checks the complete explosion flag. When the complete explosion flag is equal to zero (before the complete explosion speed N0 is reached), controller 31 proceeds from S74 to a step S75, and holds start enrichment coefficient KAS at the previous value (equal to the standard pressure initial value $KAS0b$). From S75, controller 31 proceeds to S76.

Figure 11:
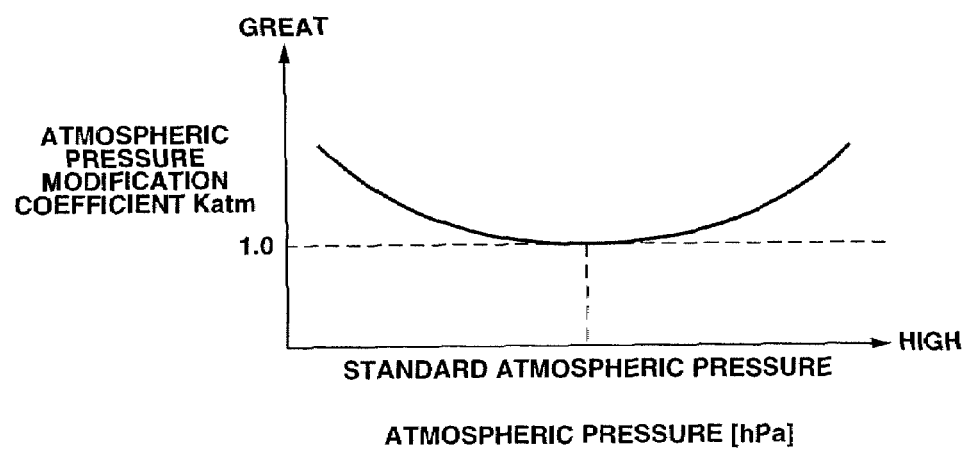
FIG. 11 is a characteristic view showing a pressure modification coefficient used in the control process according to the second embodiment.

When the complete explosion flag becomes equal to one, controller 31 proceeds from S74 to a step S77 shown in FIG. 10B, and checks the target attainment flag at S77. When the target attainment flag is zero (during a period (t5~t2) during which complete explosion speed N0 is reached, but target idle speed NSET is not yet reached), controller 31 proceeds from S77 to a step S78, and determines a pressure modification coefficient (or atmospheric pressure modification coefficient) Katm in accordance with the actual atmospheric pressure sensed by the atmospheric pressure sensor, by lookup from a table as shown in FIG. 11. At a next step S79, controller 31 determines a product ($KAS0b \times Katm$) by multiplying the standard pressure initial value $KAS0b$ (calculated at S71) by pressure modification coefficient Katm, and sets start enrichment coefficient KAS equal to the product ($KAS \leftarrow KAS0b \times Katm$) as a nonstandard pressure initial value of start enrichment coefficient KAS In this way, controller 31 modifies the start enrichment coefficient KAS to the enrichment direction, by changing the initial value from initial value $KAS0b$ for the standard pressure to the initial value ($KAS0b \times Katm$) for the nonstandard pressure at S79.

Atmospheric pressure modification coefficient Katm is equal to 1.0 when the actual atmospheric pressure is equal to the standard atmospheric pressure (1013 hPa), as shown in FIG. 11. Atmospheric pressure modification coefficient Katm is increased as the actual atmospheric pressure decreases below the standard atmospheric pressure, and atmospheric pressure modification coefficient Katm is also increased as the actual atmospheric pressure increases beyond the standard atmospheric pressure, as shown in FIG. 11.

In the low pressure state in which the actual atmospheric pressure is lower, as at a high altitude, than the standard atmospheric pressure, a fuel spray spreads from fuel injector 21 wider to a degree corresponding to the difference of the actual lower atmospheric pressure from the standard atmospheric pressure, and accordingly the fuel wall flow quantity increases, so that the supply of fuel to combustion chamber 5 is delayed, the quantity of fuel in combustion chamber 5 becomes insufficient, and the combustion becomes unstable. Therefore, the control system of the second embodiment increases the fuel supply quantity by making the pressure modification coefficient Katm greater than 1.0, and thereby prevent a deficit in the fuel in combustion chamber in spite of an increase of the fuel wall flow quantity. In the high atmospheric pressure state in which the actual atmospheric pressure is higher than the standard pressure, the vaporization of fuel sprayed from fuel injector 21 becomes difficult to a degree corresponding to the increase from the standard pressure to the actual higher pressure, and hence the fuel wall flow quantity increases on the intake port wall, so that the supply of fuel to combustion chamber 5 is delayed, the quantity of fuel in combustion chamber 5 becomes insufficient, and the combustion becomes unstable. Therefore, the control system of the second embodiment increases the fuel supply quantity by making the pressure modification coefficient Katm greater than 1.0, and thereby prevent a deficit in the fuel in combustion chamber in spite of an increase of the fuel wall flow quantity due to the high atmospheric pressure.

When the target attainment flag becomes equal to one (after target idle speed NSET is reached), controller 31 proceeds from S77 to a step S80, and compares start enrichment coefficient KAS with zero. At the moment when the target attainment flag becomes equal to one, start enrichment coefficient KAS is greater than zero (because of the nonstandard pressure initial value KAS0b×Katm). Therefore, controller 31 proceeds from S80 to a step S81.

At S81, controller 31 calculates start enrichment coefficient KAS for the nonstandard atmospheric pressure state, according to the following equation.

$$KAS = KAS(\text{previous}) - \Delta t \times KAS(\text{previous}) \quad (7)$$

In this equation, $\Delta t$ is a constant value, and KAS(previous) is a previous value of KAS. The equation (7) per se is identical to the equation (2). The constant value $\Delta t$ in the equation (7) is a value determining a decrease quantity per unit time of start enrichment coefficient KAS in the nonstandard atmospheric pressure state. This constant value $\Delta t$ is determined by adaptation. The previous value KAS(previous) of start enrichment coefficient KAS is initially set to the value KAS0b×Katm, unlike the equation (2).

While the target speed attainment flag is equal to one, the operation of S81 is repeated, and start enrichment coefficient KAS in the nonstandard atmospheric pressure state is decreased gradually. At a step S82 following S81, controller 31 compares start enrichment coefficient KAS with zero. When start enrichment coefficient KAS becomes negative, then controller 31 proceeds from S82 to a step S83, and sets start enrichment coefficient KAS to zero at S83.

Thus, from moment t2 at which engine speed Ne becomes equal to target idle speed NSET, the start enrichment coefficient KAS in the nonstandard atmospheric pressure state is decreased gradually to zero.

Figure 12:
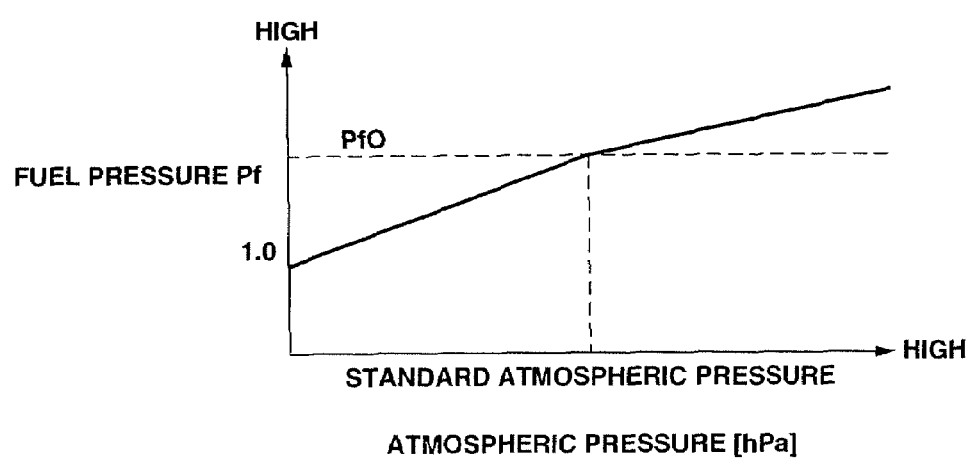
FIG. 12 is a characteristic view showing a fuel pressure in the control process according to the second embodiment.

At a step S84, controller 31 sets the fuel pressure Pf in the nonstandard atmospheric pressure state in accordance with the sensed actual atmospheric pressure by lookup from a table as shown in FIG. 12.

As shown in FIG. 12, fuel pressure Pf is set equal to reference fuel pressure value Pf0 in the standard atmospheric pressure state. Fuel pressure Pf is decreased from reference value Pf0 (linearly in this example) when the actual atmospheric pressure decreases below the standard pressure. Fuel pressure Pf is increased from reference value Pf0 (linearly in this example) when the actual atmospheric pressure increases beyond the standard pressure. In the example of FIG. 12, the slope is slightly more gradual in the atmospheric pressure region above the standard atmospheric pressure than in the substandard atmospheric pressure region below the standard atmospheric pressure.

In the low pressure state in which the actual atmospheric pressure is lower than the standard atmospheric pressure, a fuel spray spreads from fuel injector 21 wider to a degree corresponding to the difference of the actual lower atmospheric pressure from the standard atmospheric pressure, and accordingly the fuel wall flow quantity increases, resulting in a delay in the supply of fuel to combustion chamber 5, a deficit in the quantity of fuel in combustion chamber 5, and an instability in the combustion. Therefore, the control system of the second embodiment decreases the fuel pressure below the reference value Pf0 to suppress the spread of fuel spray, and thereby prevents a deficit in the fuel in combustion chamber by preventing an increase of the fuel wall flow quantity. In the high atmospheric pressure state in which the actual atmospheric pressure is higher than the standard pressure, the vaporization of fuel sprayed from fuel injector 21 becomes difficult, and hence the fuel wall flow quantity increases on the intake port wall, resulting in a delay in the supply of fuel to combustion chamber 5, a deficit in the quantity of fuel in combustion chamber 5, and an instability in the combustion. Therefore, the control system of the second embodiment increases the fuel pressure above reference value Pf0, and thereby promotes the atomization of injected fuel to prevent a deficit in the fuel in combustion chamber 5 by preventing an increase of the fuel wall flow quantity.

Figure 13:
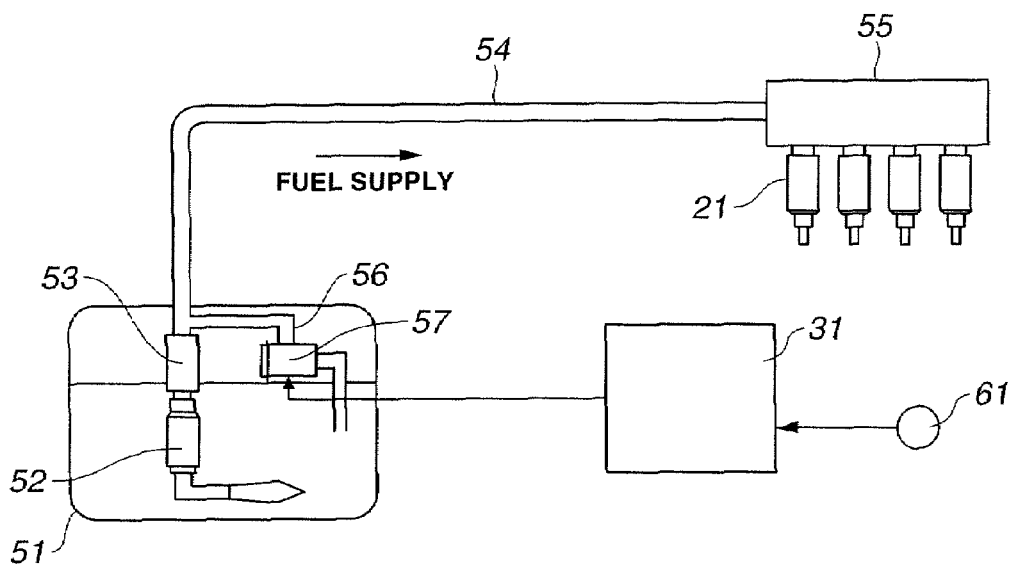
FIG. 13 is a schematic view of a returnless type fuel supply system which can be employed in the second embodiment.

FIG. 13 schematically shows a returnless type fuel supply system or device. From a fuel tank 51, fuel is drawn out under pressure by a fuel pump 52 through a fuel filter 53 to a fuel supply passage 54, and accumulated in a fuel rail 55. The fuel accumulated at a pressure in fuel rail 55 is distributed to fuel injectors 21 for the respective cylinders, and injected at a predetermined timing from each injector 21 into the corresponding intake port 4. In fuel tank 51, there is provided a return passage 56 branching off from supply passage 54 to return the fuel to fuel tank 51. In the return passage 54, there is provided a pressure regulator 57 for regulating the fuel pressure in fuel rail 55. The control system according to the second embodiment is arranged to control the fuel pressure in the fuel rail through pressure regulator 57 under the control of engine controller 31. Engine controller 31 receives a signal from atmospheric pressure sensor 61, and delivers a fuel pressure control signal to pressure regulator 57. By controlling pressure regulator 57 in this way, engine controller 31 of the second embodiment achieves the fuel pressure Pf set at step S76 in FIG. 10A or step S84 in FIG. 10B.

The fuel wall flow quantity is influenced by the ambient pressure. Both in the low atmospheric pressure state lower than the standard atmospheric pressure and in the high atmospheric pressure state higher than the standard atmospheric pressure, the fuel wall flow quantity increases as compared to the standard pressure state, so that the quantity of fuel in combustion chamber 5 becomes insufficient, and the air-fuel ratio is inclined to the lean side. Therefore, the control system of the second embodiment employs the pressure sensor 61 (pressure sensing means), and modifies the fuel injection quantity by modifying start enrichment coefficient KAS in accordance with the sensed actual pressure.

Figure 9:
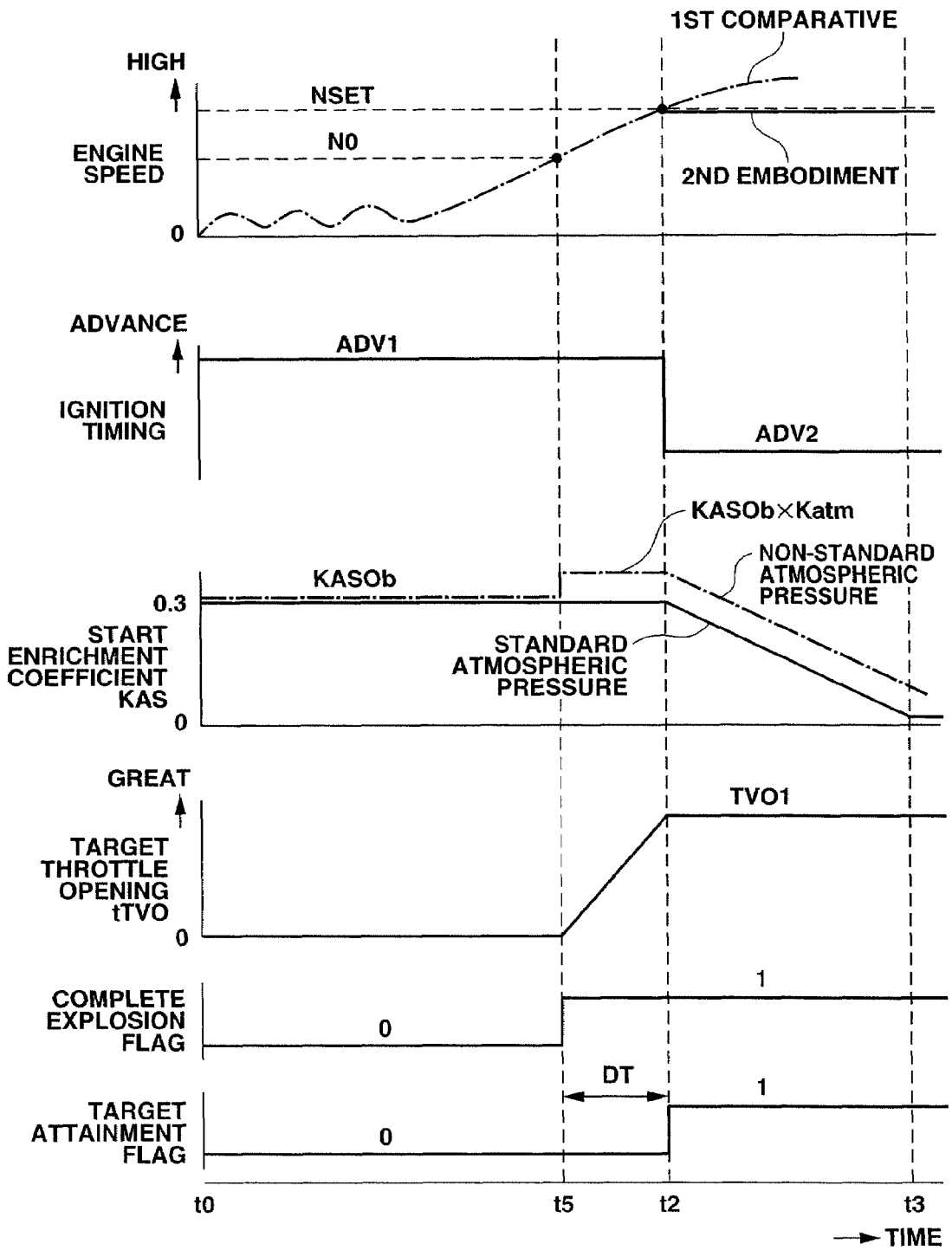
FIG. 9 is a time chart showing various waveforms for illustrating a control process according to the second embodiment.

In the nonstandard atmospheric pressure state in which the sensed atmospheric pressure is out of the standard range, the control system increases the temporary fuel increase quantity as shown by the broken line in the fourth tier in FIG. 8, from the standard increase quantity based on the standard atmospheric pressure, by modifying the start enrichment coefficient KAS to a greater value, as shown by the two-dot chain line in the third tier in FIG. 9 (steps S77~S83). Therefore, in addition to the effects obtained by the first embodiment, the control system of the second embodiment sets the temporarily increased fuel injection quantity in conformity with the increase of the fuel wall flow quantity in the nonstandard atmospheric pressure state, and thereby controls the air-fuel ratio adequately even in the nonstandard atmospheric pressure state, so that the control system can prevent engine stall, undesired vibrations just after a start of an engine, and an increase of HC.

When the actual atmospheric pressure is lower than the standard atmospheric pressure while the fuel pressure is set at the standard atmospheric pressure, a fuel spray spreads from fuel injector 21 wider, and accordingly the fuel wall flow quantity increases, resulting in a delay in the supply of fuel to combustion chamber 5, a deficit in the quantity of fuel in combustion chamber 5, and an instability in the combustion. Therefore, the control system of the second embodiment modifies the fuel pressure on the lower side below reference value Pf0 during the period during which the temporary fuel increase quantity is modified to the increase side by increasing KAS (see S84 in FIG. 10B, and FIG. 12). Therefore, the control system can suppress the spread of fuel spray, and thereby prevents a deficit in the fuel in combustion chamber by preventing an increase of the fuel wall flow quantity.

In the high atmospheric pressure state in which the actual atmospheric pressure is higher than the standard pressure, the vaporization of fuel sprayed from fuel injector 21 becomes difficult, and hence the fuel wall flow quantity increases on the intake port wall, resulting in a delay in the supply of fuel to combustion chamber 5, a deficit in the quantity of fuel in combustion chamber 5, and an instability in the combustion. Therefore, the control system of the second embodiment modifies the fuel pressure on the higher side above reference value Pf0 during the period during which the temporary fuel increase quantity is modified to the increase side by increasing KAS (see S84 in FIG. 10B, and FIG. 12). Thus, the control system can promote the atomization of injected fuel and prevent a deficit in the fuel in combustion chamber 5 by preventing an increase of the fuel wall flow quantity.

The following three (third, fourth and fifth) embodiments are based on the second embodiment shown in FIGS. 8~13.

A third embodiment is based on the second embodiment, and arranged to increase a valve overlap (period) from a start of cranking. In the third embodiment, the engine is provided with a valve timing control mechanism for advancing or retarding the opening and closing timing of exhaust valve 16. By using the valve timing control mechanism, the control system of the third embodiment increases the valve overlap (period) of intake and exhaust valves 15 and 16 by varying an exhaust valve closing timing EVC from the start of the cranking, in order to cause the combustion gas to flow backward to intake port 4. The high temperature combustion gas blown backward into intake port 4 promotes the vaporization of fuel on the intake port wall. Therefore, even in the case of an engine having a greater fuel wall flow quantity, the control system of the third embodiment can prevent undesired enleanment of the air-fuel mixture during the modification of the increased fuel injection quantity or the modification of start enrichment coefficient KAS to the increase side.

The fuel wall flow quantity tends to be increased in an engine in which intake ports 4 are curved, or intake ports 4 are long. The third embodiment is advantageous especially for such an engine. The third embodiment is not limited to the engine provided with the valve timing control mechanism. The third embodiment is applicable to an engine provided with a valve actuating mechanism for the exhaust valves, capable of promoting backflow of the combustion gas into the intake ports.

A fourth embodiment is based on the second embodiment, and arranged to avoid the valve overlap of the intake and exhaust valves in a direct injection arrangement in which fuel injector 21 is arranged to inject fuel directly into combustion chamber 5. By using a valve timing control mechanism for advancing or retarding the exhaust valve opening and closing timing, the control system of the fourth embodiment eliminates the valve overlap (period) of intake and exhaust valves 15 and 16 by varying the exhaust valve closing timing EVC from the start of the cranking, in order to confine the combustion gas in combustion chamber 5. The high temperature combustion gas confined in combustion chamber 5 promotes the vaporization of fuel on the wall in combustion chamber. Therefore, even in the case of an engine having a greater fuel wall flow quantity in the combustion chamber, the control system of the fourth embodiment can prevent undesired enleanment of the air-fuel mixture during the modification of the increased fuel injection quantity or the modification of start enrichment coefficient KAS to the increase side.

The fourth embodiment is not limited to the engine provided with the valve timing control mechanism. The fourth embodiment is applicable to an engine provided with a valve actuating mechanism for the exhaust valves, capable of reducing the valve overlap to zero.

A fifth embodiment is also based on the second embodiment, and arranged to predict a specific cylinder which undergoes the power stroke (POW) at the idle attainment moment t2 and to perform a fuel injection with an increased quantity for the specified cylinder, at an injection timing on the exhaust stroke (EX) or intake stroke (IN) just before that power stroke. In order to control the engine speed stably at target idle speed NSET from moment t2, it is important to produce an adequate torque by burning the fuel in the increased quantity at target idle speed attainment moment t2.

In the standard atmospheric pressure state, it is possible to predict the time from a start of cranking to the target idle speed attainment moment t2. Accordingly, it is possible to predict a cylinder which meets the power (expansion or explosion) stroke at target idle speed attainment moment t2, and to set a fuel injection timing on the exhaust stroke or the intake stroke immediately before the power stroke of that cylinder.

However, in the nonstandard atmospheric pressure state, the nonstandard atmospheric pressure influences the rise of the engine speed, and the time until the target idle speed attainment moment. Therefore, an expansion stroke cylinder which is a cylinder meeting the power stroke at the moment of attainment of target idle speed NSET may differ between the standard atmospheric pressure state and the nonstandard atmospheric pressure state. In this case, it is difficult to produce an adequate torque by burning the fuel in the increased quantity at target idle attainment moment, and to control the engine speed stably at target idle speed NSET.

Therefore, the control system of the fifth embodiment predicts the expansion stroke cylinder which is a cylinder meeting or encountering the power stroke at the moment of attainment of target idle speed NSET, and performs a fuel injection of the increased fuel injection quantity (with KAS0b×Katm) at a fuel injection timing set on the exhaust stroke or the intake stroke just before the power stroke of that expansion stroke cylinder. By so doing, the control system of the fifth embodiment can cause combustion, at target idle speed attainment moment t2, of fuel in the increased quantity, and thereby produce an adequate torque even in the nonstandard atmospheric pressure state.

Figure 14:
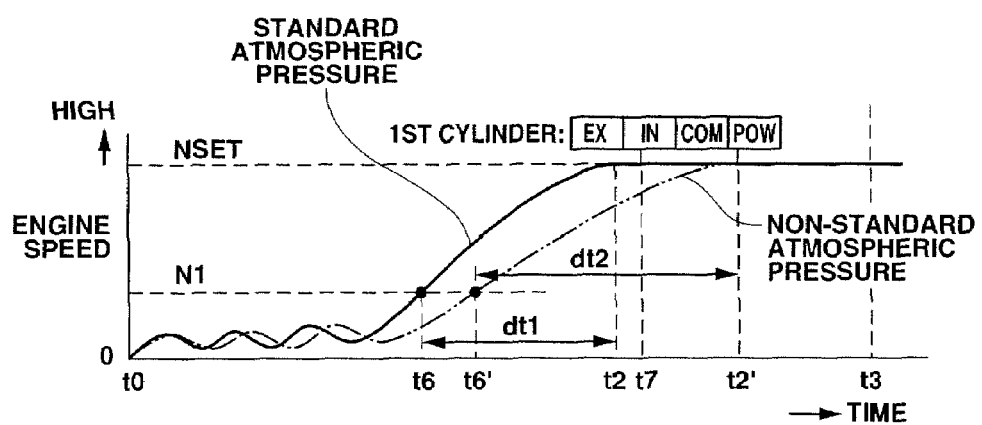
FIG. 14 is a view of a waveform for illustrating a concept of a fifth embodiment of the present invention.

FIG. 14 illustrates this concept of the fifth embodiment. In the example shown in FIG. 14, the engine rotational speed reaches target idle speed NSET at moment t2 as shown by a solid line in the standard atmospheric pressure state. In the nonstandard atmospheric pressure state, the engine speed reaches target idle speed NSET at a later moment t2' posterior to t2, as shown by a two-dot chain line in FIG. 14 since the rise of the engine speed at a predetermined speed N1 is more gradual. The time from the moment of attainment of speed N1 to the moment of attainment of target idle speed NSET is elongated from a shorter time length dt1 (t6−t2) in the standard atmospheric pressure state, to a longer time length dt2 (t6'−t2') in the nonstandard atmospheric pressure state.

If the characteristic of the engine speed increasing from speed N1 to target idle speed NSET is approximated by a straight line, it is possible to determine the gradient (or slope) of the engine speed at speed N1 in the nonstandard atmospheric pressure state, and hence it is possible to calculate the time dt2 until the moment of attainment of target idle speed NSET, from the gradient (the slope of the straight line) by using the following equation.

$$dt2 = (NSET - N1)/(\text{the slope of the straight line}) \quad (8)$$

From this time (length) dt2 and the result of the cylinder discrimination, it is possible to identify the cylinder which is on the power stroke at moment t2'. If this cylinder (power stroke cylinder at t2') is the first cylinder, and the control system can identify the first cylinder as the power stroke cylinder at moment t2', the control system can determine the timing of the intake stroke (or the exhaust stroke) immediately before that power stroke in the first cylinder. Therefore, the control system sets the fuel injection timing for the first cylinder at a moment t7 on the intake stroke of the first cylinder, and performs the fuel injection of the fuel injection quantity increased as in the second embodiment, at the moment t7 on the intake stroke for the first cylinder.

Moreover, it is optional to perform a feedback control by using at least one of the throttle valve opening, fuel injection quantity and ignition timing so as to control the actual engine speed Ne to target idle speed NSET after the target idle speed attainment moment in each of the preceding embodiments. With such a feedback control, the control system can converge the actual engine speed to target idle speed after the attainment of the target idle speed even if there occurs a hunting.

In one of possible interpretations, steps S26, S32 and S33 in FIG. 5 correspond to a process element of an ignition timing retardation (or step retardation in the case of FIG. 3); steps S25, S26, S29, S30 and S31 in FIG. 5 correspond to a process element of a preliminary (gradual) increase of the intake air quantity; steps S44, S45 and S51 in FIG. 6 correspond to a process element of a temporary enrichment; and steps S77~S83 in FIG. 10B correspond to a process element of pressure modification.

FIGS. 15~22 are views for illustrating embodiments concerning fuel properties.

In the first embodiment, no consideration is taken of fuel properties, specifically as to whether the fuel is heavy or light. In the following embodiments, a heavy fuel is a fuel containing a relatively small amount of a fuel component (such as hydrocarbon) evaporating at lower temperatures, and containing a relatively great amount of a fuel component evaporating at higher temperatures; and a light fuel is a fuel containing a relatively great amount of a fuel component (such as hydrocarbon) evaporating at lower temperatures, and containing a relatively small amount of a fuel component evaporating at higher temperatures. This fuel property relating to the volatility has substantial influence on the startability of an engine.

Accordingly, when second ignition timing ADV2 (cf., S32 of FIG. 5) for promoting the catalyst warm-up and start enrichment coefficient KAS (cf., S41~S49 of FIG. 6) are set in accord with the light fuel, then the use of the heavy fuel tends to make the combustion unstable because of its lower volatility. Therefore, the engine tends to produce unpleasant vibrations due to unstable rotation immediately after the target idle speed attainment moment (t2), and to stall in some severe cases (cf., solid lines in the uppermost tiers of FIG. 15, FIG. 17 and FIG. 18).

Therefore, sixth through tenth embodiments are arranged to sense the fuel property with a fuel property sensor (serving as a main component of fuel property sensing means) to determine whether the fuel is light or heavy, and to set the second ignition timing ADV2 on the advance side (of the point based on the light fuel) when the fuel currently in use is heavy.

Figure 15:
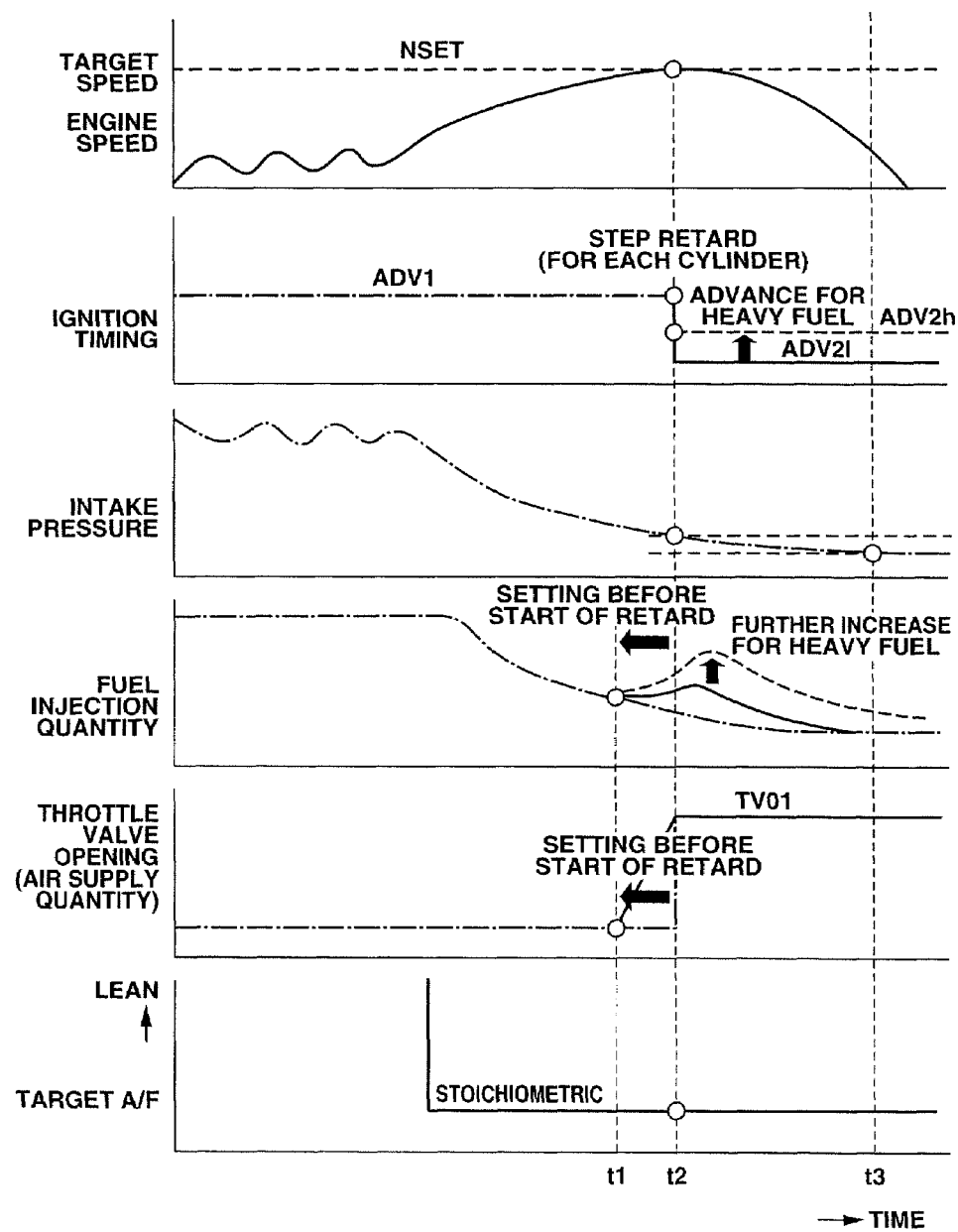
FIG. 15 is a time chart showing various waveforms for illustrating operations of a control system according to a sixth embodiment.
Figure 16:
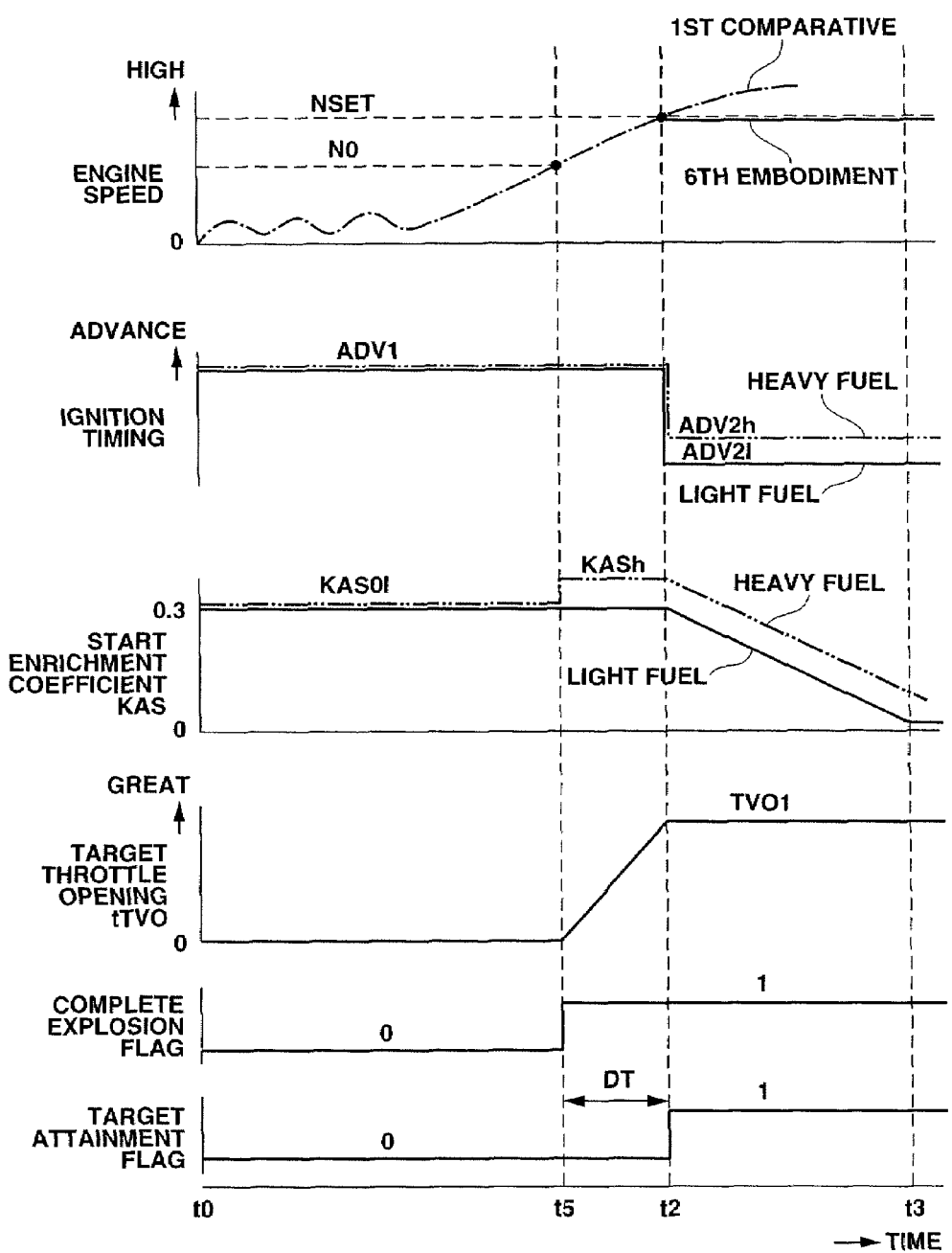
FIG. 16 is a time chart showing various waveforms for illustrating a control process according to the sixth embodiment.

FIGS. 15 and 16 are views for illustrating the engine control system and process according to the sixth embodiment. FIG. 15 corresponds to FIG. 2 of the first embodiment, and FIG. 16 corresponds to FIG. 3 of the first embodiment. As shown in the second tiers of FIG. 15 and FIG. 16, the control system according to the sixth embodiment performs a step retard operation to retard the ignition timing from the first timing ADV1 to a second timing ADV2l for the light fuel, as shown by a solid line at the idle attainment moment t2 when the fuel is light. When, on the other hand, the fuel is heavy, the control system according to the sixth embodiment performs a step retard operation to retard the ignition timing from first timing ADV1 to a second timing ADV2h for the heavy fuel, as shown by a broken line, at the idle attainment moment t2. Thus, the ignition timing is advanced in the case of the heavy fuel, as compared to the second timing ADV2l for the light fuel.

Furthermore, the control system of the sixth embodiment varies start enrichment coefficient KAS as shown by a solid line in the third tier of FIG. 16 when the fuel is light, and as shown by a two-dot chain line in the third tier of FIG. 16 when the fuel is heavy. In the case of the light fuel, as shown by the solid line in the third tier of FIG. 16, the control system holds start enrichment coefficient KAS at a light fuel initial value KAS0l from t0 to t2; and decreases start enrichment coefficient KAS at a predetermined decreasing rate from t2 until start enrichment coefficient KAS is reduced to zero at t3. In the case of the heavy fuel, as shown by the two-dot chain line in the third tier of FIG. 16, the control system increases start enrichment coefficient KAS from the light fuel initial value KAS0l to a heavy fuel initial value KAS0h at a moment t5; holds start enrichment coefficient KAS at heavy fuel initial value KAS0h from t5 to t2; and decreases start enrichment coefficient KAS at a predetermined decreasing rate from t2 until start enrichment coefficient KAS is reduced to zero at a moment after t3. By so doing, the control system of sixth embodiment increases the fuel increase quantity when the fuel is heavy, as compared to the fuel increase quantity for the light fuel. When the heavy fuel is used, the fuel wall flow quantity becomes greater on the intake port wall (and the back side of the intake valve head) because of the poorer volatility of the heavy fuel. This increase of the fuel wall flow quantity acts to decrease the quantity of fuel supplied to combustion chamber 5, and to make the combustion unstable by the shift of the air-fuel ratio in combustion chamber 5 to the lean side. By increasing start enrichment coefficient KAS by using the heavy fuel initial value KAS0$h$, the control system can hold the incylinder air-fuel ratio at the desired level even when the heavy fuel is used.

Figure 17:
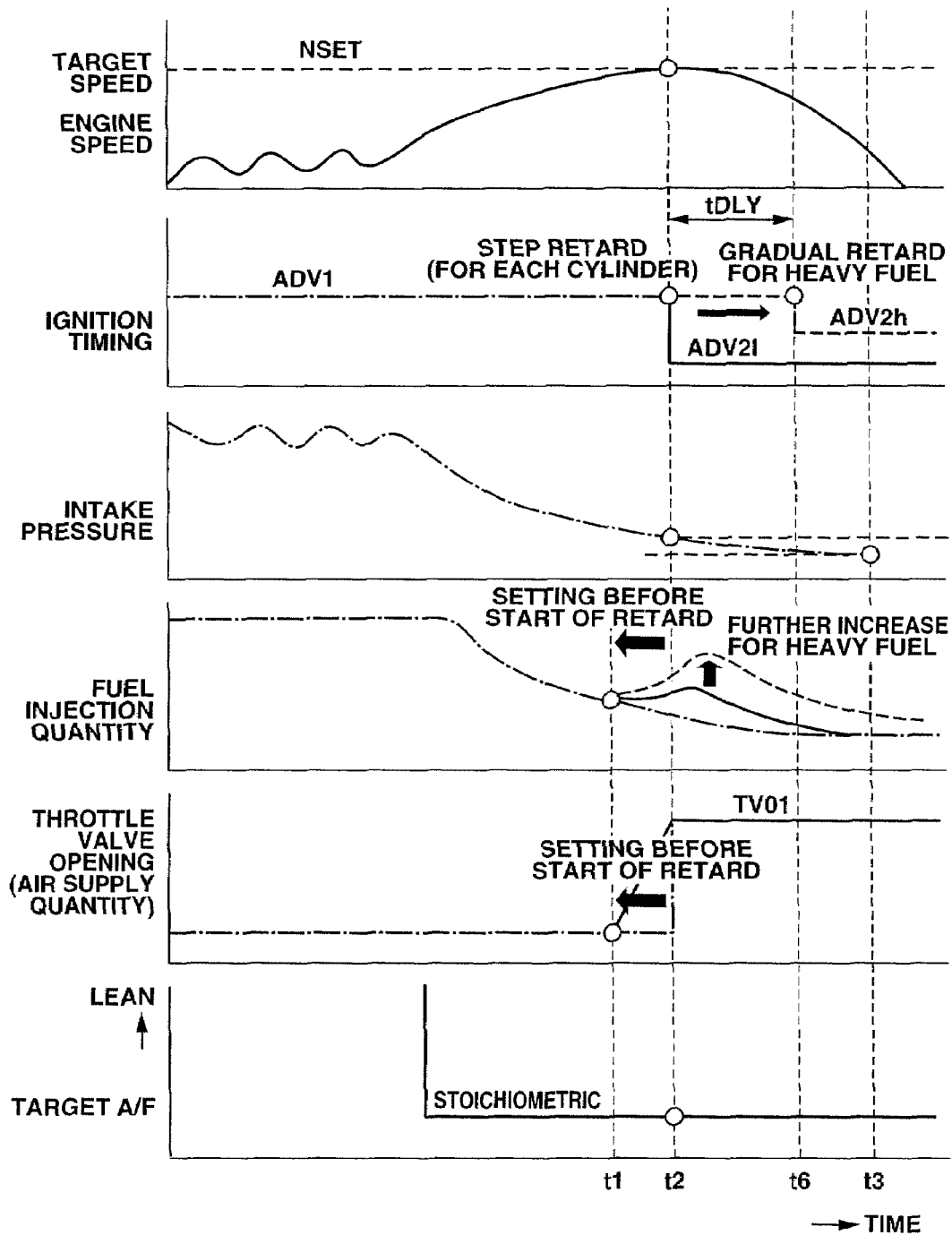
FIG. 17 is a time chart showing various waveforms for illustrating operations of a control system according to a seventh embodiment.

FIG. 17 is a view for illustrating the engine control system and process according to a seventh embodiment. As shown in the second tier of FIG. 17, the control system according to the seventh embodiment performs a step retard operation to retard the ignition timing from first timing ADV1 to second timing ADV2$l$ for the light fuel, as shown by a solid line, at the idle attainment moment t2 when the fuel is light. When, on the other hand, the fuel is heavy, the control system according to the seventh embodiment performs a step retard operation to retard the ignition timing from first timing ADV1 to second timing ADV2$h$ for the heavy fuel, as shown by a broken line, at a moment t6 (after the idle attainment moment t2). Thus, the control system of the seventh embodiment delays the timing of the step retardation from ADV1 to ADV2$h$ for the heavy fuel, by a predetermined delay time tDLY from t2 to t6.

Figure 18:
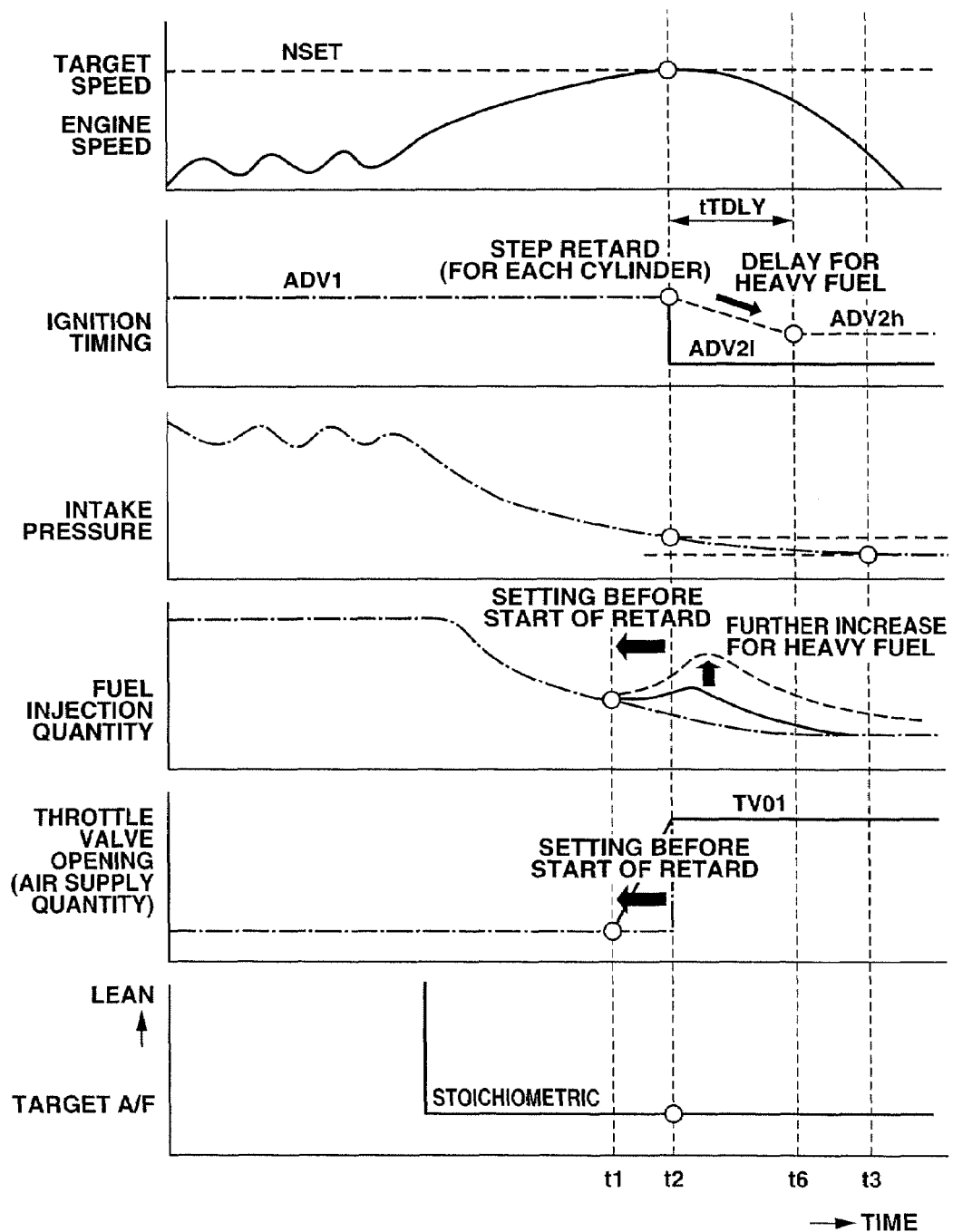
FIG. 18 is a time chart showing various waveforms for illustrating operations of a control system according to an eighth embodiment.

FIG. 18 is a view for illustrating the engine control system and process according to an eighth embodiment. As shown in the second tier of FIG. 18, the control system according to the eighth embodiment performs the step retardation to retard the ignition timing from first timing ADV1 to second timing ADV2$l$ for the light fuel, as shown by a solid line, at the idle attainment moment t2 when the fuel is light. When, on the other hand, the fuel is heavy, the control system according to the eighth embodiment performs a gradual retardation to retard the ignition timing from first timing ADV1 toward second timing ADV2$h$ for the heavy fuel, at a predetermined gradual rate as shown by a broken line, from the idle attainment moment t2 until the second timing ADV2$h$ for the heavy fuel is reached at the moment t6 (corresponding to t6 shown in FIG. 17).

In this way, by setting the delay time tDLY in the case of FIG. 17 (of the seventh embodiment) or by employing the gradual retardation in the case of FIG. 18 (of the eighth embodiment), the engine control system can prevent deterioration of the combustion stability and decrease the tendency to engine stall in the case of the heavy fuel tending to increase the fuel wall flow quantity, and thereby avoid adverse influence which would be caused by a step retardation during the period just after the start of the engine during which the engine speed is increasing and the fuel wall flow quantity is varying largely.

Figure 19:
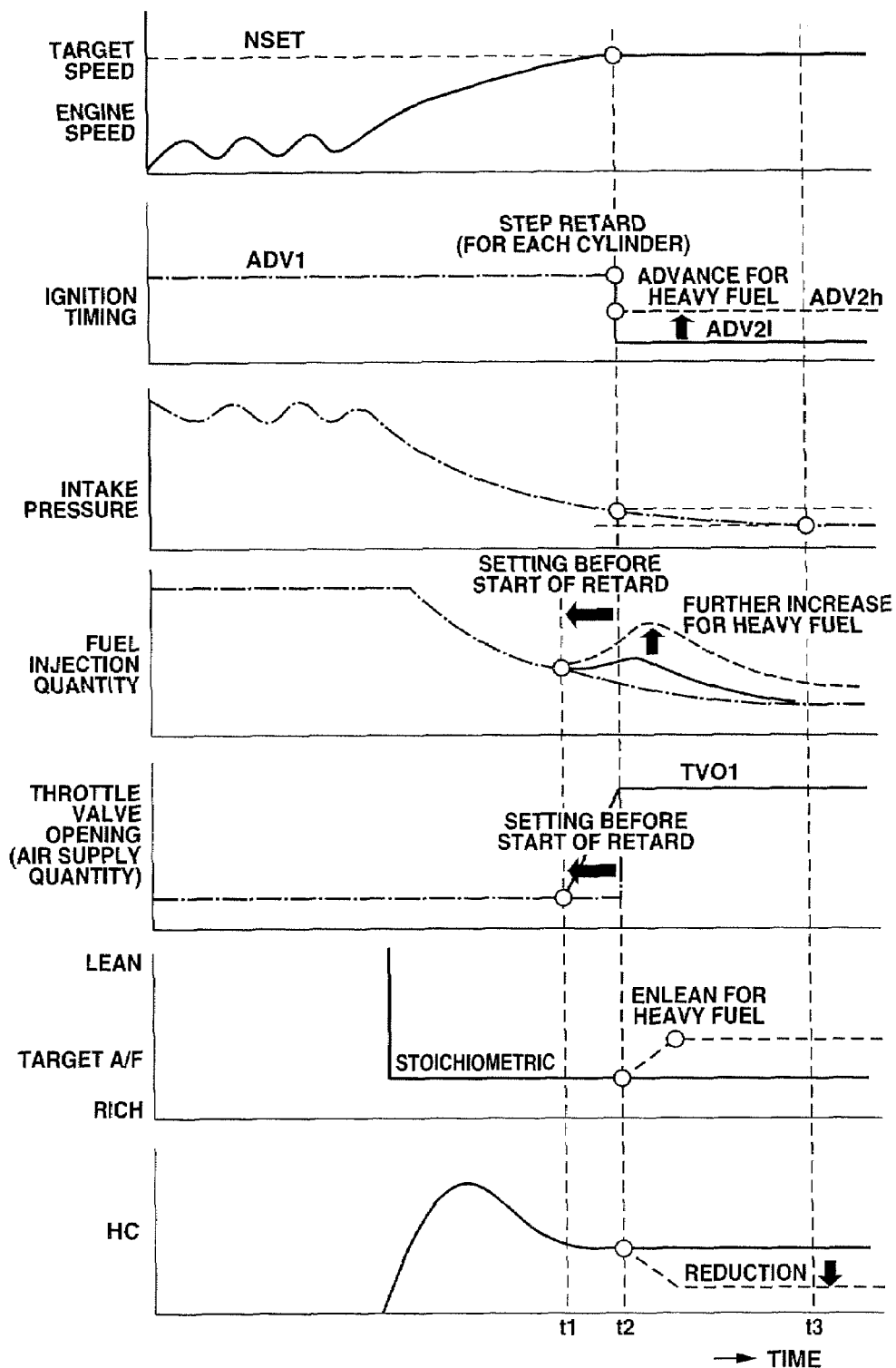
FIG. 19 is a time chart showing various waveforms for illustrating operations of a control system according to a ninth embodiment.

FIG. 19 is a view for illustrating the control system and process according to a ninth embodiment. The ninth embodiment is based on the sixth embodiment shown in FIGS. 15 and 16. In the ninth embodiment, moreover, the target air-fuel ratio is set in the following manner. As shown in the sixth tier of FIG. 19, the control system sets the target air-fuel ratio at the stoichiometric (theoretical) ratio as shown by a solid line in the case of the light fuel. When the fuel is heavy, on the other hand, the control system varies the target air-fuel ratio to a value on the lean side (to an extent not exceeding the combustion stability limit) from the idle attainment moment t2, as shown by a broken line. That is, in the case of the heavy fuel, the control system of the ninth embodiment sets start enrichment coefficient KAS determining the temporary fuel increase quantity, in such a manner as to make the actual air-fuel ratio obtained by the temporary increase of the fuel injection quantity, equal to a lean ratio on the lean side within the combustion stability range. In this embodiment, the control system varies the target air-fuel ratio gradually, instead of a step change at t2. By this enleanment, the control system can prevent deterioration of after-burning and increase of HC due to the setting of second ignition timing ADV2 on the advance side for the heavy fuel.

Target equivalence ratio TFBYA is equal to 1.0 when the target air-fuel ratio is the stoichiometric ratio. When the target air-fuel ratio is set to a value on the lean side of the stoichiometric ratio, the target equivalence ratio TFBYA is set to a value greater than 1.0.

Figure 20:
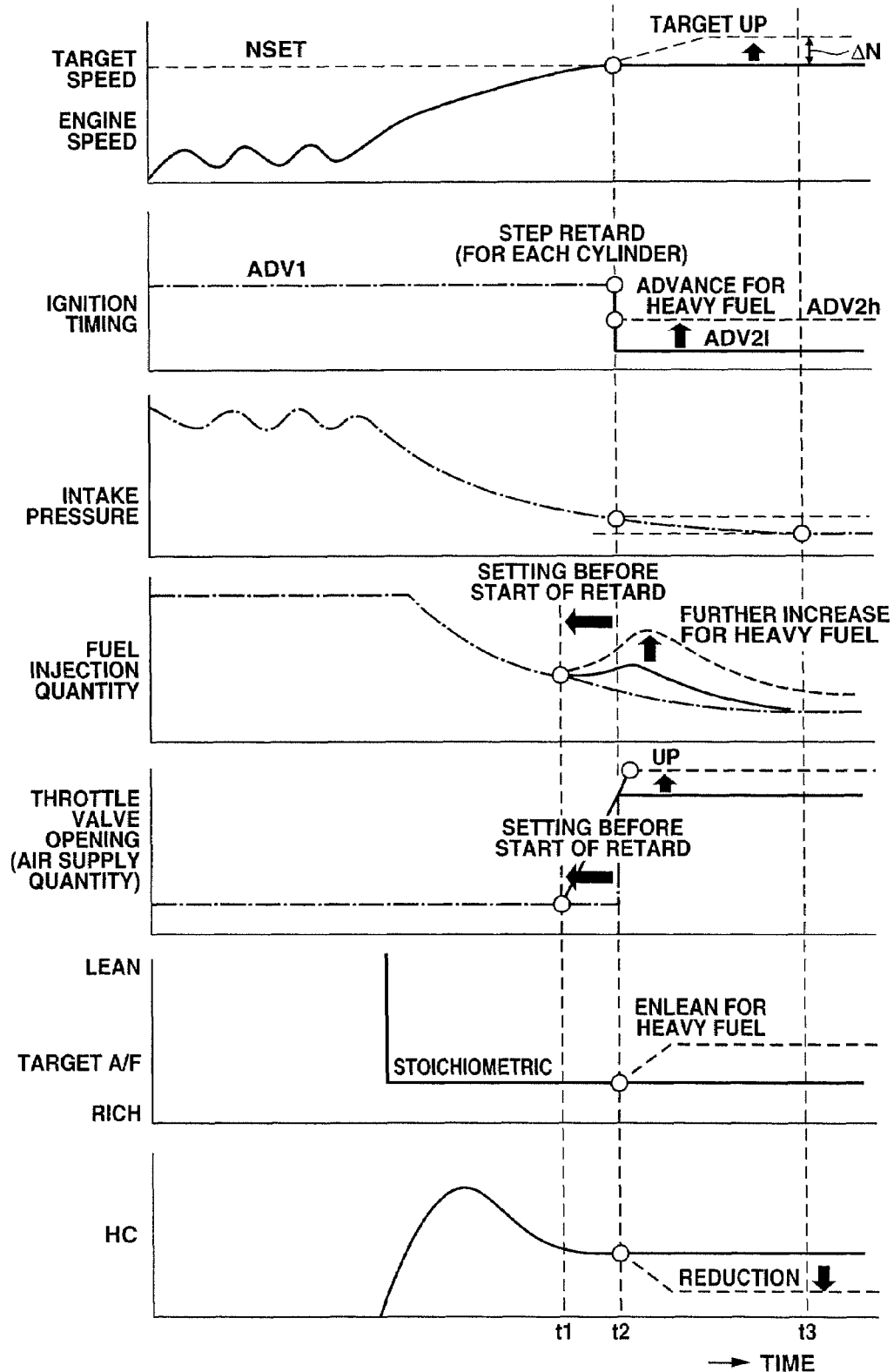
FIG. 20 is a time chart showing various waveforms for illustrating operations of a control system according to a tenth embodiment.

FIG. 20 is a view for illustrating the control system and process according to a tenth embodiment. The tenth embodiment is based on the ninth embodiment. In the tenth embodiment, the target idle speed is set in the following manner. As shown by a solid line in the uppermost tier of FIG. 20 for the light fuel, target idle speed NSET is constant in the case of the light fuel, and the engine speed is controlled to the constant target idle speed NSET after target idle speed attainment moment t2. When the fuel is heavy, by contrast, as shown by a broken line, the target idle speed NSET is increased by a predetermined amount ΔN at moment t2. In this embodiment, the target idle speed is increased at a gradual rate from t2, instead of a step increase. The setting of the target air-fuel ratio to the lean side as in the ninth embodiment of FIG. 19 could make the combustion condition unstable. Therefore, in the tenth embodiment, by increasing the target idle speed by ΔN, the control system prevents the combustion from being made unstable by the enleanment shown in the sixth tier of FIG. 20 like the sixth tier of FIG. 19.

Figure 21:
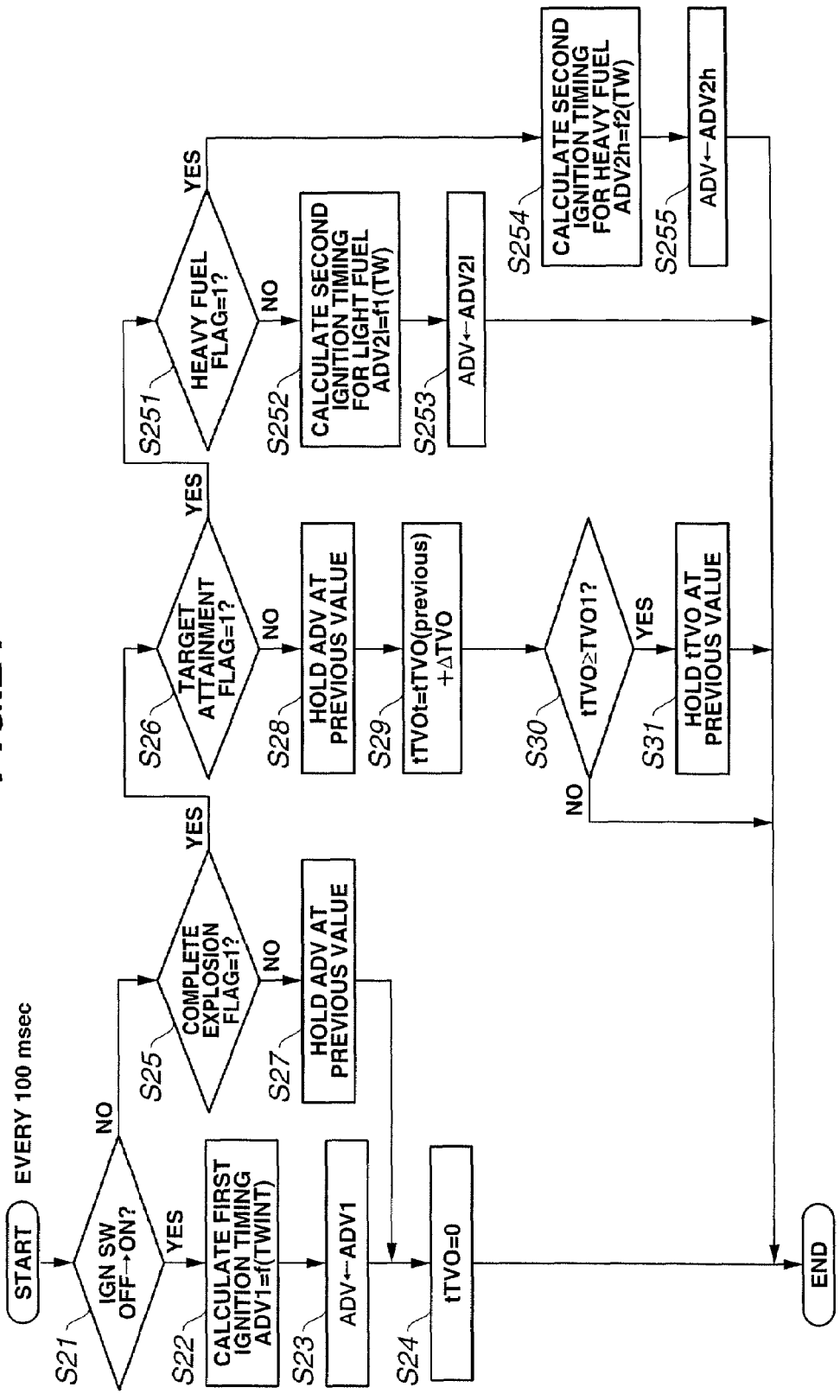
FIG. 21 is a flowchart of a process for calculating the command ignition timing command and the target throttle opening in the control process according to the sixth embodiment.
Figure 22A:
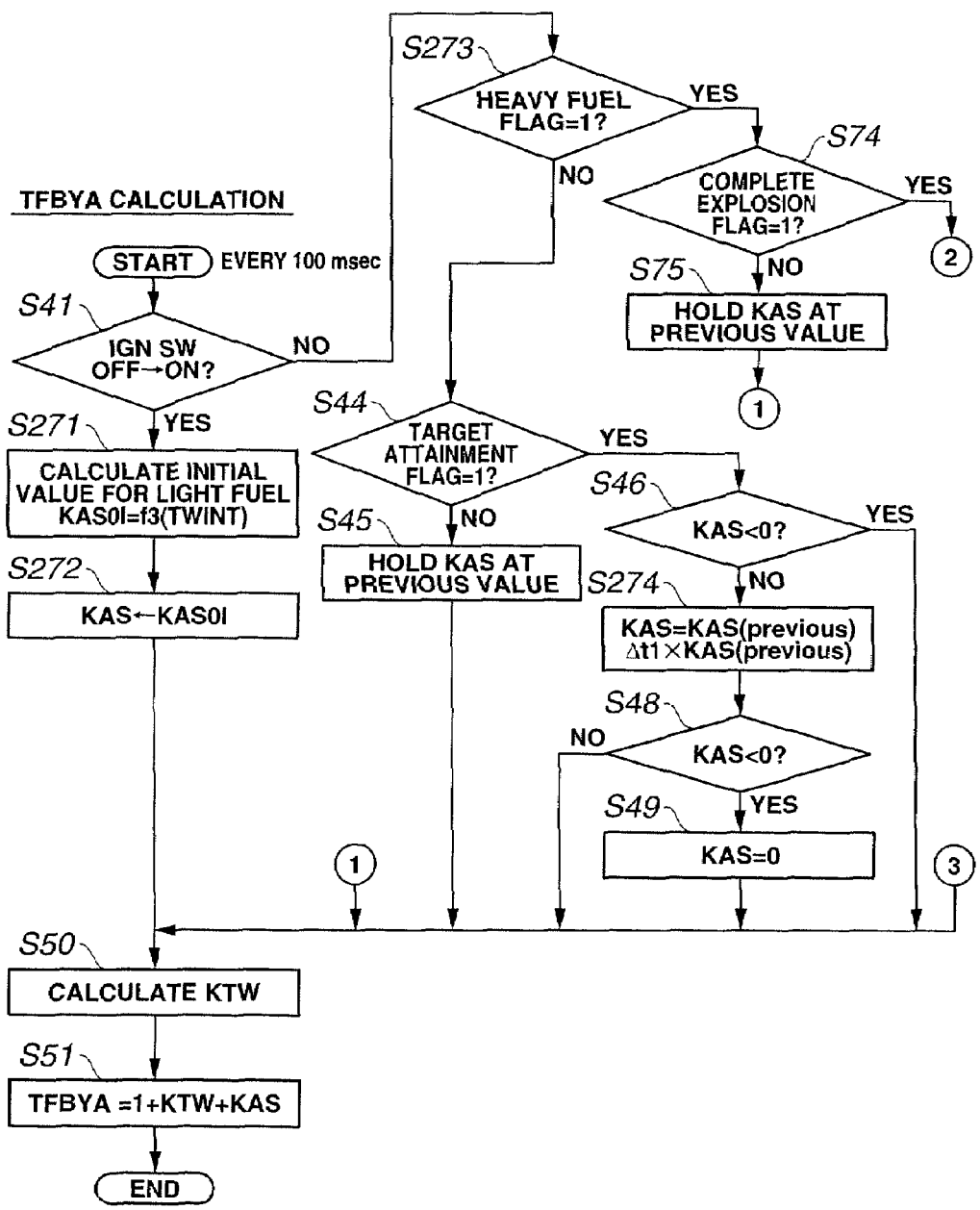
FIGS. 22A and 22B show a flowchart for calculating the target equivalence ratio in the control process according to the sixth embodiment.
Figure 22B:
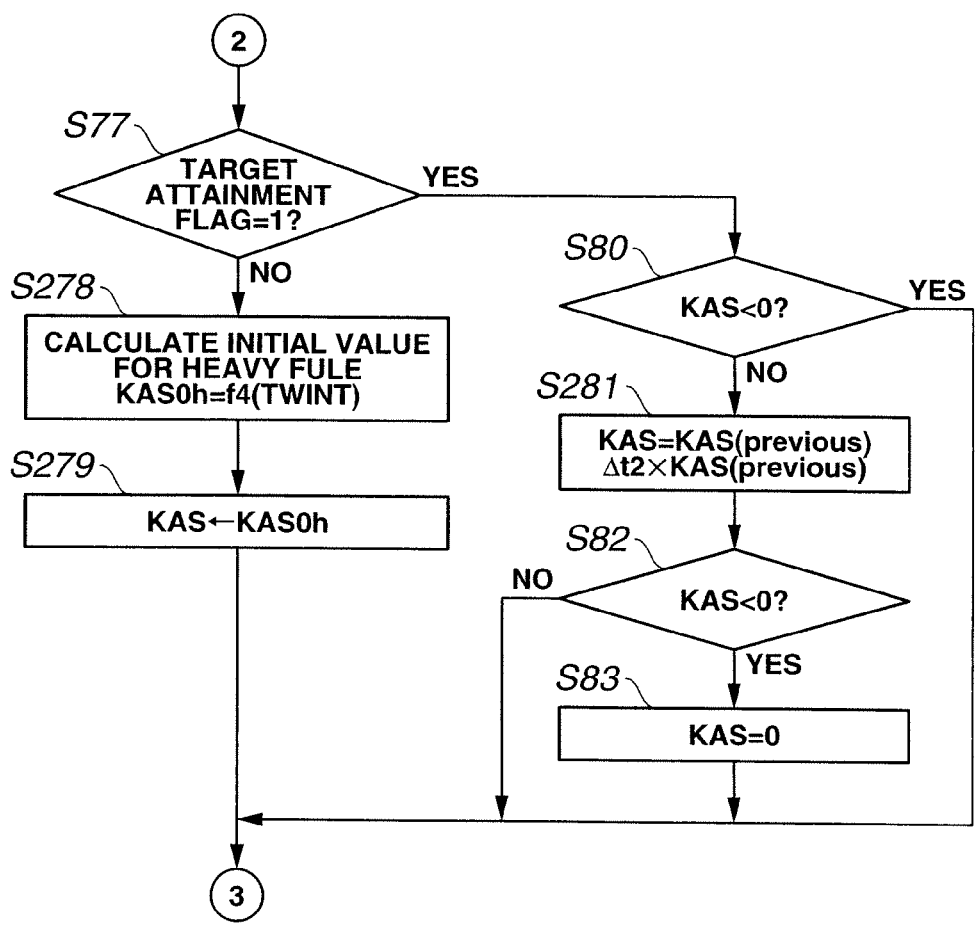

FIGS. 21 and 22 (22A, 22B) show part of the control process according to the sixth embodiment. Detailed explanation is omitted for the seventh to tenth embodiments. FIG. 21 is a substitute for FIG. FIG. 5, for calculating the command ignition timing and target throttle opening. FIGS. 22A and 22B are a substitute for FIG. 6, for the target equivalence ratio. Steps substantially identical to steps in the first embodiment are given the same step numbers.

The following explanation is directed mainly to points different from the first embodiment. When the target attainment flag becomes equal to one, controller 31 proceeds from S26 to a step S251. At S251, controller 31 checks a heavy fuel flag. This heavy fuel flag is a condition code to indicate the use of a light fuel when the heavy fuel flag is zero, and the use of a heavy fuel when the heavy fuel flag is one. At the time of turn-on of the ignition switch, engine controller 31 checks the signal sent from the condition sensor 100 (shown in FIG. 1) which, in this embodiment, is a fuel property sensor (serving as fuel property sensing means) for sensing the fuel property or the heavy/light quality of a fuel, and sets the heavy fuel flag to one or zero in accordance with the sensed fuel property. The sensor for sensing the property of a fuel is known per se. The fuel property sensor may be disposed in a fuel supply passage on the downstream side of a fuel supply pump for discharging fuel in a fuel tank (cf., Published Japanese Patent Application Publication No. H09-53492).

When the heavy fuel flag is equal to zero (because of the use of the light fuel), controller 31 proceeds from S251 to a step S252. At S252, controller 31 calculates a light fuel second ignition timing ADV2$l$ in accordance with the current coolant temperature TW currently sensed by cooling water temperature sensor 37. Then, at a next step S253, controller 31 sets the command ignition timing ADV equal to the thus-calculated light fuel second ignition timing ADV2$l$.

When the heavy fuel is used and hence the heavy fuel flag is equal to one, controller 31 proceeds from S251 to a step S254. At S254, controller 31 calculates a heavy fuel second ignition timing ADV2$h$ for the heavy fuel in accordance with the current coolant temperature TW currently sensed by cooling water temperature sensor 37. Then, at a next step S255, controller 31 sets the command ignition timing ADV equal to the thus-calculated heavy fuel second ignition timing ADV2$h$. For the same cooling water temperature, the heavy fuel second ignition timing ADV2$h$ for the heavy fuel is set on the retard side of the light fuel second ignition timing ADV2$l$ for the light fuel When the ignition switch is just turned from OFF to ON, controller 31 proceeds from step S41 to a step S271 shown in FIG. 22A. At S271, controller 31 calculates a light fuel initial value KAS0$l$ of start enrichment coefficient KAS in accordance with the starting engine temperature TWINT sensed by cooling water temperature sensor 37 (like S42)(KAS0$l$=f3(TWINT)). Then, at a step S272, controller 31 sets start enrichment coefficient KAS equal to the thus-calculated light fuel initial value KAS0$l$ (like S43).

At a step S273 reached in the case of the negative answer of S41, controller 31 checks the heavy fuel flag to determine whether the heavy fuel flag is equal to one or not. When the light fuel is used and hence the heavy fuel flag is zero, controller 31 proceeds from S273 to the program section of steps S44, S45, S46, S274, S48 and S49, and performs the same operations as in S44~S49 of FIG. 6. Step S274 is not identical to S47 of FIG. 6. At S274, controller 31 calculates start enrichment coefficient KAS according to the following equation.

$$KAS=KAS(\text{previous})-\Delta t1 \times KAS(\text{previous}) \quad (9)$$

In this equation, $\Delta t1$ is a constant value, and KAS(previous) is a previous value of KAS. The constant value $\Delta t1$ in the equation (9) is a value determining a decrease quantity per unit time of start enrichment coefficient KAS when the light fuel is used. This constant value $\Delta t1$ is adapted to the light fuel.

When the heavy fuel is used, and hence the heavy fuel flag is one, controller 31 proceeds from S273 to step S74 and checks the complete explosion flag. When the complete explosion flag is equal to zero (before the complete explosion speed N0 is reached), controller 31 proceeds from S74 to step S75, and holds start enrichment coefficient KAS at the previous value (equal to the light fuel initial value KAS0$l$). From S75, controller 31 proceeds to S50.

When the complete explosion flag becomes equal to one (after the complete explosion speed N0 is reached), controller 31 proceeds from S74 to a step S77 shown in FIG. 22B, and checks the target attainment flag at S77. When the target attainment flag is zero (during a period (t5~t2) during which complete explosion speed N0 is reached, but target idle speed NSET is not yet reached), controller 31 proceeds from S77 to a step S278, and calculates a heavy fuel initial value KAS0$h$ in accordance with the starting cooling water temperature TWINT sensed by cooling water temperature sensor 37 (KAS0$h$=f4(TWINT)). At a next step S279, controller 31 sets start enrichment coefficient KAS equal to heavy fuel initial value KAS0$h$. The heavy fuel initial value KAS0$h$ is greater than the light fuel initial value KAS0$l$ for the same cooling water temperature.

When the target attainment flag becomes equal to one (after target idle speed NSET is reached), controller 31 proceeds from S77 to a step S80, and compares start enrichment coefficient KAS with zero. At the moment when the target attainment flag becomes equal to one, start enrichment coefficient KAS is greater than zero (because of the heavy fuel initial value KAS0$h$). Therefore, controller 31 proceeds from S80 to a step S281.

At S281, controller 31 calculates start enrichment coefficient KAS for the heavy fuel, according to the following equation.

$$KAS=KAS(\text{previous})-\Delta t2 \times KAS(\text{previous}) \quad (10)$$

In this equation, $\Delta t2$ is a constant value, and KAS(previous) is a previous value of KAS. The constant value $\Delta t2$ in the equation (10) is a value determining a decrease quantity per unit time of start enrichment coefficient KAS in the case of the heavy fuel. This constant value $\Delta t2$ is adapted to the heavy fuel. This constant value $\Delta t2$ for the heavy fuel may be set equal to $\Delta t1$ for the light fuel, for simplification. The previous value KAS(previous) of start enrichment coefficient KAS is initially set to the value KAS0.

While the target speed attainment flag is equal to one, the operation of S281 is repeated, and start enrichment coefficient KAS is decreased gradually. At step S82 following S281, controller 31 compares start enrichment coefficient KAS with zero. When start enrichment coefficient KAS becomes negative, then controller 31 proceeds from S82 to a step S83, and sets start enrichment coefficient KAS to zero at S83.

Thus, from the moment t2 at which engine speed Ne becomes equal to target idle speed NSET, the start enrichment coefficient KAS is decreased gradually to zero.

The control system of the sixth embodiment employs the fuel sensor for sensing the fuel property or the light/heavy quality of a fuel, and determines the second ignition timing ADV2 for accelerating the warm-up of the catalyst in accordance with the sensed fuel property. As shown in the second tiers of FIGS. 15 and 16, the second ignition timing ADV2 is set on the advance side in the case of the heavy fuel, as compared to the timing for the light fuel (S251, S254 and S255 shown in FIG. 21). Therefore, in addition to the effects obtained by the first embodiment, the control system of the sixth embodiment can adapt the second ignition timing to the fuel property or to the combustion stability affected by the fuel property, and hence prevent engine stall, and undesired vibrations just after a start of an engine even when the heavy fuel is used (cf., the broken line from t2 in the uppermost tier in FIG. 15).

When start enrichment coefficient KAS is set for the light fuel, the control system of the sixth embodiment increases the start enrichment coefficient KAS as shown by the two-dot chain line in the third tier of FIG. 16, for the heavy fuel. Therefore, at the time of retardation from first ignition timing ADV1 to second ignition timing ADV2, the control system can make the incylinder air-fuel ratio to an adequate value as in the case of the light fuel, and thereby prevent engine stall reliably even in the case of the heavy fuel.

The step retardation from ADV1 to ADV2 during the stage during which the engine speed is increasing after a start, and the fuel wall flow quantity is varying largely is liable to deteriorate the combustion stability and to cause engine stall especially in the case of the heavy fuel. The control system of the seventh embodiment can prevent engine stall by delaying the ignition timing retardation by tDLY in the case of the heavy fuel, as shown by the broken line in the second tier of FIG. 17.

Similarly, the control system of the eighth embodiment can prevent engine stall by retarding the ignition timing from ADV1 to ADV2 gradually in the case of the heavy fuel, as shown by the broken line in the second tier of FIG. 18.

The setting of second ignition timing ADV2 for the heavy fuel on the advance side as compared to the light fuel could deteriorate the after burning, and deteriorate HC (as shown by the solid line in the lowermost tier of FIG. 19 from t2). The control system according to the ninth embodiment can improve the after burning and prevent deterioration of HC (as shown by the broken line in the lowermost tier of FIG. 19 from t2) by setting start enrichment coefficient KAS to achieve the enleanment for the heavy fuel as shown by the broken line in the sixth tier of FIG. 19.

In addition to the effects of the ninth embodiment, the tenth embodiment can provide the following effects. By setting the target idle speed NSET upward by ΔN from t2 as shown by the broken line in the uppermost tier of FIG. 20, the control system of the tenth embodiment can stabilize the combustion state by increasing the intake air quantity and promote the warming up performance of the catalyst by increasing the volume of the exhaust gases despite the enleanment for the heavy fuel as shown by the broken line in the sixth tiers of FIG. 19 and FIG. 20.

In one of possible interpretations, steps S251~S255 in FIG. 21 correspond to a process element of setting the catalyst warm-up promoting ignition timing ADV2 in accordance with the property of fuel.

FIGS. 23~28 are views for illustrating embodiments concerning intake air temperature.

Figure 25A:
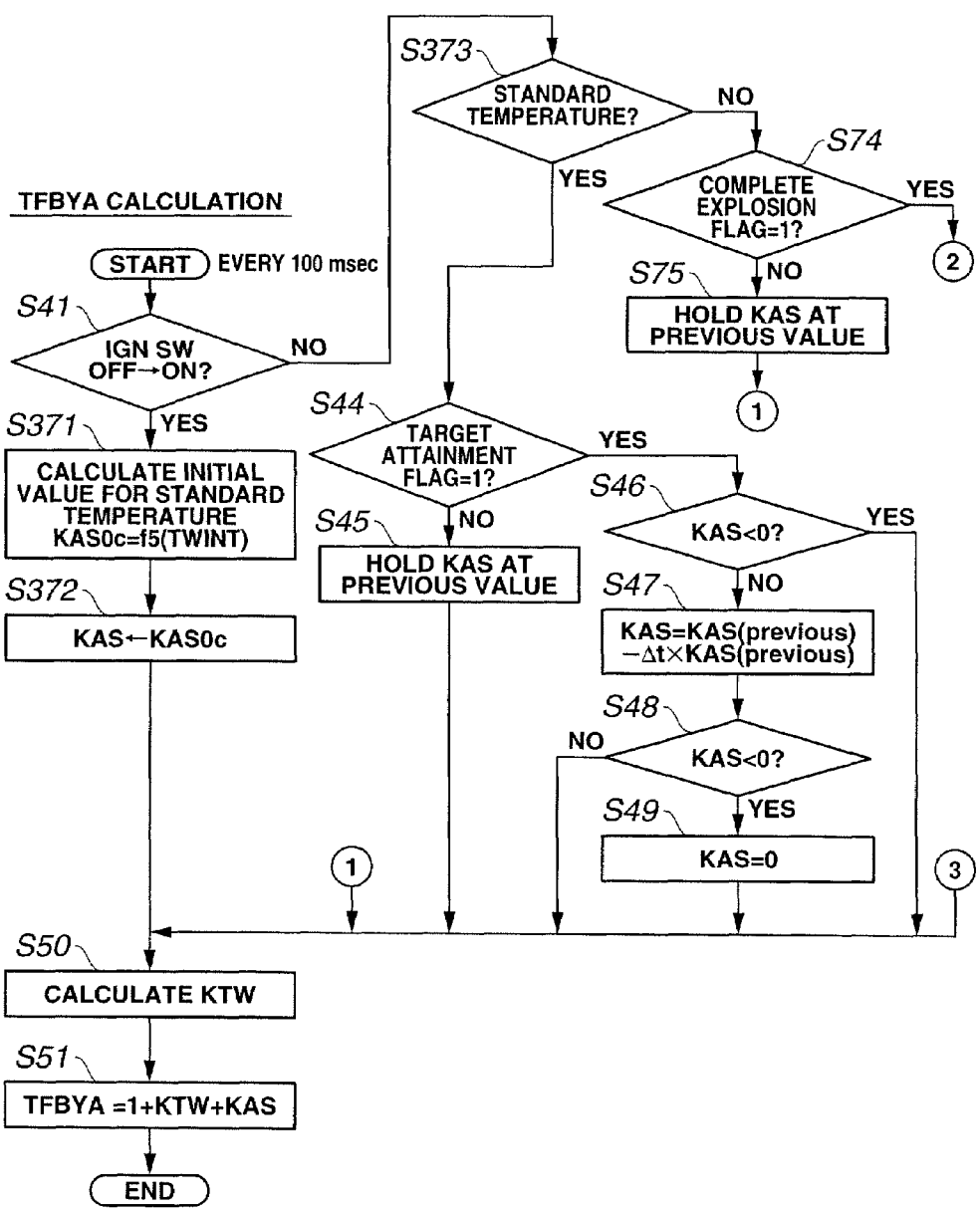
FIGS. 25A and 25B show a flowchart for calculating the target equivalence ratio in the control process according to the eleventh embodiment.
Figure 25B:
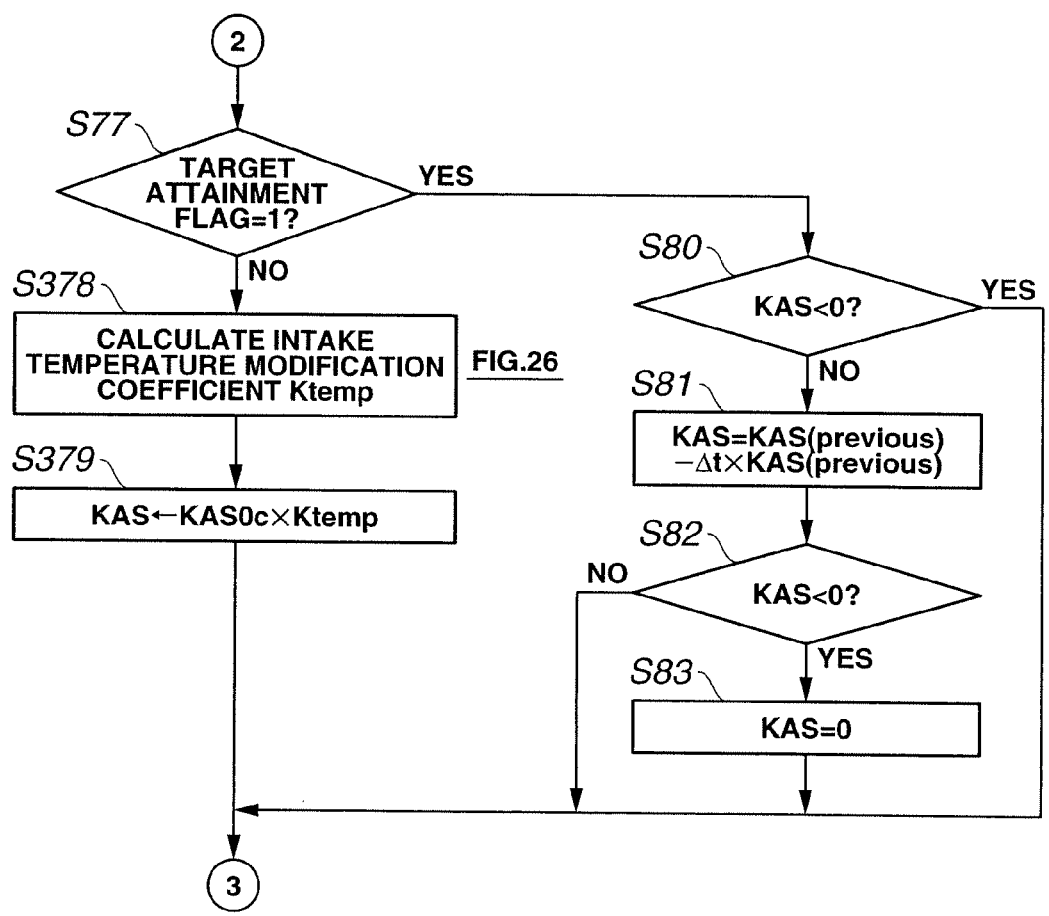

FIGS. 25A and 25B show a control process according to an eleventh embodiment, to be substituted for FIG. 6 of the first embodiment. Steps having the same step numbers are substantially identical to the corresponding steps in FIG. 6.

In the first embodiment, no consideration is taken of environment or ambient conditions such as an intake air temperature condition (differences of the intake air temperatures). When the quantities (such as start enrichment coefficient KAS, base fuel injection pulse width Tp in equation (5), and transient correction quantity Kathos) which are relevant or influential to the stability of the idle rotational speed immediately after an engine start are set on the basis of a standard temperature (25° C. for example), the ambient condition deviating from the standard temperature could exert undesired influence.

In a low intake air temperature state, therefore, the control according to the first embodiment is not always satisfactory. In the low temperature state in which the intake air temperature is lower than the standard temperature, as in the winter season, the vaporization of fuel sprayed from fuel injector 21 becomes difficult to a degree corresponding to the decrease of the actual intake air temperature below the standard temperature, and hence the fuel wall flow quantity increases on the intake port wall, so that the supply of fuel to combustion chamber 5 is delayed, the quantity of fuel in combustion chamber 5 becomes insufficient, and the combustion becomes unstable. Because of the unstable combustion, the engine tends to produce unpleasant vibrations due to unstable rotation just after the target idle speed attainment moment t2, to increase HC, and to stall in some severe cases (as shown by a solid line in the uppermost tier in FIG. 23).

In a high intake air temperature state in which the intake air temperature is higher than the standard temperature as in the summer season, the vaporization of fuel sprayed from fuel injector 21 becomes easier to a degree corresponding to the increase of the actual intake air temperature above the standard temperature, and hence the fuel wall flow quantity decreases on the intake port wall, so that the supply of fuel to combustion chamber 5 is not delayed, the quantity of fuel in combustion chamber 5 becomes greater, and the actual air-fuel ratio is inclined to the rich side of the stoichiometry so that the fuel could be consumed uselessly. In this embodiment, variation of the atmospheric pressure is not taken into consideration, and the atmospheric pressure is assumed to be at the standard atmospheric pressure (1013 hPa). However, it is possible to take, into account, both conditions, the intake air temperature and the atmospheric pressure by combining the features of the second embodiment and the eleventh embodiment, for example.

Figure 23:
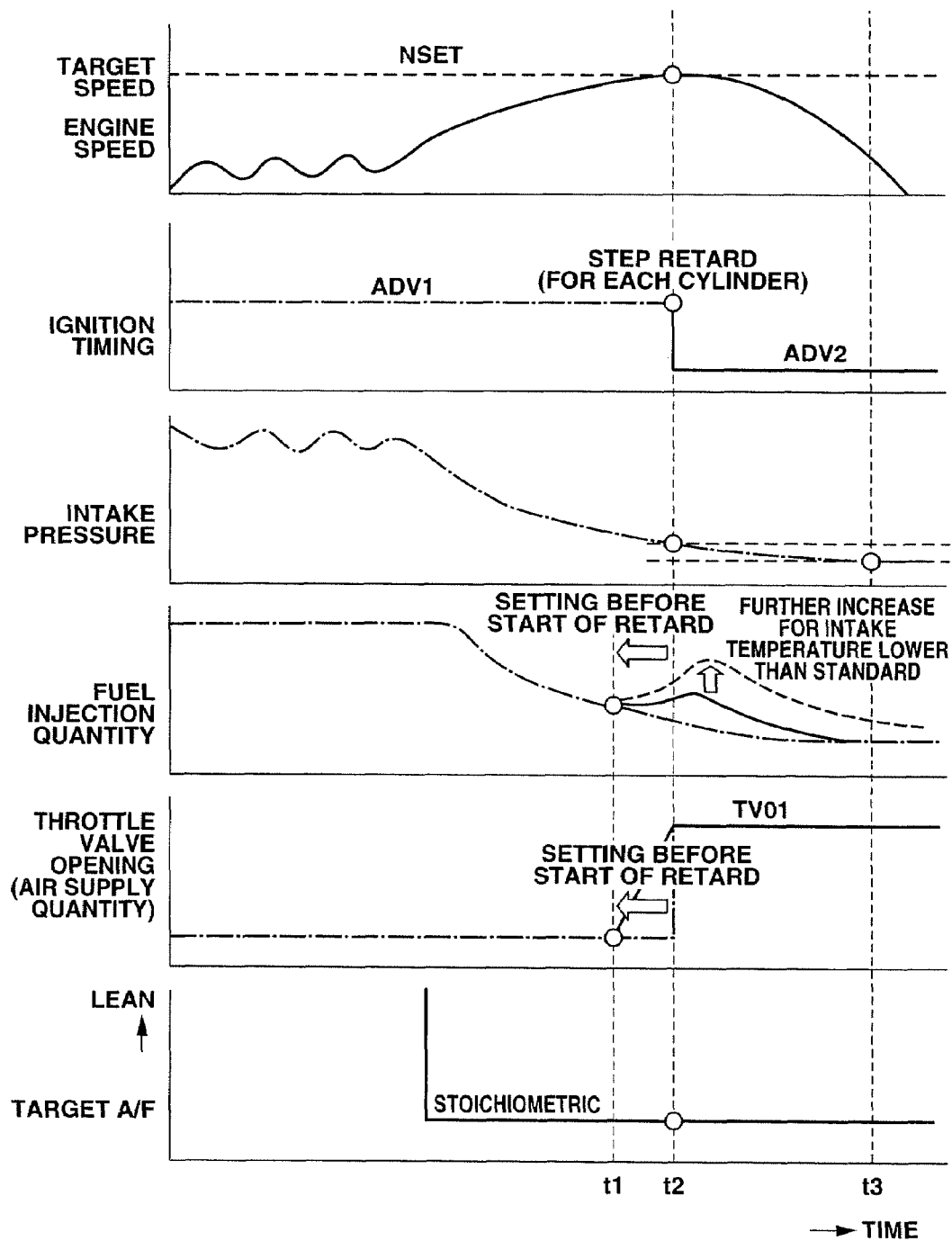
FIG. 23 is a time chart showing various waveforms for illustrating operations of a control system according to an eleventh embodiment.

Therefore, the control system according to the eleventh embodiment further increases the fuel injection quantity in the case of the actual intake air temperature lower than the standard intake air temperature, as shown by a broken line in the fourth tier in FIG. 23, beyond an increased fuel injection quantity, shown by a solid line in the fourth tier in FIG. 23, determined on the basis of the standard intake air temperature (in the same manner shown by the solid line in the fourth tier of FIG. 2). Specifically, as shown in the third tier in FIG. 24, the control system according to the eleventh embodiment varies start enrichment coefficient KAS in a standard temperature mode as shown by a solid line in the standard temperature state, and in a further enriching low temperature mode as shown by a two-dot chain line in the third tier of FIG. 24 in a lower temperature state. When the intake air temperature is at the standard level, start enrichment coefficient KAS is held equal to a standard temperature initial value KAS0$b$ from moment t0 to target idle speed attainment moment t2. From moment t2, start enrichment coefficient KAS is decreased from KAS0$b$ at a predetermined decreasing rate until start enrichment coefficient KAS is reduced to zero at moment t3, as shown by the solid line in the third tier of FIG. 24. When the intake air temperature is lower than the standard intake air temperature, start enrichment coefficient KAS is increased from the standard temperature initial value KAS0$b$ to an increased initial value or lower temperature initial value (KAS0$b$×Ktemp; where Ktemp is a value greater than 1.0 in this case) at the moment t5. From t5 until t2, start enrichment coefficient KAS is held at this increased lower temperature initial value (KAS0$b$×Ktemp). Then, from t2, start enrichment coefficient KAS is decreased at a predetermined decreasing rate from the increased lower temperature initial value (KAS0$b$×Ktemp where Ktemp>1.0) until start enrichment coefficient KAS is reduced to zero at a moment after t3, as shown by the two-dot chain line in the third tier of FIG. 24. Thus, the control system according to the eleventh embodiment increases the temporary fuel increase quantity (shown by the hatched area in the third tier of FIG. 3) when the actual intake air temperature is lower the standard temperature level. In this example, the actual intake air temperature can be sensed by condition sensor 100 which, in this embodiment, is an intake air temperature sensor.

When the sensed actual intake air temperature is higher than the standard temperature level, the control system according to the eleventh embodiment decreases the increased fuel injection quantity in accordance with the actual intake air temperature. Specifically, as shown by a one-dot chain line in the third tier in FIG. 24, start enrichment coefficient KAS is decreased from the standard temperature initial value KAS0$b$ to a decreased initial value or higher temperature initial value (KAS0$b$×Ktemp; where Ktemp is a positive value smaller than 1.0) at moment t5 in the case of the higher temperature state. From t5 until t2, start enrichment coefficient KAS is held at the decreased higher temperature initial value (KAS0$b$×Ktemp where 0<Ktemp<1.0). Then, from t2, start enrichment coefficient KAS is decreased at a predetermined decreasing rate from the decreased higher temperature initial value (KAS0$b$×Ktemp where 0<Ktemp<1.0) until start enrichment coefficient KAS is reduced to zero at a moment before t3. In this way, when the sensed actual intake air temperature is higher than the standard level, the temporary increase quantity of the fuel injection quantity is decreased.

The following explanation is directed mainly to steps of FIGS. 25A and 25B different from FIG. 6 of the first embodiment. When the ignition switch is just turned from OFF to ON, controller 31 proceeds from step S41 to a step S371. At S371, controller 31 calculates a standard temperature initial value KAS0c of start enrichment coefficient KAS in accordance with the starting engine temperature TWINT sensed by cooling water temperature sensor 37 at the time of a start of the engine (as in S42)(KAS0c=f5(TWINT)). Then, at a step S372, controller 31 sets start enrichment coefficient KAS equal to the thus-calculated standard temperature initial value KAS0c (as in S43). Standard temperature initial value KAS0c for the standard intake air temperature condition is so adapted that the air-fuel ratio determined by the amount of fuel in combustion chamber 5 at target idle speed attainment moment t2 becomes equal to the theoretical ratio.

At a step S373 reached in the case of the negative answer of S41, controller 31 checks the actual intake air temperature sensed by the intake air temperature sensor (100), and examines whether the actual intake air temperature is within a predetermined allowable standard temperature range having the standard temperature at the center. When the actual intake air temperature is within this allowable standard temperature range, controller 31 proceeds from S373 to the program section of steps S44 to S49, and performs the same operations as in S44~S49 of FIG. 6.

In the nonstandard temperature state in which the actual intake air temperature is not within the allowable standard temperature range, controller 31 proceeds from S373 to step S74 and checks the complete explosion flag. When the complete explosion flag is equal to zero (before the complete explosion speed N0 is reached), controller 31 proceeds from S74 to step S75, and holds start enrichment coefficient KAS at the previous value (equal to the standard initial value KAS0c). From S75, controller 31 proceeds to S50.

Figure 26:
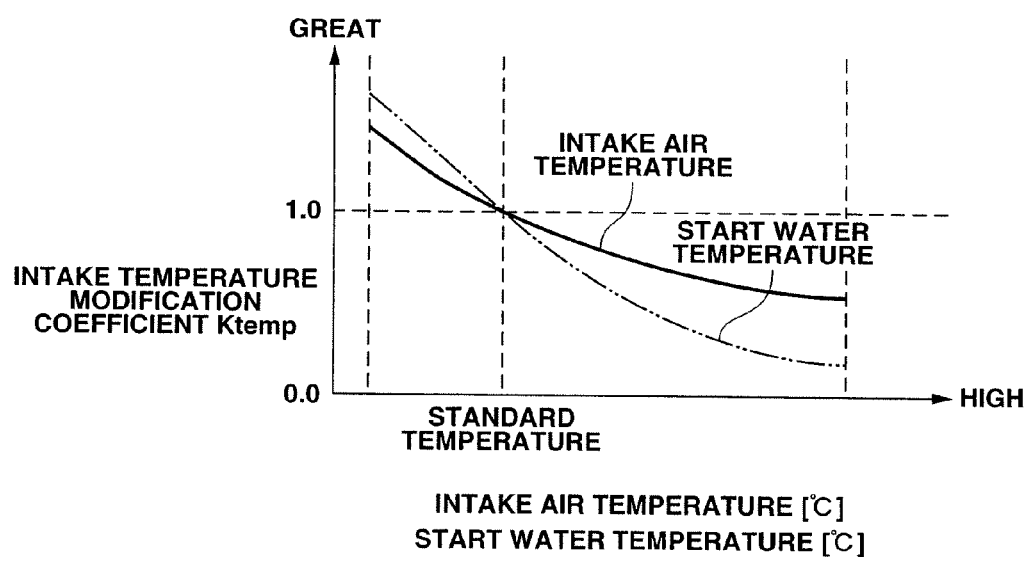
FIG. 26 is a characteristic view showing a temperature modification coefficient used in the control process according to the eleventh embodiment.

When the complete explosion flag becomes equal to one, controller 31 proceeds from S74 to step S77 shown in FIG. 25B, and checks the target attainment flag at S77. When the target attainment flag is zero (during a period (t5~t2) during which complete explosion speed N0 is reached, but target idle speed NSET is not yet reached), controller 31 proceeds from S77 to a step S378, and determines an intake air temperature modification coefficient Ktemp in accordance with the actual intake air temperature sensed by the intake air temperature sensor (100), by lookup from a table as shown in FIG. 26. At a next step S379, controller 31 determines a product (KAS0c×Ktemp) by multiplying KAS0c by Ktemp, and sets start enrichment coefficient KAS equal to the product (KAS←KAS0c×Ktemp) as a nonstandard temperature initial value of start enrichment coefficient KAS In this way, controller 31 modifies start enrichment coefficient KAS with temperature modification coefficient Ktemp (as shown in FIG. 26) at S379.

Intake air temperature modification coefficient Ktemp is equal to 1.0 when the actual intake air temperature is at the standard temperature (25° C.), as shown by a solid line in FIG. 26. Intake air temperature modification coefficient Ktemp is increased beyond 1.0 as the actual intake air temperature decreases below the standard temperature. Intake air temperature modification coefficient Ktemp is decreased to positive values smaller than 1.0 as the actual intake air temperature increases beyond the standard temperature. In the example of FIG. 26, intake air temperature modification coefficient Ktemp is decreased from a greater positive value greater than 1.0 to a smaller positive value smaller than 1.0 as the actual intake air temperature increases from a lower value lower than the standard temperature to a higher value higher than the standard temperature, in the form of a monotone decreasing function shown by the solid line curve in FIG. 26.

In the low temperature state in which the actual intake air temperature is lower than the standard temperature, as in the winter season, the evaporation of fuel injected from fuel injector 21 become slower, and accordingly the fuel wall flow quantity increases, so that the supply of fuel to combustion chamber 5 is delayed, the quantity of fuel in combustion chamber 5 becomes insufficient, and the combustion becomes unstable. Therefore, the control system of the eleventh embodiment increases the fuel supply quantity by making the temperature modification coefficient Ktemp greater than 1.0, and thereby prevent a deficit in the fuel in combustion chamber 5 in spite of an increase of the fuel wall flow quantity. In the high temperature state in which the actual intake air temperature is higher than the standard temperature as in the summer season, the vaporization of fuel sprayed from fuel injector 21 becomes easier, and hence the fuel wall flow quantity decreases on the intake port wall, so that the supply of fuel to combustion chamber 5 is not delayed, the quantity of fuel in combustion chamber 5 becomes greater, and the actual air-fuel ratio is shifted to the rich side of the stoichiometry so that the fuel could be consumed uselessly. Therefore, the control system of the eleventh embodiment is arranged to avoid useless fuel consumption by decreasing the fuel injection quantity in the higher temperature state.

When the target attainment flag becomes equal to one (after target idle speed NSET is reached), controller 31 proceeds from S77 to step S80, and compares start enrichment coefficient KAS with zero. At the moment when the target attainment flag becomes equal to one, start enrichment coefficient KAS is greater than zero (because of the nonstandard temperature initial value KAS0c×Ktemp). Therefore, controller 31 proceeds from S80 to step S81.

At S81, controller 31 calculates start enrichment coefficient KAS for the nonstandard temperature state, according to the following equation.

$$KAS = KAS(\text{previous}) - \Delta t \times KAS(\text{previous}) \quad (11)$$

In this equation, $\Delta t$ is a constant value, and KAS(previous) is a previous value of KAS. This equation (11) per se is identical to the equation (2). The constant value $\Delta t$ in the equation (11) is a value determining a decrease quantity per unit time of start enrichment coefficient KAS in the nonstandard temperature state. This constant value $\Delta t$ is determined by adaptation. The previous value KAS(previous) of start enrichment coefficient KAS is initially set to the value KAS0c×Ktemp, unlike the equation (2).

While the target speed attainment flag is equal to one, the operation of S81 is repeated, and start enrichment coefficient KAS in the nonstandard temperature state is decreased gradually. At step S82 following S81, controller 31 compares start enrichment coefficient KAS with zero. When start enrichment coefficient KAS becomes negative, then controller 31 proceeds from S82 to step S83, and sets start enrichment coefficient KAS to zero at S83.

Thus, from moment t2 at which engine speed Ne becomes equal to target idle speed NSET, the start enrichment coefficient KAS in the nonstandard temperature state is decreased gradually to zero.

The fuel wall flow quantity is influenced by the ambient temperature. In the low temperature state in which the actual intake air temperature is lower than the standard temperature, the fuel wall flow quantity increases, so that the quantity of fuel in combustion chamber 5 becomes insufficient, and the air-fuel ratio is inclined to the lean side. In the high temperature state in which the actual intake air temperature is higher than the standard temperature, the fuel wall flow quantity decreases, so that the quantity of fuel in combustion chamber 5 becomes too much, and the air-fuel ratio is inclined to the rich side. Therefore, the control system of the eleventh embodiment employs the temperature sensor (100)(temperature sensing means), and modifies the fuel injection quantity by modifying start enrichment coefficient KAS in accordance with the sensed actual intake air temperature.

Figure 24:
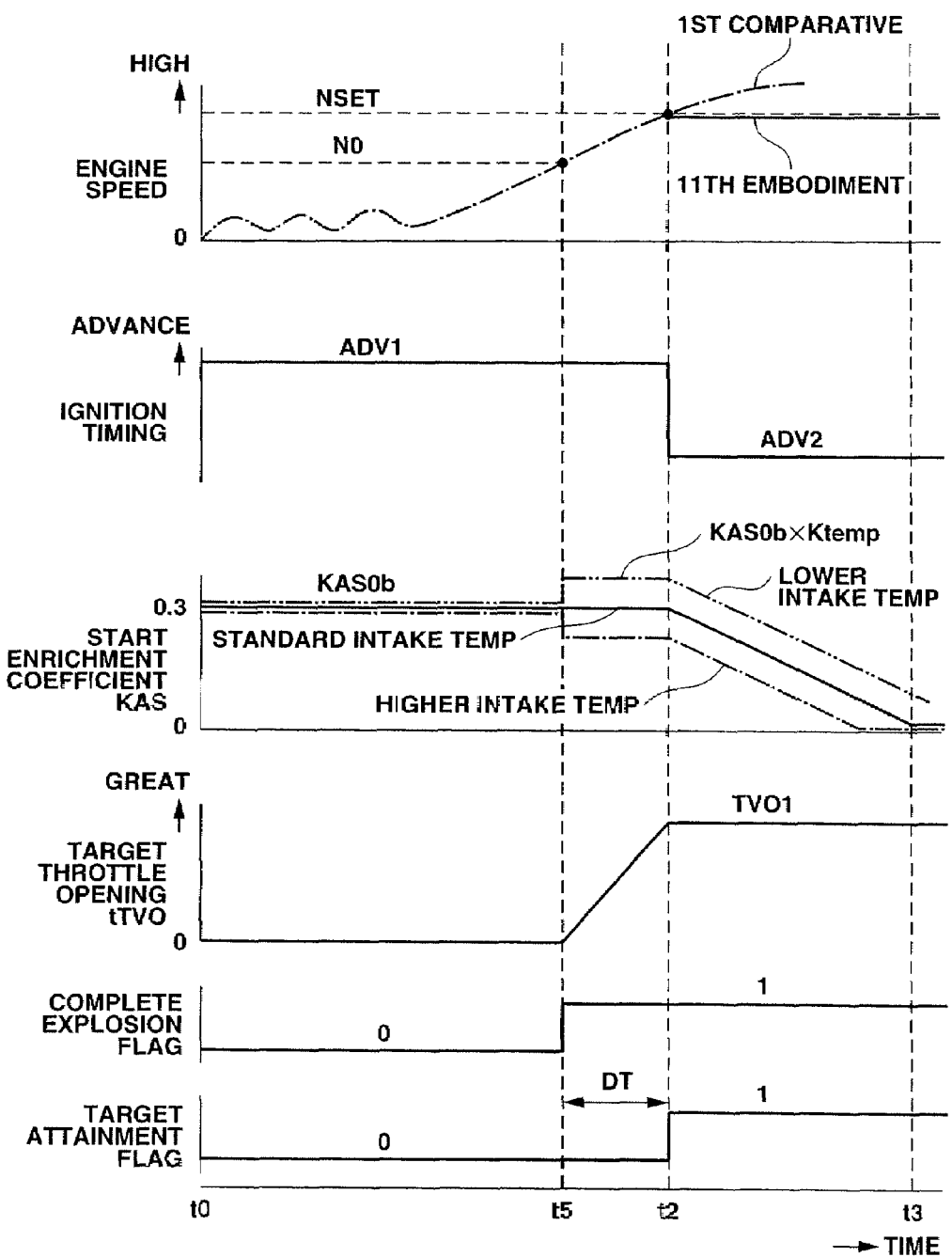
FIG. 24 is a time chart showing various waveforms for illustrating a control process according to the eleventh embodiment.

In the case of the lower intake air temperature lower than the standard, the control system further increases the increased fuel injection quantity based on the standard temperature as shown by the broken line in the fourth tier in FIG. 23, by increasing start enrichment coefficient KAS as shown by the two-dot chain line in the third tier in FIG. 24 (steps S77, S378, S379, S80~S83 in FIG. 25B). Therefore, in addition to the effects obtained by the first embodiment, the control system of the eleventh embodiment sets the increased fuel injection quantity in conformity with the increase of the fuel wall flow quantity in the low temperature state, and thereby controls the air-fuel ratio adequately even in the low temperature state, so that the control system can prevent engine stall, undesired vibrations just after a start of an engine, and an increase of HC.

In the case of the higher intake air temperature higher than the standard, the control system decreases the fuel injection quantity based on the standard temperature, by decreasing start enrichment coefficient KAS as shown by the one-dot chain line in the third tier in FIG. 24 (steps S77, S378, S379, S80~S83). Therefore, in addition to the effects obtained by the first embodiment, the control system of the eleventh embodiment sets the increased fuel injection quantity in conformity with the decrease of the fuel wall flow quantity in the high temperature state. Therefore, the control system controls the air-fuel ratio adequately even in the high temperature state, and avoid useless fuel consumption.

Figure 27:
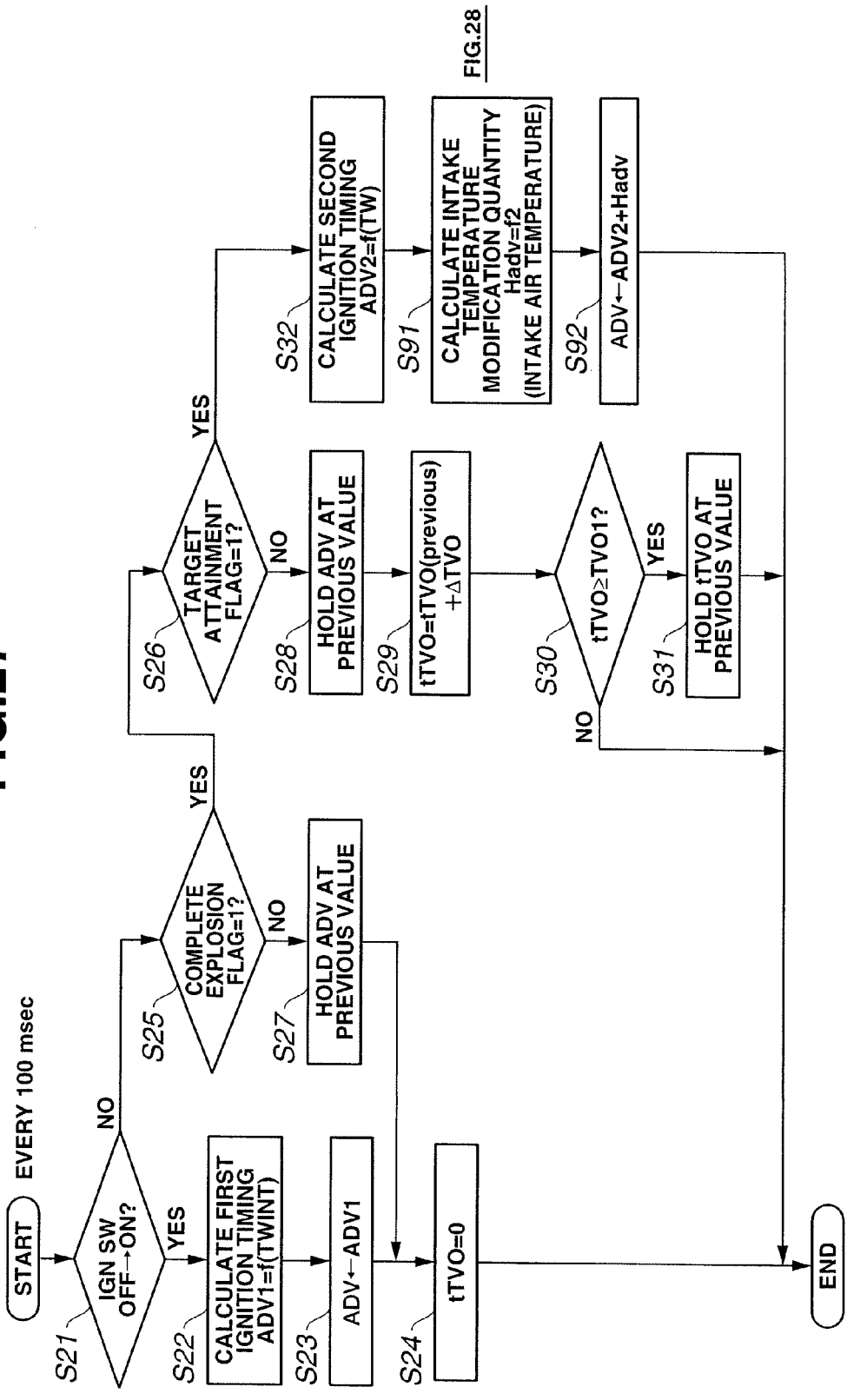
FIG. 27 is a flowchart of a process for calculating the command ignition timing command and the target throttle opening in the control process according to a twelfth embodiment.

FIG. 27 is a view for illustrating the control system and process according to a twelfth embodiment. FIG. 27 shows, in the form of a flowchart, a process for calculating a command ignition timing and a target throttle opening, which is performed, in place of the process of FIG. 5, by the control system of the twelfth embodiment. Substantially identical steps are given the same step numbers as in FIG. 5. The twelfth embodiment is based on the eleventh embodiment, and arranged to advance the second ignition timing ADV2 in the high intake air temperature state.

Figure 28:
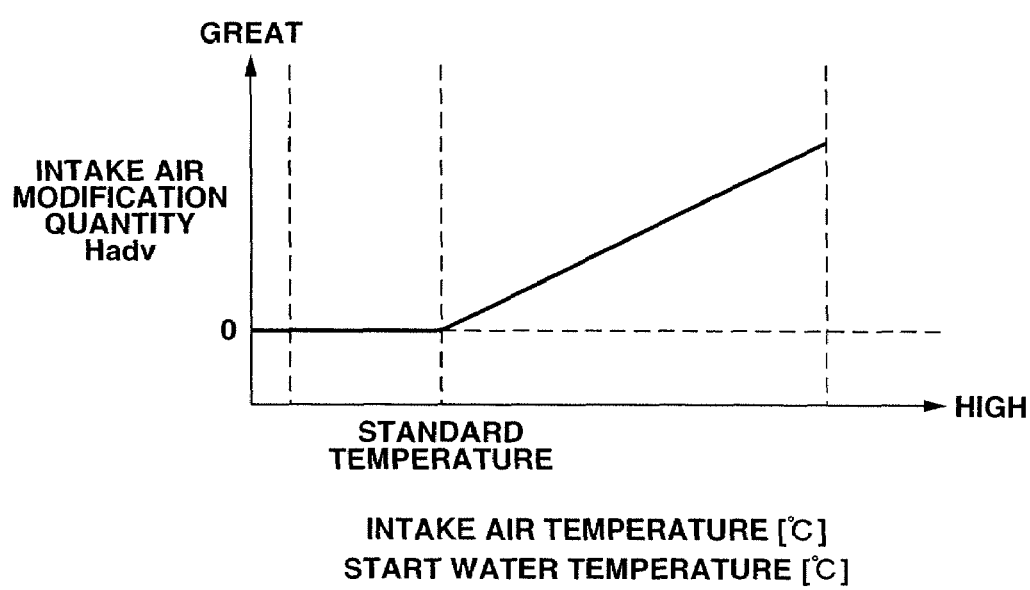
FIG. 28 is a characteristic view showing a temperature modification coefficient used in the control process according to the twelfth embodiment.

The following explanation is directed mainly to points different from FIG. 5. After the calculation of second ignition timing ADV2 at S32, controller 31 proceeds to a step S91, and calculates an intake air temperature modification timing quantity Hadv [deg] from the actual intake air temperature sensed by the intake air temperature sensor, by lookup from a table as shown in FIG. 28. At a next step S92, controller 31 sets command ignition timing ADV equal to the sum of second ignition timing ADV2 and temperature modification timing quantity Hadv (ADV←ADV2+Hadv).

Temperature modification ignition quantity Hadv is positive when the intake air temperature is higher than the standard temperature, as shown in FIG. 28. The unit of the command ignition timing (second ignition timing ADV2) is a crank angle [degBTDC] measured from the compression top dead center in the advance direction. Therefore, second ignition timing ADV2 is modified to the advance side by the addition of positive temperature modification quantity Hadv.

In the example of FIG. 28, temperature modification quantity Hadv is zero when the intake air temperature is equal to or lower than the standard temperature, and is increased from zero linearly with increase in the intake air temperature beyond the standard temperature, as shown in FIG. 28.

The control system of the twelfth embodiment modifies second ignition timing ADV2 to the advance side in the high temperature state for the following reason. The step retardation from ADV1 to ADV2 at idle attainment moment t2 is intended to raise the exhaust temperature and thereby to accelerate the warm-up of first catalyst 9 so that the catalyst is brought earlier to the active state capable of purifying HC generated largely in the low temperature state in which the intake air temperature is low. However, when the intake air temperature is higher than the standard temperature, the emission of HC is small, and accordingly the need for the step retardation for activating first catalyst 9 is less. Therefore, the control system of the twelfth embodiment modifies second ignition timing ADV 2 to the advance side as compared to the standard temperature state, and thereby improves the combustion efficiency in the high temperature state.

The control system of the twelfth embodiment modifies the second ignition timing ADV2 to the advance side in the high intake air temperature state higher than the standard intake air temperature (S91 and S92 in FIG. 27). By so doing, the control system can improve the combustion efficiency, and hence suppress the fuel consumption by decreasing the fuel injection quantity.

In the eleventh and twelfth embodiments, it is possible to replace the intake air temperature by a start engine temperature which is the engine temperature at the time of a start of the engine. In the example shown in FIG. 26, the start engine temperature is a start engine cooling water temperature at the time of an engine start, as shown by a two-dot chain line. In this case, the intake temperature modification coefficient Ktemp is determined in accordance with the start cooling water temperature as shown by the two-dot chain line.

In one of possible interpretations, steps S77, S378, S379, S80-S83 in FIG. 25B correspond to a process element of modifying the fuel injection quantity in accordance with the temperature condition.

Figure 29:
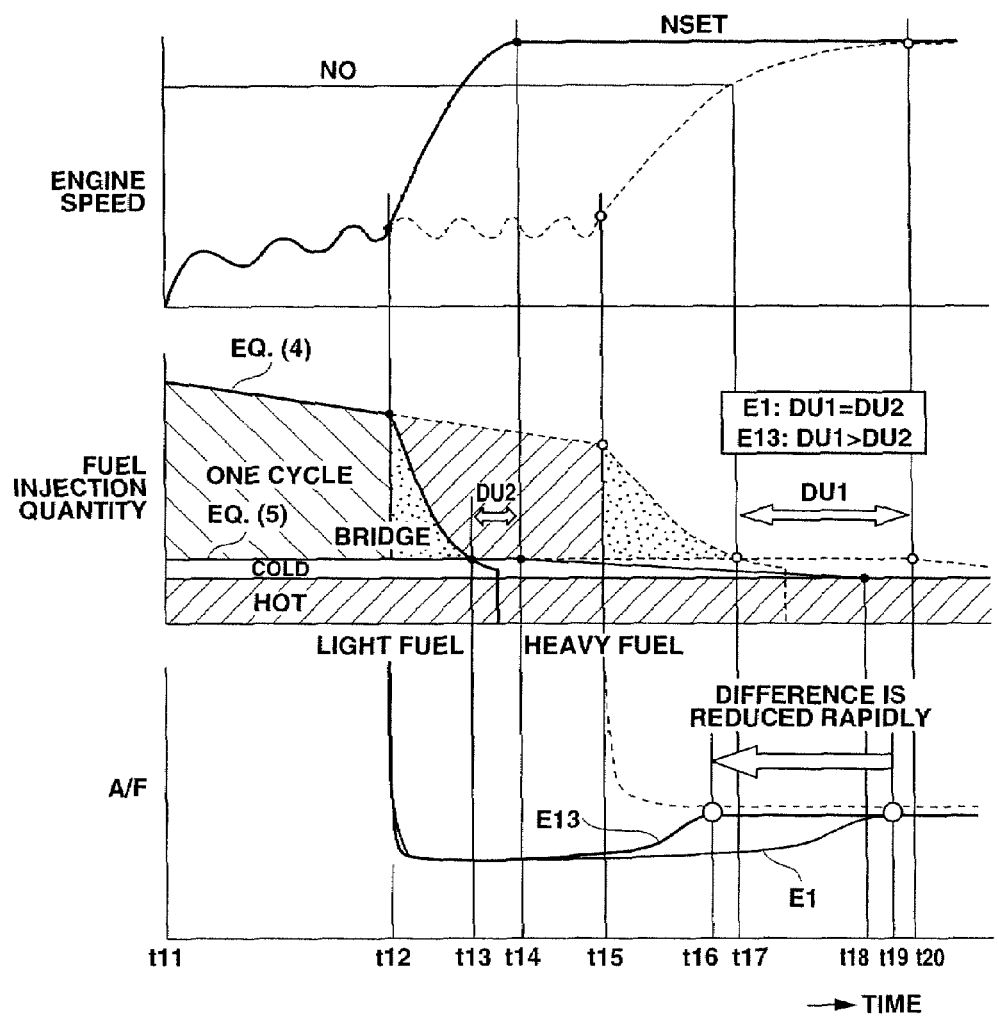
FIG. 29 is a time chart of various waveforms for illustrating operations of a control system according to a thirteenth embodiment
Figure 30:
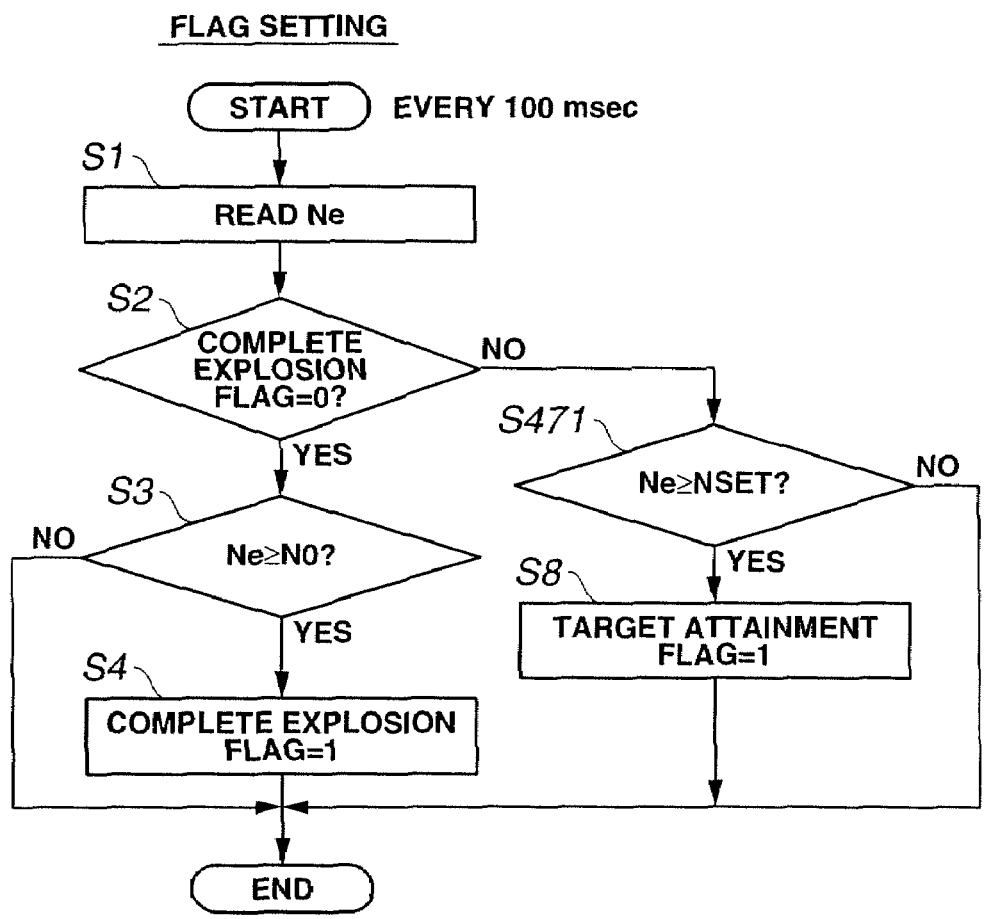
FIG. 30 is a flowchart of a process for setting the complete explosion flag and the idle attainment flag in a control process according to the thirteenth embodiment.

FIGS. 29 and 30 are views for illustrating the control system and process according to a thirteenth embodiment. The flowchart of FIG. 30 is a substitute for FIG. 4. Substantially identical steps are given the same step numbers.

In the first embodiment, no consideration is taken of fuel properties, specifically as to whether the fuel is heavy or light. The volatility of a fuel for an engine has substantial influence on the startability of the engine. Accordingly, when the value (such as predetermined value DT shown in FIG. 4) for determining whether engine speed Ne reaches target idle speed NSET) as well as quantities (such as start enrichment coefficient KAS, base fuel injection pulse width Tp in equation (5), and transient correction quantity Kathos) which are relevant or influential to the stability of the idle rotational speed immediately after an engine start are adapted (set) for the heavy fuel, the target idle speed attainment moment is advanced in the case of the light fuel. In the case of heavy fuel, the engine speed reaches target idle speed NSET at a moment t20 as shown by a broken line in the uppermost tier of FIG. 29. However, in the case of light fuel having a higher volatility improving the combustion state, the engine speed reaches target idle speed NSET at an earlier moment t14 as shown by a solid line in the uppermost tier of FIG. 29. The control system of the first embodiment is unable to detect this early attainment of target idle speed NSET. In the case of light fuel, too, the control system of the first embodiment judges that the target idle speed NSET is reached at the same later moment t20 as for the heavy fuel, and starts decreasing the start enrichment coefficient KAS from the later moment t20. That is, start enrichment coefficient KAS is held at the initial value uselessly until t20 after the moment t14 at which target idle speed NSET is already reached in the case of light fuel. The resulting useless fuel consumption causes a delay of settlement of the air-fuel ratio to the target (theoretical) ratio until a moment t19 as shown by a thin solid line in the lowermost tier of FIG. 29.

Therefore, in the thirteenth embodiment, the quantities (such as start enrichment coefficient KAS, base fuel injection pulse width Tp in equation (5), and transient correction quantity Kathos) which are relevant or influential to the stability of the idle rotational speed immediately after an engine start are adapted (set) for the heavy fuel; and the control system determines whether the engine speed reaches the target idle speed NSET, in accordance with a parameter (or fuel property representing parameter) representing a fuel property difference. As shown by the solid line and broken line in the uppermost tier of FIG. 29, the difference in fuel property between the heavy fuel and light fuel appears in the rise of the engine speed from cranking. Therefore, the control system of the thirteenth embodiment is arranged to detect the target idle speed attainment moment t2, by monitoring engine speed Ne.

The thirteenth embodiment is not limited to the configuration in which the quantities (such as start enrichment coefficient KAS, base fuel injection pulse width Tp, and transient correction quantity Kathos) which are relevant or influential to the stability of the idle rotational speed are adapted (set) for the heavy fuel. The thirteenth embodiment is applicable to the configuration in which the quantities (such as start enrichment coefficient KAS, base fuel injection pulse width Tp, and transient correction quantity Kathos) are adapted for the light fuel.

The process of FIG. 30 is different from FIG. 4 in the following points. When the complete explosion flag becomes equal to one, controller 31 proceeds from S2 to a step S471, and compares the sensed actual engine speed Ne with target idle speed NSET. Immediately after complete explosion speed N0 is reached, the engine speed Ne is lower than target idle speed NSET. Therefore, controller 31 terminates the process of FIG. 30 directly.

The rise of engine rotational speed from cranking differs in dependence on the fuel property. The engine speed increases rapidly in the case of light fuel, and slowly in the case of heavy fuel. In spite of such a difference, the engine speed Ne becomes equal to target idle speed NSET in due course. Therefore, at the moment at which engine speed Ne becomes equal to target idle speed NSET, controller 31 proceeds from S471 to step S8. At S8, controller 31 sets the target attainment flag (which is initialized to zero at the time of turn-on of the ignition switch) to one to indicate the attainment of target idle speed NSET.

FIG. 29 illustrates operations of the control system of the thirteenth embodiment in comparison with the first embodiment. In the example shown in FIG. 29, the quantities (such as start enrichment coefficient KAS, base fuel injection pulse width Tp, and transient correction quantity Kathos) which are relevant or influential to the stability of the idle rotational speed are set for the heavy fuel in both the first embodiment and the thirteenth embodiment.

The middle tier of FIG. 29 shows the fuel injection quantity. In the case of the heavy fuel, the fuel injection quantity determined by the start fuel injection pulse width Ti1 of equation (4) decreases gradually from a moment t11 of start of cranking. From a moment t15, the fuel injection quantity decreases steeply as shown by a broken line, in accord with a steep increase in engine speed Ne. On the other hand, the fuel injection quantity determined by the normal fuel injection pulse width Ti2 of equation (5) remains approximately constant at a level lower than the fuel injection quantity determined by start injection pulse width Ti1, until a moment t20, as shown by a broken line in the middle tier of FIG. 29. At a moment t17, the fuel injection quantity determined by the start fuel injection pulse width Ti1 of equation (4) intersects the line of the fuel injection quantity determined by the normal fuel injection pulse width Ti2 of equation (5), and becomes smaller than the fuel injection quantity determined by the normal fuel injection pulse width Ti2 of equation (5). Therefore, from moment t17, the fuel is injected in the fuel injection quantity set by the normal injection pulse width Ti2.

At the time of start, the normal fuel injection pulse width Ti2 of equation (5) is mainly determined by start enrichment coefficient KAS. This start enrichment coefficient KAS is held at the initial value until the moment of attainment of target idle speed NSET, and decreased gradually from the initial valve from the moment t20 at which engine speed Ne reaches target idle speed NSET, to zero as shown by a broken line in the middle tier of FIG. 29. Thus, in the case of heavy fuel, the period by which the timing to decrease start enrichment coefficient KAS is delayed is equal to a first value DU1 as shown in FIG. 29.

According to the first embodiment, the predetermined value DT is set equal to DU1. At the expiration of the predetermined period DT (=DU1), the control system judges that engine speed Ne reaches target idle speed NSET (at S6 and S8 in FIG. 4). By contrast, the control system of the thirteenth embodiment detects the target idle speed attainment moment by comparing the sensed actual engine speed Ne with target idle speed NSET (at S471 and S8 in FIG. 39). Therefore, as long as the heavy fuel is used, there is no significant difference between the first and thirteenth embodiments, in detecting the target idle speed attainment moment t20. Thus, in the case of the heavy fuel, the air-fuel ratio converges to the target ratio (theoretical ratio) as shown by a broken line in the lowermost tier of FIG. 29, both in the first and thirteenth embodiments.

In the case of light fuel, the fuel injection quantity determined by start fuel injection pulse width Ti1 of equation (4) decreases gradually from the crank start moment t11. Because the combustion is improved by the volatility of the light fuel, the fuel injection quantity decreases steeply from an earlier moment t12 (earlier than t15) as shown by a solid line in FIG. 29, in accord with a steep increase in engine speed Ne. On the other hand, the fuel injection quantity determined by the normal fuel injection pulse width Ti2 of equation (5) remains approximately constant at a level lower than the fuel injection quantity determined by start injection pulse width Ti1, until a moment t14, as shown by a solid line in the middle tier of FIG. 29. At a moment t13, the fuel injection quantity determined by the start fuel injection pulse width Ti1 of equation (4) intersects the line of the fuel injection quantity determined by the normal fuel injection pulse width Ti2 of equation (5), and becomes smaller than the fuel injection quantity determined by the normal fuel injection pulse width Ti2 of equation (5). Therefore, from moment t13, the fuel is injected in the fuel injection quantity set by the normal injection pulse width Ti2.

In this case, the control system of the thirteenth embodiment judges, at moment t14, that engine speed Ne reaches target idle speed NSET. Therefore, start enrichment coefficient KAS which is held at the initial value until t14 is decreased gradually from moment t14, and reduced to zero at a moment t18 (as shown by a solid line in the middle tier of FIG. 29). Thus, in the case of light fuel, the period by which the timing to decrease start enrichment coefficient KAS is delayed is set equal to a second value DU2 shorter than DU1 (DU2<DU1) as shown in FIG. 29. Therefore even when the light fuel is used, the air-fuel ratio converges to the target ratio (theoretical ratio) at an earlier moment t16 as shown by a thick solid line (E13) in the lowermost tier of FIG. 29

Thus, the control system of the thirteenth embodiment is configured to monitor a parameter (fuel property representing parameter) representing a fuel property difference which, in this embodiment, is engine speed Ne, and determines when target idle speed is reached or not, in accordance with the fuel property representing parameter (at S471 in FIG. 30). Therefore, the control system can set the idle attainment moment earlier in the case of light fuel, and later in the case of heavy fuel. When the light fuel is used though the quantities (such as start enrichment coefficient KAS, base fuel injection pulse width Tp in equation (5), and transient correction quantity Kathos) which are relevant or influential to the stability of the idle rotational speed immediately after an engine start are set on the basis of the heavy fuel; the control system of the thirteenth embodiment can prevent useless fuel consumption by reducing the period to continue to hold KAS at the initial value, from DU1 to DU2, and cause the air-fuel ratio to converge to the target ratio at an earlier moment t16. In other words, the control system of the thirteenth embodiment (E13) can reduce the difference (t16–t19) in the moment of convergence of the air-fuel ratio to the target (theoretical) ratio, as compared to the first embodiment (E1).

In FIG. 29, the engine speed Ne becomes equal to the complete explosion speed No at the moment at which the fuel injection quantity determined by the start fuel injection pulse width Ti1 of equation (4) intersects the line of the fuel injection quantity determined by the normal fuel injection pulse width Ti2 of equation (5). However, the engine speed Ne is not always N0 at the moment of such intersection between the characteristic line of equation (4) and the characteristic line of equation (5).

A fourteenth embodiment is based on the thirteenth embodiment, and arranged to increase the valve overlap (period) from a start of cranking. In the fourteenth embodiment, the engine is provided with the valve timing control mechanism for advancing or retarding the opening and closing timing of exhaust valve 16. By using the valve timing control mechanism, the control system of the fourteenth embodiment increases the valve overlap (period) of intake and exhaust valves 15 and 16 by varying an exhaust valve closing timing EVC from the start of the cranking, in order to cause the combustion gas to flow backward to intake port 4. The high temperature combustion gas blown backward into intake port 4 promotes the vaporization of fuel on the intake port wall. Therefore, even in the case of an engine having a greater fuel wall flow quantity, the control system of the fourteenth embodiment can further reduce the difference in the moment of convergence of the air-fuel ratio to the target (theoretical) ratio, between the light fuel and heavy fuel.

The fuel wall flow quantity tends to be increased in an engine in which intake ports 4 are curved, or intake ports 4 are long. The fourteenth embodiment is advantageous especially for such an engine. The fourteenth embodiment is not limited to the engine provided with the valve timing control mechanism. The fourteenth embodiment is applicable to an engine provided with a valve actuating mechanism for the exhaust valves, capable of promoting backflow of the combustion gas into the intake ports.

A fifteenth embodiment is based on the thirteenth embodiment, and arranged to avoid the valve overlap of the intake and exhaust valves in the direct injection arrangement in which fuel injector 21 is disposed to inject fuel directly into combustion chamber 5. By employing the valve timing control mechanism for advancing or retarding the valve opening and closing timing of exhaust valves 16, the control system of the fifteenth embodiment eliminates the valve overlap (period) of intake and exhaust valves 15 and 16 so that there is no overlap, by varying the exhaust valve closing timing EVC from the start of the cranking, in order to confine the combustion gas in combustion chamber 5. The high temperature combustion gas confined in combustion chamber 5 promotes the vaporization of fuel on the wall in combustion chamber. Therefore, even in the case of an engine having a greater fuel wall flow quantity in the combustion chamber, the control system of the fifteenth embodiment can further reduce the difference in the converging timing of the air-fuel ratio converging to the target ration in the case of the light fuel from the converging timing of the heavy fuel.

The fifteenth embodiment is not limited to the engine provided with the valve timing control mechanism. The fifteenth embodiment is applicable to an engine provided with a valve actuating mechanism for the exhaust valves, capable of reducing the valve overlap to zero.

In one of possible interpretations, step S471 corresponds to a process element of detecting a moment at which the engine speed reaches the target idle speed NSET. It is possible to employ FIG. 30 in place of FIG. 4 in any of the embodiments.

Moreover, it is optional to perform a feedback control by using at least one of the throttle valve opening, fuel injection quantity and ignition timing so as to control the actual engine speed Ne to target idle speed NSET after the target idle speed attainment moment in any of the preceding embodiments. With such a feedback control, the control system can converge the actual engine speed to target idle speed after the attainment of the target idle speed even if there occurs a hunting.

This application is based on four prior Japanese Patent Applications No. 2006-348220; No. 2006-348135; No. 2006-348287; and No. 2006-348333, all filed on Dec. 25, 2006. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine control apparatus for an internal combustion engine comprising:
   a controller
   to retard an ignition timing for the engine, from an engine starting mode timing for starting the engine to a catalyst warm-up mode timing for warming up an exhaust purifying catalyst for the engine, at an idle attainment moment at which an engine idling condition is reached,
   to regulate an intake air quantity for the engine at a prior moment prior to the idle attainment moment so that intake air is supplied to the engine at the idle attainment moment in an amount to sustain the idling condition,
   to increase a fuel injection quantity by an increase quantity during a period from the prior moment before the idle attainment moment until an intake settlement moment which is a moment after the idle attainment moment, and to set the increase quantity of the fuel injection quantity in accordance with a parameter representing a condition of the intake air or fuel supplied to the engine.

2. The engine control apparatus as claimed in claim 1, wherein the engine control apparatus further comprises:
the exhaust purifying catalyst disposed in an exhaust passage for the engine, and arranged to purify exhaust gas of the engine;
a fuel injector to inject fuel for the engine;
an igniting device provided in a combustion chamber of the engine; and
an intake air regulating device to regulate the intake air quantity of the intake air supplied into the combustion chamber;
wherein the controller is configured to determine that the idle attainment moment is reached when an engine speed reaches a target idle speed, to retard the ignition timing for the engine, from the engine starting mode timing to the catalyst warm-up mode timing at the idle attainment moment, and to operate the intake air regulating device to regulate the intake air quantity for the engine at the prior moment prior to the idle attainment moment; and
wherein the intake settlement moment is a moment when a rate of change of an intake condition becomes within a predetermined range.

3. The engine control apparatus as claimed in claim 1, wherein the controller is configured to set the increase quantity of the fuel injection quantity in accordance with a pressure of the intake air supplied to the engine.

4. The engine control apparatus as claimed in claim 3, wherein the engine control apparatus further comprises a pressure sensor to sense an atmospheric pressure as the pressure of the intake air, and the controller is configured to set the increase quantity of the fuel injection quantity in accordance with the atmospheric pressure.

5. The engine control apparatus as claimed in claim 3, wherein the controller is configured to increase the increase quantity of the fuel injection quantity as a deviation of the pressure of the intake air from a predetermined standard pressure becomes greater.

6. The engine control apparatus as claimed in claim 3, wherein the controller is configured to increase a valve overlap between an intake valve and an exhaust valve of the engine in accordance with a deviation of the pressure of the intake air from a predetermined standard pressure.

7. The engine control apparatus as claimed in claim 3, wherein the engine control apparatus further comprises a fuel injector not shown to inject the fuel directly into a combustion chamber, and wherein the controller is configured to prevent a valve overlap between an intake valve and an exhaust valve of the engine when the pressure of the intake air deviates from a predetermined standard pressure.

8. The engine control apparatus as claimed in claim 1, wherein the controller is configured to set a fuel pressure at a reference pressure when an atmospheric pressure is at a standard pressure, and to increase the fuel pressure from the reference pressure as the atmospheric pressure becomes higher than the standard pressure.

9. The engine control apparatus as claimed in claim 1, wherein the controller is configured to set the increase quantity of the fuel injection quantity in accordance with a temperature condition of the engine.

10. The engine control apparatus as claimed in claim 1, wherein the controller is configured to set the increase quantity of the fuel injection quantity in accordance with a fuel property of a fuel supplied to the engine.

11. The engine control apparatus as claimed in claim 10, wherein the controller is configured to increase the increase quantity of the fuel injection quantity when the fuel is a heavy fuel.

12. The engine control apparatus as claimed in claim 10, wherein, when the fuel is a heavy fuel, the controller determines the increase quantity of the fuel injection quantity so that an air-fuel ratio obtained by the increase quantity of the fuel injection quantity is on a lean side within a stability limit.

13. The engine control apparatus as claimed in claim 10, wherein the controller is configured to determine that the engine idling condition is reached when an engine speed of the engine reaches a target idle speed and to increase the target idle speed at the idle attainment moment when the fuel is a heavy fuel.

14. The engine control apparatus as claimed in claim 10, wherein the controller is configured to delay a step retardation of the ignition timing from the engine starting mode timing to the catalyst warm-up mode timing, by a predetermined delay time when the fuel is a heavy fuel.

15. The engine control apparatus as claimed in claim 2, wherein the controller is configured to detect the idle attainment moment by monitoring a fuel property representing parameter representing a fuel property of the fuel.

16. The engine control apparatus as claimed in claim 1, wherein the controller is configured
to perform a step retardation of the ignition timing for the engine, from the engine starting mode timing to the catalyst warm-up mode timing at the idle attainment moment,
to start an increase of the intake air quantity from a minimum setting at the prior moment at such an increase rate that the intake air quantity becomes equal to a predetermined value at the idle attainment moment, and
to increase the fuel injection quantity by the increase quantity temporarily during the period from the prior moment before the idle attainment moment to the intake settlement moment after the idle attainment moment.

17. The engine control apparatus as claimed in claim 1, wherein the controller is configured to determine the fuel injection quantity by holding a start enrichment quantity at an initial level from a moment of start of a cranking operation of the engine to the prior moment, and to increase the fuel injection quantity temporarily during the period from the prior moment to the intake settlement moment by further holding the start enrichment quantity at the initial level from the prior moment until the idle attainment moment and by decreasing the start enrichment quantity from the initial level toward zero from the idle attainment moment at such a gradual rate that the start enrichment quantity is reduced to zero at the intake settlement moment when an intake condition of the engine settles down.

18. An engine control process for an internal combustion engine, comprising:
retarding an ignition timing of the engine from an engine starting mode timing for engine starting, to a catalyst warm-up mode timing for accelerating warm-up of an exhaust purifying catalyst for the engine, at an idle attainment moment at which an engine idling condition is reached;
regulating an intake air quantity for the engine at a prior moment prior to the idle attainment moment so that intake air is supplied to the engine at the idle attainment moment in an amount to sustain the idling condition;
increasing a fuel injection quantity for the engine by an increase quantity during a period from the prior moment before the idle attainment moment until an intake settlement moment which is a moment after the idle attainment moment; and setting the increase quantity of the fuel injection quantity in accordance with a parameter representing a condition of the intake air or the fuel supplied to the engine.

19. The engine control process according to claim 18, wherein the engine control process further comprises detecting the idle attainment moment so that the idle attainment moment is reached when an engine speed reaches a target idle speed.

20. The engine control process as claimed in claim 18, wherein the increase quantity of the fuel injection quantity is set in accordance with the parameter which includes at least one of a pressure condition, a temperature condition and a fuel condition affecting vaporization of injected fuel.

21. The engine control process as claimed in claim 18, wherein the parameter includes an atmospheric pressure, and the increase quantity of the fuel injection quantity is increased when the atmospheric pressure increases beyond a predetermined standard pressure level and when the atmospheric pressure decreases below the standard pressure level.

22. The engine control process as claimed in claim 18, wherein the engine control process further comprises controlling a valve overlap in a non-standard state in which the parameter is not at a standard level.

23. The engine control process as claimed in claim 18, wherein the parameter comprises a pressure of the intake air, and the engine control process further comprises increasing a fuel pressure of the fuel supplied to the engine as the pressure of intake air becomes higher.

24. An engine control apparatus for an internal combustion engine comprising:

means for retarding an ignition timing for the engine, from an engine starting mode timing for starting the engine to a catalyst warm-up mode timing for warming up an exhaust purifying catalyst for the engine, at an idle attainment moment at which an engine idling condition is reached;

means for increasing an intake air quantity for the engine from a prior moment prior to the idle attainment moment so that intake air is supplied to the engine at the idle attainment moment in an amount to sustain the idling condition; and means for increasing a fuel injection quantity by an increase quantity during a period from the prior moment before the idle attainment moment until an intake settlement moment at which an intake air condition settles down after the idle attainment moment.

* * * * *